US011905495B2

(12) United States Patent
Sivik et al.

(10) Patent No.: US 11,905,495 B2
(45) **Date of Patent: *Feb. 20, 2024**

(54) TREATMENT COMPOSITIONS COMPRISING CATIONIC POLY ALPHA-1,6-GLUCAN ETHERS

(71) Applicant: The Procter & Gamble Company, Cincinnati, OH (US)

(72) Inventors: Mark Robert Sivik, Mason, OH (US); Carola Barrera, West Chester, OH (US); Kristine Lynn Fliter, Harrison, OH (US); Karel Jozef Maria Depoot, Anzegem-Vichte (BE); Wouter Walravens, Humbeek (BE); Cedric Joseph Volont, Laken (BE); Claire Rebecca Yates, Cincinnati, OH (US); Julie Ann Menkhaus, Cleves, OH (US); David Good, Loveland, OH (US); Gang Si, Newcastle upon Tyne (GB); Ruth Chilton, Newcastle upon Tyne (GB); Michael D. Gagnon, West Grove, PA (US); Brandon J. Burkhart, Newark, DE (US); Helen Lu, Wallingford, PA (US); Weiming Qiu, Wilmington, DE (US); Kathleen Mary McDonough, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 233 days.

This patent is subject to a terminal disclaimer.

(21) Appl. No.: 17/350,086

(22) Filed: Jun. 17, 2021

(65) Prior Publication Data

US 2021/0395649 A1 Dec. 23, 2021

Related U.S. Application Data

(60) Provisional application No. 63/040,554, filed on Jun. 18, 2020.

(30) Foreign Application Priority Data

Jul. 3, 2020 (EP) .................................... 20183889

(51) Int. Cl.

| | |
|---|---|
| ***C11D 3/37*** | (2006.01) |
| ***C11D 3/22*** | (2006.01) |
| ***C11D 3/00*** | (2006.01) |
| ***C11D 11/00*** | (2006.01) |
| ***C11D 17/00*** | (2006.01) |
| ***C11D 17/04*** | (2006.01) |
| ***C11D 17/06*** | (2006.01) |
| ***C11D 1/00*** | (2006.01) |

(52) U.S. Cl.

CPC ................ *C11D 3/227* (2013.01); *C11D 1/00* (2013.01); *C11D 3/0015* (2013.01); *C11D 3/0036* (2013.01); *C11D 3/22* (2013.01); *C11D 3/222* (2013.01); *C11D 11/0017* (2013.01); *C11D 11/0023* (2013.01); *C11D 17/0008* (2013.01); *C11D 17/043* (2013.01); *C11D 17/044* (2013.01); *C11D 17/045* (2013.01); *C11D 17/06* (2013.01)

(58) Field of Classification Search

CPC .............. C11D 1/00; C11D 3/22; C11D 3/222
USPC ......................... 510/220, 320, 321, 470, 475
See application file for complete search history.

(56) References Cited

U.S. PATENT DOCUMENTS

| | | | | |
|---|---|---|---|---|
| 4,411,891 | A | 10/1983 | Mizutani et al. | |
| 9,957,334 | B2 | 5/2018 | Dennes et al. | |
| 2015/0232785 | A1 * | 8/2015 | Paullin .................. | C11D 3/222 536/120 |
| 2016/0311935 | A1 | 10/2016 | Dennes et al. | |

FOREIGN PATENT DOCUMENTS

| | | | |
|---|---|---|---|
| EP | 3628691 | A1 | 4/2020 |
| EP | 3926030 | A1 | 12/2021 |
| WO | 2015192971 | A1 | 12/2015 |
| WO | 2015195960 | A1 | 12/2015 |
| WO | 2016160738 | A2 | 10/2016 |
| WO | 2017083228 | A1 | 5/2017 |
| WO | 2017091533 | A1 | 6/2017 |
| WO | 2017102306 | A1 | 6/2017 |

OTHER PUBLICATIONS

15818 Extended EP Search Report and Written Opinion for 20183889.3 dated Dec. 10, 2020, 8 pages.
15818M PCT Search Report and Written Opinion for PCT/US2021/037767 dated Sep. 20, 2021,15 pages.

* cited by examiner

*Primary Examiner* — Gregory R Delcotto
(74) *Attorney, Agent, or Firm* — Andrew J. Mueller; Gregory S. Darley-Emerson

(57) ABSTRACT

Treatment compositions, such as fabric care or dish care compositions, that include poly alpha-1,6-glucan ether compounds, which include poly alpha-1,6-glucans substituted with at least one positively charged organic group, the compounds being characterized by, for example, a degree of substitution of about 0.001 to about 3.0, and optionally, where about 3% or more of the backbone glucose monomer units have branches via alpha-1,2- and/or alpha-1,3-glycosidic linkages. Methods related to making and using such compositions.

13 Claims, No Drawings

TREATMENT COMPOSITIONS COMPRISING CATIONIC POLY ALPHA-1,6-GLUCAN ETHERS

FIELD OF THE INVENTION

The present disclosure relates to treatment compositions, such as fabric care or dish care compositions, that include cationic poly alpha-1,6-glucan ether compounds. The cationic poly alpha-1,6-glucan ether compounds include poly alpha-1,6-glucans substituted with at least one positively charged organic group, and are characterized by, for example, a degree of substitution of about 0.001 to about 3.0. Optionally, about 5% or more of the backbone glucose monomer units may have branches via alpha-1,2 and/or alpha-1,3-glycosidic linkages. The present disclosure also relates to methods of making and using such compositions.

BACKGROUND OF THE INVENTION

Driven by a desire to find new structural polysaccharides using enzymatic syntheses or genetic engineering of microorganisms, researchers have discovered oligosaccharides and polysaccharides that are biodegradable and can be made economically from renewably-sourced feedstocks. Cationic polysaccharides have utilities treatment compositions such as fabric care and dish care compositions. Cationic polysaccharides derived from enzymatic syntheses or genetic engineering of microorganisms may be useful as viscosity modifiers, emulsifiers, binders, film formers, spreading and deposition aids, and carriers for enhancing the rheology, efficacy, deposition, aesthetics and delivery of active ingredients in such treatment compositions.

In particular, it is desirable for certain active ingredients, such as perfumes, perfume delivery systems, or softening actives, to be deposited on a target surface, such as a garment or dish. Deposition aids can improve the deposition efficiency of such actives. However, the deposition aid must be compatible with other ingredients in the treatment composition and/or the treatment liquor. Furthermore, it is preferably that the deposition aid has minimal effect on the stability and/or viscosity of a treatment composition for ease of use and processability. It is also preferred for such materials to be derived from feedstocks that can be made from renewable resources.

There is a continuing need for treatment compositions, such as fabric care or dish care compositions, that include materials that can improve the deposition or performance of active ingredients, or even provide softness or other benefits themselves. There is also a need for materials that can provide deposition or other performance benefits in such treatment compositions, where the materials are derived from renewable resources. It is further desirable that such materials are compatible in product and usage conditions, and/or are conveniently processed.

SUMMARY OF THE INVENTION

The present disclosure relates to compositions, typically fabric care and dish care compositions, that include a poly alpha-1,6-glucan ether compound, and methods related thereto.

For example, the present disclosure relates to a treatment composition that includes: a poly alpha-1,6-glucan ether compound that includes a poly alpha-1,6-glucan substituted with at least one positively charged organic group, where the poly alpha-1,6-glucan includes a backbone of glucose monomer units where at least 65% of the glucose monomer units are linked via alpha-1,6-glycosidic linkages, and where the poly alpha-1,6-glucan ether compound is characterized by at least one, or at least two, or all three of (a), (b), or (c): (a) a weight average degree of polymerization of at least 5, and/or (b) a weight average molecular weight of from about 1000 to about 500,000 daltons, and/or (c) having been derived from a poly alpha-1,6-glucan having a weight average molecular weight of from about 900 to about 450,000 daltons, determined prior to substitution with the least one positively charged organic group; where the poly alpha-1,6-glucan ether compound is further characterized by a degree of substitution of about 0.001 to about 3.0; the treatment composition further comprising a treatment adjunct ingredient; and where the treatment composition is a fabric care composition, a dish care composition, or a mixture thereof. Optionally, at least 3% of the backbone glucose monomer units in the poly alpha-1,6-glucan ether compound and/or the poly alpha-1,6-glucan parent compound have branches via alpha-1,2 and/or alpha-1,3-glycosidic linkages.

The present disclosure also relates to a method of treating a surface, typically fabric or dishware, with the treatment compositions described herein, where the method includes the step of contacting the surface with the treatment composition, optionally in the presence of water.

DETAILED DESCRIPTION OF THE INVENTION

The present disclosure relates to treatment compositions such as fabric and dish care compositions that include cationic poly alpha-1,6-glucan ether compounds. The compounds may be derived from poly alpha-1,6-glucans and substituted with positively-charged organic groups. Such compounds can be advantageous in the presently described treatment compounds. For example, the cationic glucan ether compounds may provide softness benefits to a target surface such as a fabric. Furthermore, the compounds may act as a deposition aid, improving the deposition of other active ingredients in the treatment compositions, such as softness actives or freshness actives.

The poly alpha-1,6-glucan ether compounds of the present disclosure may have advantages over other cationic polymers that are known in such treatment compositions. For example, many cationic polymers are of a synthetic origin, whereas the poly alpha-1,6-glucans ether compounds of the present disclosure are derived from feedstock glucans that come from renewable resources. Other cationic polysaccharides are known, such as cationic hydroxyethylcellulose ("catHEC"), but they may be susceptible to enzymatic degradation by enzymes that may also be in a treatment composition or a treatment liquor, such as cellulase; the poly alpha-1,6-glucan ether compounds of the present disclosure are believed to be resistant to such enzymes in a product or in a treatment liquor. Certain cationic polymers may substantially affect the viscosity of aqueous compositions, leading to formulation and stability challenges, whereas the cationic glucan ether compounds of the present disclosure may be used in relatively high amounts with relatively minimal viscosity effects. Finally, the poly alpha-1,6-glucan ether compounds of the present disclosure may be relatively soluble in water, leading to convenient processing, storage, and transport, whereas other cationic glucan-based compounds (e.g., certain poly alpha-1,3-glucan ether compounds) are relatively insoluble.

The compounds, compositions, and methods of the present disclosure are described in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein the phrase "fabric care composition" includes compositions and formulations designed for treating fabric. Such compositions include, but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation. Fabric care compositions may be intended for automatic treatment processes, such as use in an automatic washing machine, or in manual treatment process, such as treatments by hand. Additionally or alternatively, fabric care compositions may include compositions directed to the care of finished textiles, cleaning of finished textiles, sanitization of finished textiles, disinfection of finished textiles, detergents, stain removers, softeners, fabric enhancers, stain removal or finished textiles treatments, pre and post wash treatments, washing machine cleaning and maintenance, with finished textiles intended to include garments and items made of cloth.

As used herein, the phrase "dish care composition" includes compositions and formulations designed for treating dishware. Such compositions include dishwashing detergents such as automatic dishwashing detergents (typically used in dishwasher machines) and hand-washing dish detergents. A dishwashing detergent composition can be in any dry or liquid/aqueous form as disclosed herein, including gels, tablets, or unitized dose articles. Additionally or alternatively, dish care compositions may include compositions directed to the care of dishes, glasses, crockery, cooking pots, pans, utensils, cutlery, and the like in automatic, in-machine washing, including detergents, preparatory post treatment and machine cleaning and maintenance products for both the dishwasher, the utilized water, and its contents. Dish care compositions may include manual/hand dish washing detergents.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The disclosures of all cited patent and non-patent literature are incorporated herein by reference in their entirety.

As used herein, the term "embodiment" or "disclosure" is not meant to be limiting, but applies generally to any of the embodiments defined in the claims or described herein. These terms are used interchangeably herein.

In this disclosure, a number of terms and abbreviations are used. The following definitions apply unless specifically stated otherwise.

The articles "a", "an", and "the" preceding an element or component are intended to be nonrestrictive regarding the number of instances (i.e. occurrences) of the element or component. There "a", "an", and "the" should be read to include one or at least one, and the singular word form of the element or component also includes the plural unless the number is obviously meant to be singular.

The term "comprising" means the presence of the stated features, integers, steps, or components as referred to in the claims, but that it does not preclude the presence or addition of one or more other features, integers, steps, components, or groups thereof. The term "comprising" is intended to include embodiments encompassed by the terms "consisting essentially of" and "consisting of". Similarly, the term "consisting essentially of" is intended to include embodiments encompassed by the term "consisting of".

Where present, all ranges are inclusive and combinable. For example, when a range of "1 to 5" is recited, the recited range should be construed as including ranges "1 to 4", "1 to 3", 1-2", "1-2 and 4-5", "1-3 and 5", and the like.

It is intended that every maximum numerical limitation given throughout this Specification includes every lower numerical limitation, as if such lower numerical limitations were expressly written herein. Every minimum numerical limitation given throughout this Specification will include every higher numerical limitation, as if such higher numerical limitations were expressly written herein. Every numerical range given throughout this Specification will include every narrower numerical range that falls within such broader numerical range, as if such narrower numerical ranges were all expressly written herein.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

As used herein, the term "polysaccharide" means a polymeric carbohydrate molecule composed of long chains of monosaccharide units bound together by glycosidic linkages and on hydrolysis gives the constituent monosaccharides or oligosaccharides.

The terms "percent by weight", "weight percentage (wt %)" and "weight-weight percentage (% w/w)" are used interchangeably herein. Percent by weight refers to the percentage of a material on a mass basis as it is comprised in a composition, mixture or solution.

The term "polysaccharide derivative" as used herein means a chemically modified polysaccharide in which at least some of the hydroxyl groups of the glucose monomer units have been replaced with one or more ether groups. As used herein, the term "polysaccharide derivative" is used interchangeably with "poly alpha-1,6-glucan ether" and "poly alpha-1,6-glucan ether compound".

The term "hydrophobic" refers to a molecule or substituent which is nonpolar and has little or no affinity for water, and which tends to repel water.

The term "hydrophilic" refers to a molecule or a substituent which is polar and has affinity to interact with polar solvents, in particular with water, or with other polar groups. A hydrophilic molecule or substituent tends to attract water.

The "molecular weight" of a poly alpha-1,6-glucan or poly alpha-1,6-glucan ether can be represented as statistically averaged molecular mass distribution, i.e. as number-average molecular weight ($M_n$) or as weight-average molecular weight ($M_w$), both of which are generally given in units of Daltons (Da), i.e. in grams/mole. Alternatively, molecular weight can be represented as DPw (weight average degree of polymerization) or DPn (number average degree of polymerization). Various means are known in the art for calculating these molecular weights from techniques such as high-pressure liquid chromatography (HPLC), size exclusion chromatography (SEC), gel permeation chromatography (GPC), and gel filtration chromatography (GFC).

As used herein, "weight average molecular weight" or "$M_w$" is calculated as $M_w=\Sigma N_i M_i^2/\Sigma N_i M_i$; where $M_i$ is the molecular weight of an individual chain i and $N_i$ is the number of chains of that molecular weight. In addition to using SEC, the weight average molecular weight can be determined by other techniques such as static light scattering, mass spectrometry especially MALDI-TOF (matrix-assisted laser desorption/ionization time-of-flight), small angle X-ray or neutron scattering, and ultracentrifugation.

As used herein, "number average molecular weight" or "$M_n$" refers to the statistical average molecular weight of all the polymer chains in a sample. The number average molecular weight is calculated as $M_n=\Sigma N_i M_i/\Sigma N_i$ where $M_i$ is the molecular weight of a chain i and $N_i$ is the number of chains of that molecular weight. In addition to using SEC, the number average molecular weight of a polymer can be determined by various colligative methods such as vapor pressure osmometry or end-group determination by spectroscopic methods such as proton NMR, FTIR, or UV-vis.

As used herein, number average degree of polymerization (DPn) and weight average degree of polymerization (DPw) are calculated from the corresponding average molecular weights Mw or Mn by dividing by the molar mass of one monomer unit $M_1$. In the case of unsubstituted glucan polymer, $M_1=162$. In the case of a substituted glucan polymer, $M_1=162+M_f \times DoS$, where $M_f$ is the molar mass of the substituent group and DoS is the degree of substitution with respect to that substituent group (average number of substituted groups per one glucose unit).

Glucose carbon positions 1, 2, 3, 4, 5 and 6 as referred to herein are as known in the art and depicted in Structure I:

Structure I

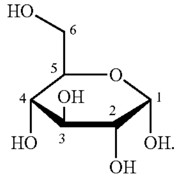

The terms "glycosidic linkage" and "glycosidic bond" are used interchangeably herein and refer to the type of covalent bond that joins a carbohydrate (sugar) molecule to another group such as another carbohydrate. The term "alpha-1,6-glucosidic linkage" as used herein refers to the covalent bond that joins alpha-D-glucose molecules to each other through carbons 1 and 6 on adjacent alpha-D-glucose rings. The term "alpha-1,3-glucosidic linkage" as used herein refers to the covalent bond that joins alpha-D-glucose molecules to each other through carbons 1 and 3 on adjacent alpha-D-glucose rings. The term "alpha-1,2-glucosidic linkage" as used herein refers to the covalent bond that joins alpha-D-glucose molecules to each other through carbons 1 and 2 on adjacent alpha-D-glucose rings. The term "alpha-1,4-glucosidic linkage" as used herein refers to the covalent bond that joins alpha-D-glucose molecules to each other through carbons 1 and 4 on adjacent alpha-D-glucose rings. Herein, "alpha-D-glucose" will be referred to as "glucose".

The glycosidic linkage profile of a glucan, dextran, substituted glucan, or substituted dextran can be determined using any method known in the art. For example, a linkage profile can be determined using methods that use nuclear magnetic resonance (NMR) spectroscopy (e.g., $^{13}C$ NMR or $^{1}H$ NMR). These and other methods that can be used are disclosed in *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, FL, 2005), which is incorporated herein by reference.

The structure, molecular weight, and degree of substitution of a polysaccharide or polysaccharide derivative can be confirmed using various physiochemical analyses known in the art such as NMR spectroscopy and size exclusion chromatography (SEC).

The term "alkyl group", as used herein, refers to linear, branched, aralkyl (such as benzyl), or cyclic ("cycloalkyl")

hydrocarbon groups containing no unsaturation. As used herein, the term "alkyl group" encompasses substituted alkyls, for example alkyl groups substituted with at least one hydroxyalkyl group or dihydroxy alkyl group, as well as alkyl groups containing one or more heteroatoms such as oxygen, sulfur, and/or nitrogen within the hydrocarbon chain.

As used herein, the term "aryl" means an aromatic carbocyclic group having a single ring (e.g., phenyl), multiple rings (e.g., biphenyl), or multiple condensed rings in which at least one is aromatic, (e.g., 1,2,3,4-tetrahydronaphthyl, naphthyl, anthryl, or phenanthryl), which is optionally mono-, di-, or trisubstituted with alkyl groups. By aryl is also meant heteroaryl groups where heteroaryl is defined as 5-, 6-, or 7-membered aromatic ring systems having at least one hetero atom selected from the group consisting of nitrogen, oxygen and sulfur. Examples of heteroaryl groups include pyridyl, pyrimidinyl, pyrrolyl, pyrazolyl, pyrazinyl, pyridazinyl, oxazolyl, furanyl, imidazole, quinolinyl, isoquinolinyl, thiazolyl, and thienyl, which can optionally be substituted with alkyl groups.

The phrase "aqueous composition" herein refers to a solution or mixture in which the solvent is at least about 1% by weight of water and which comprises the poly alpha-1,6-glucan ether.

The terms "hydrocolloid" and "hydrogel" are used interchangeably herein. A hydrocolloid refers to a colloid system in which water is the dispersion medium. A "colloid" herein refers to a substance that is microscopically dispersed throughout another substance. Therefore, a hydrocolloid herein can also refer to a dispersion, emulsion, mixture, or solution of the cationic poly alpha-1,6-glucan ether compound in water or aqueous solution.

The term "aqueous solution" herein refers to a solution in which the solvent is water. The poly alpha-1,6-glucan ether compound can be dispersed, mixed, and/or dissolved in an aqueous solution. An aqueous solution can serve as the dispersion medium of a hydrocolloid herein.

The terms "dispersant" and "dispersion agent" are used interchangeably herein to refer to a material that promotes the formation and stabilization of a dispersion of one substance in another. A "dispersion" herein refers to an aqueous composition comprising one or more particles, for example, any ingredient of a personal care product, pharmaceutical product, food product, household product or industrial product that are scattered, or uniformly distributed, throughout the aqueous composition. It is believed that the cationic poly alpha-1,6-glucan ether compound can act as dispersants in aqueous compositions disclosed herein.

The term "viscosity" as used herein refers to the measure of the extent to which a fluid or an aqueous composition such as a hydrocolloid resists a force tending to cause it to flow.

Various units of viscosity that can be used herein include centipoise (cPs) and Pascal-second (Pa·s). A centipoise is one one-hundredth of a poise; one poise is equal to 0.100 $kg \cdot m^{-1} \cdot s^{-1}$. Thus, the terms "viscosity modifier" and "viscosity-modifying agent" as used herein refer to anything that can alter/modify the viscosity of a fluid or aqueous composition.

The terms "fabric", "textile", and "cloth" are used interchangeably herein to refer to a woven or non-woven material having a network of natural and/or artificial fibers. Such fibers can be thread or yarn, for example.

The terms "cellulase" and "cellulase enzyme" are used interchangeably herein to refer to an enzyme that hydrolyzes β-1,4-D-glucosidic linkages in cellulose, thereby partially or completely degrading cellulose. Cellulase can alternatively be referred to as "β-1,4-glucanase", for example, and can have endocellulase activity (EC 3.2.1.4), exocellulase activity (EC 3.2.1.91), or cellobiase activity (EC 3.2.1.21). A cellulase in certain embodiments herein can also hydrolyze β-1,4-D-glucosidic linkages in cellulose ether derivatives such as carboxymethyl cellulose. "Cellulose" refers to an insoluble polysaccharide having a linear chain of β-1,4-linked D-glucose monomeric units.

As used herein, the term "effective amount" refers to the amount of the substance used or administered that is suitable to achieve the desired effect. The effective amount of material may vary depending upon the application. One of skill in the art will typically be able to determine an effective amount for a particular application or subject without undo experimentation.

The term "resistance to enzymatic hydrolysis" refers to the relative stability of the poly alpha-1,6-glucan ether to enzymatic hydrolysis. Having a resistance to hydrolysis is important for the use of these materials in applications wherein enzymes are present, such as in detergent, fabric care, and/or laundry care applications. The poly alpha-1,6-glucan ether compound may be resistant to cellulases, proteases, amylases, mannanases, or combinations thereof. Resistance to any particular enzyme will be defined as having at least 10, 20, 30, 40, 50, 60, 70, 80, 90, 95 or 100% of the glucan ether materials remaining after treatment with the respective enzyme. The percentage remaining may be determined by measuring the supernatant after enzyme treatment using SEC-HPLC. The assay to measure enzyme resistance can be determined using the following procedure: A sample of the poly alpha-1,6-glucan ether compound is added to water in a vial and mixed using a PTFE magnetic stir bar to create a 1 percent by weight aqueous solution. The aqueous mixture is produced at pH 7.0 and 20° C. After the poly alpha-1,6-glucan ether compound thereof has completely dissolved, 1.0 milliliter (mL) (1 percent by weight of the enzyme formulation) of cellulase (PURADEX® EGL), amylase (PURASTAR® ST L) protease (SAVINASE® 16.0L), or lipase (Lipex® 100L) is added and mixed for 72 hours (hrs) at 20° C. After 72 hrs of stirring, the reaction mixture is heated to 70° C. for 10 minutes to inactivate the added enzyme, and the resulting mixture is cooled to room temperature and centrifuged to remove any precipitate. The supernatant is analyzed by SEC-HPLC for recovered poly alpha-1,6-glucan ether compound and compared to a control where no enzyme was added to the reaction mixture. Percent changes in area counts for the respective poly alpha-1,6-glucan ether compound thereof may be used to test the relative resistance of the materials to the respective enzyme treatment. Percent changes in area versus the total will be used to assess the relative amount of materials remaining after treatment with a particular enzyme. Materials having a percent recovery of at least 10%, preferably at least 50, 60, 70, 80, 90, 95 or 100% may be considered "resistant" to the respective enzyme treatment.

Treatment Composition

The present disclosure relates to treatment compositions. The treatment compositions may include a poly alpha-1,6-glucan ether compound comprising a poly alpha-1,6-glucan substituted with at least one positively charged organic group, and a treatment adjunct ingredient. These components are described in more detail below.

The treatment composition may be a fabric care composition, a dish care composition, or a mixture thereof.

The treatment compositions may be suitable for treating a surface, such as a fabric or a dishware item. Benefits provided by the treatment composition may include improved softness, improved resistance to soil deposition, improved colorfastness, improved wear resistance, improved wrinkle resistance, improved shape retention, improved antifungal activity, improved antimicrobial activity, improved freshness, improved stain resistance, improved cleaning performance when laundered, improved drying rates, improved dye, pigment or lake update, improved whiteness retention, improved anti-graying benefits, improved anti-soil redeposition benefits, or a combination thereof. In particular, such compositions may provide softness, care, and/or freshness benefits to such surfaces. The compositions may be intended to treat surfaces, such as fabrics, through the wash cycle and/or the rinse cycle of an automatic washing machine.

Such compositions may be used as a pre-laundering treatment, a post-laundering treatment, or may be added during the rinse or wash cycle of the laundering operation, or even during a drying process or finishing a garment. Such compositions may be applied to a fabric in between usage of the fabric, such as between wearing of a garment. The treatment compositions disclosed herein may be used in a domestic setting (e.g., in-home use by a consumer) or used in commercial services (e.g., a professional dry cleaners). The treatment compositions may by suitable for use in out-of-home settings (e.g., laundering of university, hospital, hotel, or restaurant-related textiles).

The treatment composition may be in any suitable form. The treatment composition may be in the form of a liquid composition, a granular composition, a hydrocolloid, a single-compartment pouch, a multi-compartment pouch, a dissolvable sheet, a pastille or bead or particle, a fibrous article (which may be water-soluble or water-dispersible, or substantially non-soluble/non-dispersible), a tablet, a stick, a bar, a flake, a foam/mousse, a non-woven sheet (e.g., a dryer sheet), a spray or a mixture thereof. The composition can be selected from a liquid, solid, or combination thereof. The composition may be in the form of a liquid fabric enhancer, a foam/mousse, a dryer sheet, or a pastille/bead/particle.

The composition may be in the form of a liquid. The composition may include water. The composition may be aqueous. The composition, which may be a liquid composition, may comprise at least 50% by weight of water, preferably at least 75%, or even more than 85%, or even more than 90%, or even more than 95%, by weight of water. The composition may comprise from about 10% to about 97%, by weight of the composition, of water, preferably from about 10% to about 90%, more preferably from about 25% to about 80%, more preferably from about 45% to about 70%. The liquid composition may be a liquid laundry detergent or a liquid fabric enhancer. The liquid may be packaged in a pourable bottle. The liquid may be packaged in an aerosol can or other spray bottle.

The composition may be a non-aqueous composition. The composition may comprise less than 20% water, or less than 15% water, or less than 12% water, or less than 10% water, or less than 8% water, or less than 5% water, or less than 3% water, or less than 1% water. Such compositions may be preferred so as to minimize the energy required to transport water, e.g., for environmental reasons. Such non-aqueous compositions may be liquids, gels, or solids (including granules/powders, particles, and/or dissolvable sheets or webs). In non-aqueous compositions, the poly alpha-1,6-glucan ether compound may be in particulate form.

The composition may be in the form of a unitized dose article, such as a tablet, a pouch, a sheet, or a fibrous article. Such pouches typically include a water-soluble film that at least partially encapsulates a composition. The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The composition may be in the form of a solid, preferably in the form of particles, such as a pastille or bead. Suitable particles may comprise the poly alpha-1,6-glucan ether compound dispersed in a water-soluble carrier. Individual particles may have a mass from about 1 mg to about 1 g. The water-soluble carrier may be a water-soluble polymer. The water-soluble carrier may be selected from the group consisting of polyethylene glycol, sodium acetate, sodium bicarbonate, sodium chloride, sodium silicate, polypropylene glycol polyoxoalkylene, polyethylene glycol fatty acid ester, polyethylene glycol ether, sodium sulfate, starch, and mixtures thereof. The composition may comprise from about 25% to about 99.99% by weight of the water-soluble carrier, and from about 0.01% to about 30% by weight of the poly alpha-1,6-glucan ether compound. The particles may further comprise an additional benefit agent, such as perfume, a conditioning agent (e.g., a quaternary ammonium compound and/or a silicone), or mixtures thereof. The particles may be first particles and may be part of a plurality of particles that further comprise second particles. The plurality of particles may include first particles and second particles, where the particles that comprise the poly alpha-1,6-glucan ether compound are the first particles, and wherein the second particles comprise a different benefit agent, such as perfume, which may be unencapsulated perfume, encapsulated perfume, or a mixture thereof. The particles may be used in combination with a detergent composition, for example concurrently during a wash cycle, or subsequently during a rinse cycle.

The fabric care composition may have a viscosity of from 1 to 1500 centipoises (1-1500 mPa*s), or from 100 to 1000 centipoises (100-1000 mPa*s), or from 100 to 500 centipoises (100-500 mPa*s), or from 100 to 300 centipoises (100-300 mPa*s), or from 100 to 200 centipoises (100-200 mPa*s) at 20 $s^{-1}$ and 21° C. Viscosity is determined according to the Brookfield test method provided below. Relatively lower viscosities may be preferred to facilitate ease of dispensing and/or low machine residue.

The fabric care compositions of the present disclosure may be characterized by a pH of from about 2 to about 12, or from about 2 to about 8.5. Laundry detergent compositions typically have a pH of from about 6.5 to about 9.0, or from about 7 to about 8.5. Liquid fabric enhancers typically have a pH of from about 2 to about 6, or from about 2 to about 5, or from about 2 to about 4, or from about 2 to about 3.7, more preferably a pH from about 2 to about 3.5, preferably in the form of an aqueous liquid. It is believed that such pH levels facilitate stability of the quaternary ammonium ester compound. The pH of a composition is determined by dissolving/dispersing the composition in deionized water to form a solution at 10% concentration, at about 20° C.

Certain components of the treatment compositions are described in more detail below.

Poly Alpha-1,6-Glucan Ether Compound

The treatment compositions of the present disclosure comprise a poly alpha-1,6-glucan ether compound that is cationically substituted.

More specifically, the poly alpha-1,6-glucan ether compound comprises a poly alpha-1,6-glucan substituted with at least one positively charged organic group, where the poly alpha-1,6-glucan comprises a backbone of glucose monomer units, where at least 65% of the glucose monomer units are linked via alpha-1,6-glycosidic linkages. The poly alpha-1,6-glucan ether compound may be characterized by (a) a weight average degree of polymerization of at least 5; (b) a weight average molecular weight of from about 1000 to about 500,000 daltons; and/or (c) having been derived from a poly alpha-1,6-glucan having a weight average molecular weight of from about 900 to about 450,000 daltons, determined prior to substitution with the least one positively charged organic group. The poly alpha-1,6-glucan ether compound may be characterized by a degree of substitution of about 0.001 to about 3.0. Optionally, at least 5%, preferably from about 5% to about 50%, more preferably from about 5% to about 35%, of the backbone glucose monomer units have branches via alpha-1,2 and/or alpha-1,3-glycosidic linkages. These compounds, groups, and properties are described in more detail below.

The poly alpha-1,6-glucan ether compounds disclosed herein comprise poly alpha-1,6-glucan substituted with at least one positively charged organic group, wherein the organic group or groups are independently linked to the poly alpha-1,6-glucan polysaccharide backbone and/or to any branches, if present, through an ether (—O—) linkage. The at least one positively charged organic group can derivatize the poly alpha-1,6-glucan at the 2, 3, and/or 4 glucose carbon position(s) of a glucose monomer on the backbone of the glucan, and/or at the 1, 2, 3, 4, or 6 glucose carbon position(s) of a glucose monomer on a branch, if present. At unsubstituted positions a hydroxyl group is present in a glucose monomer.

The poly alpha-1,6-glucan ether compounds disclosed herein are referred to as "cationic" ether compounds due to the presence of one or more positively charged organic groups. The terms "positively charged organic group", "positively charged ionic group", and "cationic group" are used interchangeably herein. A positively charged group comprises a cation (a positively charged ion). Examples of positively charged groups include substituted ammonium groups, carbocation groups, and acyl cation groups.

The cationic poly alpha-1,6-glucan ether compounds disclosed herein comprise water-soluble poly alpha-1,6-glucan comprising a backbone of glucose monomer units wherein at least 65% of the glucose monomer units are linked via alpha-1,6-glycosidic linkages, and optionally at least 5% of the backbone glucose monomer units have branches via alpha-1,2 and/or alpha-1,3-glycosidic linkages. The poly alpha-1,6-glucan is substituted with positively charged organic groups on the polysaccharide backbone and/or on any branches which may be present, such that the poly alpha-1,6-glucan ether compound comprises unsubstituted and substituted alpha-D-glucose rings. The poly alpha-1,6-glucan may be randomly substituted with positively charged organic groups. As used herein, the term "randomly substituted" means the substituents on the glucose rings in the randomly substituted polysaccharide occur in a non-repeating or random fashion. That is, the substitution on a substituted glucose ring may be the same or different (i.e. the substituents, which may be the same or different, on different atoms in the glucose rings in the polysaccharide) from the substitution on a second substituted glucose ring in the polysaccharide, such that the overall substitution on the polymer has no pattern. Further, the substituted glucose rings may occur randomly within the polysaccharide (i.e., there is no pattern with the substituted and unsubstituted glucose rings within the polysaccharide).

Depending on reaction conditions and the specific substituent used to derivatize the poly alpha-1,6-glucan, the glucose monomers of the polymer backbone may be disproportionately substituted relative to the glucose monomers of any branches, including branches via alpha-1,2 and/or alpha-1,3 linkages, if present. The glucose monomers of the branches, including branches via alpha-1,2 and/or alpha-1,3 linkages, if present, may be disproportionately substituted relative to the glucose monomers of the polymer backbone. Depending on reaction conditions and the specific substituent used, substitution of the poly alpha-1,6-glucan may occur in a block manner.

Depending on reaction conditions and the specific substituent used to derivatize the poly alpha-1,6-glucan, it is possible that the hydroxyl groups at certain glucose carbon positions may be disproportionately substituted. For example, the hydroxyl at carbon position 6 for a branched unit may be more substituted than the hydroxyls at other carbon positions. The hydroxyl at carbon position 2, 3, or 4 may be more substituted than the hydroxyls at other carbon positions.

The poly alpha-1,6-glucan ether compounds disclosed herein contain positively charged organic groups and are of interest due to their solubility characteristics in water, which can be varied by appropriate selection of substituents and the degree of substitution. Compositions comprising the poly alpha-1,6-glucan ether compounds can be useful in a wide range of applications, including laundry, cleaning, food, cosmetics, industrial, film, and paper production. Poly alpha-1,6-glucan ether compounds having greater than 0.1 weight percent (wt %) solubility in water can be useful as rheology modifiers, emulsion stabilizers, and dispersing agents in cleaning, detergent, cosmetics, food, cement, film, and paper production, wherein the products are in a primarily water based formulation and optical clarity is desired. Poly alpha-1,6-glucan ether compounds having less than 0.1 wt % solubility in water can be useful as rheology modifiers, emulsion stabilizers, and dispersing agents in cleaning, detergent, cosmetics, food, cement, film, and paper production, wherein the products are in formulations which contain organic solvents to solubilize or disperse the poly alpha-1,6-glucan derivatives. The poly alpha-1,6-glucan ether compound may have a DoS of about 0.001 to about 1.5 and a solubility of 0.1% by weight or higher in deionized water at 25° C. The poly alpha-1,6-glucan ether compound may have a DoS of about 0.05 to about 1.5 and a solubility of less than 0.1% by weight in pH 7 water at 25° C. Poly alpha-1,6-glucan ether compounds having a solubility of at least 0.1%, or at least 1%, or at least 10%, or at least 25%, or at least 50%, or at least 75%, or at least 90%, by weight, in deionized water at 25° C. may be preferred for use in fabric care or dish care compositions, due to ease of processing and/or increased solubility in aqueous end-use conditions.

The cationic poly alpha-1,6-glucan ether compounds disclosed herein can be comprised in a fabric care and/or dish care composition in an effective amount, for example an amount that provides a desired degree of one or more of the following physical properties to the product or to the end-use: thickening, freeze/thaw stability, lubricity, moisture retention and release, texture, consistency, shape retention, emulsification, binding, suspension, dispersion, and/or gelation. Effective amounts may also be selected to provide treatment benefits in the desired end-use of the composition, for example deposition benefits, freshness benefits, softness or other conditioning benefits, color benefits, stain removal benefits, whiteness or anti-graying benefits, shine benefits, anti-streak benefits, and/or squeaky surface benefits.

Treatment compositions of the present disclosure may comprise from about 0.01% to about 10%, or from about 0.05% to about 5%, or from about 0.1% to about 3%, or from about 0.1% to about 2%, or from about 0.1% to about 1%, or from about 0.1% to about 0.8%, by weight of the treatment composition, of the poly alpha-1,6-glucan ether compound. The treatment composition may comprise from about 0.2% to about 3%, or from about 0.3 to about 2%, or from about 0.4% to about 1%, by weight of the treatment composition, of the poly alpha-1,6-glucan ether compound.

The poly alpha-1,6-glucan ether compounds of the present disclosure comprise a substituted poly alpha-1,6-glucan, and are typically made from a poly alpha-1,6-glucan starting material. The terms "poly alpha-1,6-glucan" and "dextran" are used interchangeably herein. Dextrans represent a family of complex, branched alpha-glucans generally comprising chains of alpha-1,6-linked glucose monomers, with periodic side chains (branches) linked to the straight chains by alpha-1,3-linkage (Joan et al., *Macromolecules* 33:5730-5739) or alpha-1,2-linkage. Production of dextrans is typically done through fermentation of sucrose with bacteria (e.g., *Leuconostoc* or *Streptococcus* species), where sucrose serves as the source of glucose for dextran polymerization (Naessens et al., *J. Chem. Technol. Biotechnol.* 80:845-860; Sarwat et al., *Int. J. Biol. Sci.* 4:379-386; Onilude et al., *Int. Food Res. J.* 20:1645-1651). Poly alpha-1,6-glucan can be prepared using glucosyltransferases such as (but not limited to) GTF1729, GTF1428, GTF5604, GTF6831, GTF8845, GTF0088, and GTF8117 as described in WO2015/183714 and WO2017/091533, both of which are incorporated herein by reference.

The cationic poly alpha-1,6-glucan ether compound may comprise a backbone of glucose monomer units wherein greater than or equal to 40% of the glucose monomer units are linked via alpha-1,6-glycosidic linkages, for example greater than or equal to 40%, 45%, 50%, 55%, 60%, 65%, 70%, 75%, 80%, 90%, or 95% of the glucose monomer units. The backbone of the cationic poly alpha-1,6-glucan ether compound can comprise at least: 3%, 5%, 10%, 15%, 20%, 25%, 30%, 35%, 40%, 45%, 50%, 55%, or 60%, glucose monomer units which are linked via alpha-1,2, alpha-1,3, and/or alpha-1,4 glycosidic linkages. The cationic poly alpha-1,6-glucan ether compound may comprise a backbone of glucose monomer units wherein at least 65% of the glucose monomer units are linked via alpha-1,6-glycosidic linkages. The cationic poly alpha-1,6-glucan ether compound may comprise a backbone of glucose monomer units wherein at least 70% of the glucose monomer units are linked via alpha-1,6-glycosidic linkages. The cationic poly alpha-1,6-glucan ether compound may comprise a backbone of glucose monomer units wherein at least 80% of the glucose monomer units are linked via alpha-1,6-glycosidic linkages. The cationic poly alpha-1,6-glucan ether compound may comprise a backbone of glucose monomer units wherein at least 90% of the glucose monomer units are linked via alpha-1,6-glycosidic linkages. The cationic poly alpha-1,6-glucan ether compound may comprise a backbone of glucose monomer units wherein at least 95% of the glucose monomer units are linked via alpha-1,6-glycosidic linkages. The cationic poly alpha-1,6-glucan ether compound may comprise a backbone of glucose monomer units wherein at least 99.5% of the glucose monomer units are linked via alpha-1,6-glycosidic linkages. The poly alpha-1,6-glucan ether compound may be predominantly linear.

Dextran "long chains" can comprise "substantially (or mostly) alpha-1,6-glucosidic linkages", meaning that they can have at least about 98.0% alpha-1,6-glucosidic linkages in some aspects. Dextran herein can comprise a "branching structure" (branched structure) in some aspects. It is contemplated that in this structure, long chains branch from other long chains, likely in an iterative manner (e.g., a long chain can be a branch from another long chain, which in turn can itself be a branch from another long chain, and so on). It is contemplated that long chains in this structure can be "similar in length", meaning that the length (e.g., measured by DP/degree of polymerization) of at least 70% of all the long chains in a branching structure is within plus/minus 30% of the mean length of all the long chains of the branching structure.

Dextran may further comprise "short chains" branching from the polysaccharide backbone, the branches typically being one to three glucose monomers in length, and typically comprising less than about 10% of all the glucose monomers of a dextran polymer. Such short chains typically comprise alpha-1,2-, alpha-1,3-, and/or alpha-1,4-glucosidic linkages (it is understood that there can also be a small percentage of such non-alpha-1,6 linkages in long chains in some aspects). The amount of alpha-1,2-branching or alpha-1,3-branching can be determined by NMR methods, as disclosed in the Test Methods.

Dextran can be produced enzymatically prior to being modified with alpha-1,2 or alpha-1,3 branches. In certain embodiments, dextran can be synthesized using a dextransucrase and/or methodology as disclosed in WO 2015/183714 or WO 2017/091533 or published application US 2018/0282385, which are all incorporated herein by reference. The dextransucrase identified as GTF8117, GTF6831, or GTF5604 in these references can be used, if desired (or any dextransucrase comprising an amino acid sequence that is at least about 90%, 91%, 92%, 93%, 94%, 95%, 96%, 97%, 98%, or 99% identical to any of these particular dextransucrases). Such enzymatically produced dextran is linear (i.e. 100% alpha-1,6-linkages) and aqueous soluble.

The poly-1,6-glucan with branching can be produced enzymatically according to the procedures in WO 2015/183714 and WO 2017/091533 where, for example, alpha-1,2-branching enzymes such as "gtfJ18T1" or "GTF9905" can be added during or after the production of the dextran polymer (polysaccharide). It may be that any other enzyme known to produce alpha-1,2-branching can be added. For example, poly-1,6-glucan with alpha-1,3-branching can be prepared as disclosed in Vuillemin et al. (2016*, J. Biol Chem.* 291:7687-7702) or U.S. Appl. No. 62/871,796, which are incorporated herein by reference. The degree of branching of poly alpha-1,6-glucan or its derivative has less than or equal to 50%, 40%, 30%, 20%, 10%, or 5% (or any value between 5% and 50%) of short branching, for example alpha-1,2-branching, 1,3-branching, or both alpha-1,2-branching and alpha-1,3-branching. The degree of branching in a poly alpha-1,6-glucan starting material is maintained in a branched poly alpha-1,6-glucan ether formed by etherification of the branched poly alpha-1,6-glucan. The amount of alpha-1,2-branching or alpha-1,3-branching can be determined by NMR methods, as disclosed in the Test Methods below.

Without wishing to be bound by theory, it is believed that branching can increase the solubility of the poly alpha-1,6-glucan ether compound, which can lead to more convenient processability and/or transport. It is also believed that limits on the degree of branching can lead to improved performance in the final treatment composition.

A poly alpha-1,6-glucan ether compound may have a degree of alpha-1,2-branching that is less than 50%. A poly alpha-1,6-glucan ether compound may have a degree of alpha-1,2-branching that is at least 5%. From about 5% to about 50% of the backbone glucose monomer units of a poly alpha-1,6-glucan ether compound may have branches via alpha-1,2 or alpha-1,3 glycosidic linkages. From about 5% to about 35% of the backbone glucose monomer units of a poly alpha-1,6-glucan ether compound may have branches via alpha-1,2 or alpha-1,3 glycosidic linkages.

At least about 5% of the backbone glucose monomer units of a poly alpha-1,6-glucan ether compound may have branches via alpha-1,2- or alpha-1,3-glycosidic linkages. A poly alpha-1,6-glucan ether compound may comprise a backbone of glucose monomer units wherein greater than or equal to 65% of the glucose monomer units are linked via alpha-1,6-glycosidic linkages. A poly alpha-1,6-glucan ether compound may comprise a backbone of glucose monomer units wherein greater than or equal to 65% of the glucose monomer units are linked via alpha-1,6-glycosidic linkages and at least 3%, preferably at least 5%, more preferably from about 5% to about 30%, even more preferably from about 5% to about 25%, even more preferably from about 5% to about 20%, of the glucose monomer units have branches via alpha-1,2- or alpha-1,3-glycosidic linkages. A poly alpha-1,6-glucan ether compound may comprise a backbone of glucose monomer units wherein greater than or equal to 65% of the glucose monomer units are linked via alpha-1,6-glycosidic linkages and at least 5% of the glucose monomer units have branches via alpha-1,2 linkages. A poly alpha-1,6-glucan ether compound may comprise a backbone of glucose monomer units wherein greater than or equal to 65% of the glucose monomer units are linked via alpha-1,6-glycosidic linkages and at least 5% of the glucose monomer units have branches via alpha-1,3 linkages. A poly alpha-1,6-glucan ether compound may comprise a backbone of glucose monomer units wherein greater than or equal to 65% of the glucose monomer units are linked via alpha-1,6-glycosidic linkages and from about 5% to about 50% of the glucose monomer units have branches via alpha-1,2- or alpha-1,3-glycosidic linkages. A poly alpha-1,6-glucan ether compound may comprise a backbone of glucose monomer units wherein greater than or equal to 70% of the glucose monomer units are linked via alpha-1,6-glycosidic linkages and from about 5% to about 35% of the glucose monomer units have branches via alpha-1,2- or alpha-1,3-glycosidic linkages.

A poly alpha-1,6-glucan ether compound may comprise a backbone of glucose monomer units wherein greater than or equal to 90% of the glucose monomer units are linked via alpha-1,6-glycosidic linkages. A poly alpha-1,6-glucan ether compound may comprise a backbone of glucose monomer units wherein greater than or equal to 90% of the glucose monomer units are linked via alpha-1,6-glycosidic linkages and at least 5% of the glucose monomer units have branches via alpha-1,2- or alpha-1,3-glycosidic linkages. A poly alpha-1,6-glucan ether compound may comprise a backbone of glucose monomer units wherein greater than or equal to 90% of the glucose monomer units are linked via alpha-1,6-glycosidic linkages and at least 5% of the glucose monomer units have branches via alpha-1,2 linkages. A poly alpha-1,6-glucan ether compound may comprise a backbone of glucose monomer units wherein greater than or equal to 90% of the glucose monomer units are linked via alpha-1,6-glycosidic linkages and at least 5% of the glucose monomer units have branches via alpha-1,3 linkages. A poly alpha-1,6-glucan ether compound may comprise a backbone of glucose monomer units wherein greater than or equal to 90% of the glucose monomer units are linked via alpha-1,6-glycosidic linkages and from about 5% to about 50% of the glucose monomer units have branches via alpha-1,2- or alpha-1,3-glycosidic linkages. A poly alpha-1,6-glucan ether compound may comprise a backbone of glucose monomer units wherein greater than or equal to 90% of the glucose monomer units are linked via alpha-1,6-glycosidic linkages and from about 5% to about 35% of the glucose monomer units have branches via alpha-1,2- or alpha-1,3-glycosidic linkages.

The poly alpha-1,6-glucan and poly alpha-1,6-glucan ether compounds disclosed herein can have a number average degree of polymerization (DPn) in the range of 5 to 6000. The DPn can be in the range of from 5 to 100, or from 5 to 500, or from 5 to 1000, or from 5 to 1500, or from 5 to 2000, or from 5 to 2500, or from 5 to 3000, or from 5 to 4000, or from 5 to 5000, or from 5 to 6000. The DPn can be in the range of from 50 to 500, or from 50 to 1000, or from 50 to 1500, or from 50 to 2000, or from 50 to 3000, or from 50 to 4000, or from 50 to 5000, or from 50 to 6000.

The poly alpha-1,6-glucan and poly alpha-1,6-glucan ether compounds disclosed herein can have a weight average degree of polymerization (DPw) in the range of at least 5. The DPw can be in the range of from 5 to 6000, or from 50 to 5000, or from 100 to 4000, or from 250 to 3000, or from 500 to 2000, or from 750 to 1500, or from 1000 to 1400, or from 1100 to 1300. The DPw can be in the range of from 400 to 6000, or from 400 to 5000, or from 400 to 4000, or from 400 to 3000, or from 400 to 2000, or from 400 to 1500.

The poly alpha-1,6-glucan ether compounds disclosed herein can have a weight average molecular weight of from about 1000 to about 500,000 daltons, or from about 10,000 to about 400,000 daltons, or from about 40,000 to about 300,000 daltons, or from about 80,000 to about 300,000 daltons, or from about 100,000 to about 250,000 daltons, or from about 150,000 to about 250,000 daltons, or from about 180,000 to about 225,000 daltons, or from about 180,000 to about 200,000 daltons. The poly alpha-1,6-glucan ether compounds disclosed herein may preferably have a weight average molecular weight of from about 60,000 to about 500,000, preferably from about 80,000 to about 500,000, more preferably from about 100,000 to about 500,000, more preferably from about 100,000 to about 400,000, more preferably from about 100,000 to about 300,000, more preferably from about 125,000 to about 300,000, even more preferably from about 150,000 to about 300,000 daltons. It may be that differently sized polymers may be preferred for different applications and/or intended benefits.

The poly alpha-1,6-glucan ether compounds disclosed herein can be derived from a poly alpha-1,6-glucan having a weight average molecular weight of from about 900 to about 450,000 daltons, determined prior to substitution with the least one positively charged organic group. The poly alpha-1,6-glucan ether compounds disclosed herein can be derived from a poly alpha-1,6-glucan having a weight average molecular weight of from about 5000 to about 400,000 daltons, or from about 10,000 to about 350,000 daltons, or from about 50,000 to about 350,000 daltons, or from about 90,000 to about 300,000 daltons, or from about 125,000 to about 250,000 daltons, or from about 150,000 to about 200,000 daltons. The poly alpha-1,6-glucan ether compounds disclosed herein can be derived from a poly alpha-1,6-glucan having a weight average molecular weight of from about 50,000 to about 450,000 daltons, preferably from about 60,000 to about 450,000, more preferably from about 80,000 to about 450,000, more preferably from about 100,000 to about 450,000, more preferably from about 100,000 to about 400,000, more preferably from about 100,000 to about 300,000, more preferably from about 100,000 to about 250,000 daltons. Differently sized feedstock or backbone polymers may be preferred for different applications, or depending on the intended degree of substitution.

For performance and/or stability reasons in certain applications, it may be desirable for the cationic polymer to have a relatively low molecular weight and a relatively high degree of branching. For example, the poly alpha-1,6-glucan ether compounds disclosed herein may be characterized by (a) a weight average molecular weight of from about 1000 to about 150,000 daltons, preferably from about 5000 to about 100,000 daltons, more preferably from about 10,000 to about 80,000 daltons, more preferably from about 20,000 to about 60,000 daltons, (b) a backbone of glucose monomer units wherein greater than or equal to 65% of the glucose monomer units are linked via alpha-1,6-glycosidic linkages, (c) from about 20% to about 60%, preferably from about 30% to about 60%, more preferably from about 30% to about 50%, even more preferably from about 35% to about 45%, even more preferably about 40%, of the glucose monomer units have branches via alpha-1,2- or alpha-1,3-glycosidic linkages, preferably alpha-1,2-glycosidic linkages, and (d) a degree of cationic substitution of about 0.001 to about 3.0.

The term "degree of substitution" (DoS) as used herein refers to the average number of hydroxyl groups substituted in each monomeric unit (glucose) of a cationic poly alpha-1,6-glucan ether compound, which includes the monomeric units within the backbone and within any alpha-1,2 or alpha-1,3 branches which may be present. Since there are at most three hydroxyl groups in a glucose monomeric unit in a poly alpha-1,6-glucan polymer or cationic poly alpha-1,6-glucan ether compound, the overall degree of substitution can be no higher than 3. It would be understood by those skilled in the art that, since a cationic poly alpha-1,6-glucan ether compound as disclosed herein can have a degree of substitution between about 0.001 to about 3.0, the substituents on the polysaccharide cannot only be hydroxyl. The degree of substitution of a poly alpha-1,6-glucan ether compound can be stated with reference to a specific substituent or with reference to the overall degree of substitution, that is, the sum of the DoS of each different substituent for an ether compound as defined herein. As used herein, when the degree of substitution is not stated with reference to a specific substituent or substituent type, the overall degree of substitution of the cationic poly alpha-1,6-glucan ether compound is meant. The degree of substation may be a cationic degree of substitution, or even a net cationic degree of substitution. The target DoS can be chosen to provide the desired solubility and performance of a composition comprising a cationic poly alpha-1,6-glucan ether compound in the specific application of interest.

The cationic poly alpha-1,6-glucan ether compounds of the present disclosure may be characterized by a relatively low degree of non-cationic substitutions. For example, the compounds may be characterized by a DoS with respect to substitutions that are not cationic of less than about 1.0, preferably less than about 0.5, more preferably less than about 0.2, even more preferably less than about 0.1. The compounds of the present disclosure may be characterized by a DoS with respect to relatively hydrophobic substitutions that are not cationic of less than about about 1.0, preferably less than about 0.5, more preferably less than about 0.2, even more preferably less than about 0.1. The compounds of the present disclosure may be characterized by a DoS with respect to benzyl group substitutions of less than about 1.0, preferably less than about 0.5, more preferably less than about 0.2, even more preferably less than about 0.1, more preferably less than 0.05, even more preferably 0.0 (e.g., no benzyl substitutions).

Cationic poly alpha-1,6-glucan ether compounds disclosed herein may have a DoS with respect to a positively charged organic group in the range of about 0.001 to about 3. A cationic poly alpha-1,6-glucan ether may have a DoS of about 0.01 to about 1.5. The poly alpha-1,6-glucan ether may have a DoS of about 0.01 to about 0.7. The poly alpha-1,6-glucan ether may have a DoS of about 0.01 to about 0.4. The poly alpha-1,6-glucan ether may have a DoS of about 0.01 to about 0.2. The DoS of the poly alpha-1,6-glucan ether compound can be at least about 0.001, 0.005, 0.1, 0.15, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. The DoS may be from about 0.01 to about 1.5, preferably from about 0.01 to about 1.0, more preferably from about 0.01 to about 0.8, more preferably from about 0.03 to about 0.7, or from about 0.04 to about 0.6, or from about 0.05 to about 0.5. For performance reasons in through-the-wash applications (e.g., a laundry detergent used in a wash cycle), it may be preferable for the DoS to be from about 0.01 to about 0.5, or from about 0.01 to about 0.25, or from about 0.01 to about 0.2, or from about 0.03 to about 0.15, or from about 0.04 to about 0.12. For performance reasons in through-the-rinse applications (e.g., a liquid fabric enhancer used in a rinse cycle), it may be preferably for the DoS to be from about 0.01 to about 1, or from about 0.03 to about 0.8, or from about 0.04 to about 0.7, or from about 0.05 to about 0.6, or from about 0.2 to about 0.8, or from about 0.2 to about 0.6, or from about 0.3 to about 0.6, or from about 0.4 to about 0.6. The DoS of the poly alpha-1,6-glucan may be from 0.01 to about 0.6, more preferably from 0.02 to about 0.5.

The cationic poly alpha-1,6-glucan ether compounds of the present disclosure may be characterized by a cationic charge density. Cationic charge density may be expressed as milliequivalents of charge per gram of compound (meq/mol) and may be determined according to the method provided in the Test Methods section. The cationic poly alpha-1,6-glucan ether compounds of the present disclosure may be characterized by a cationic charge density (or "CCD") of from about 0.05 to about 12 meq/g, or from about 0.1 to about 8 meq/g, or from about 0.1 to about 4 meq/g, or from about 0.1 to about 3 meq/g, or from about 0.1 to about 2.6 meq/g.

A positively charged organic group comprises a chain of one or more carbons having one or more hydrogens substituted with another atom or functional group, wherein one or more of the substitutions is with a positively charged group. The term "chain" as used herein encompasses linear, branched, and cyclic arrangements of carbon atoms, as well as combinations thereof.

The poly alpha-1,6-glucan derivative comprises poly alpha-1,6-glucan substituted with at least one positively charged organic group on the polysaccharide backbone and/or on one or more of the optional branches. When substitution occurs on a glucose monomer contained in the backbone, the polysaccharide is derivatized at the 2, 3, and/or 4 glucose carbon position(s) with an organic group as defined herein which is linked to the polysaccharide through an ether (—O—) linkage in place of the hydroxyl group originally present in the underivatized (unsubstituted) poly alpha-1,6-glucan. When substitution occurs on a glucose monomer contained in a branch, the polysaccharide is derivatized at the 1, 2, 3, 4, or 6 glucose carbon position(s) with a positively charged organic group as defined herein which is linked to the polysaccharide through an ether (—O—) linkage.

A poly alpha-1,6-glucan ether compound as disclosed herein is termed a glucan "ether" herein by virtue of comprising the substructure $—C_G—O—C_R—$, wherein "$—C_G—$" represents a carbon of a glucose monomer unit of a poly alpha-1,6-glucan ether compound, and wherein "$—C_R—$" is comprised in the positively charged organic group. A cationic poly alpha-1,6-glucan monoether contains one type of a positively charged organic group. A cationic poly alpha-1,6-glucan mixed ether contains two or more types of positively charged organic groups. Mixtures of cationic poly alpha-1,6-glucan ether compounds can also be used.

Treatment compositions disclosed herein can comprise, or consist essentially of, one or more cationic poly alpha-1,6-glucan ether compounds as disclosed herein. A treatment composition may comprise one poly alpha-1,6-glucan ether compound. A treatment composition may comprise two or more poly alpha-1,6-glucan ether compounds, for example wherein the positively charged organic groups are different.

A treatment composition may comprise one or more cationic poly alpha-1,6-glucan ether compounds as disclosed herein, and may further comprise unsubstituted and/or non-cationic poly alpha-1,6-glucan compounds, which may be residual reactants that are unreacted/unsubstituted, or may have hydrolyzed. Typically, a low level of unsubstituted/non-cationic poly alpha-1,6-glucan compounds is preferred, as low levels may be indicative of reaction completeness with regard to the substitution, and/or chemical stability of the compounds in the treatment composition. The weight ratio of the cationic poly alpha-1,6-glucan ether compounds to unsubstituted/non-cationic poly alpha 1,6-glucan compounds may be 95:5 or greater, preferably 98:2 or greater, more preferably 99:1 or greater.

A "positively charged organic group" as used herein refers to a chain of one or more carbons that has one or more hydrogens substituted with another atom or functional group, wherein one or more of the substitutions is with a positively charged group. A positively charged group is typically bonded to the terminal carbon atom of the carbon chain. A positively charged organic group is considered to have a net positive charge since it comprises one or more positively charged groups, and comprises a cation (a positively charged ion). An organic group or compound that is "positively charged" typically has more protons than electrons and is repelled from other positively charged substances, but attracted to negatively charged substances. An example of a positively charged groups includes a substituted ammonium group. A positively charged organic group may have a further substitution, for example with one or more hydroxyl groups, oxygen atoms (forming a ketone group), alkyl groups, and/or at least one additional positively charged group.

A positively charged organic group may comprise a substituted ammonium group, which can be represented by Structure II:

Structure II

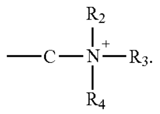

In Structure II, $R_2$, $R_3$ and $R_4$ may each independently represent a hydrogen atom, an alkyl group, or a $C_6$-$C_{24}$ aryl group. The carbon atom (C) shown in Structure II is part of the carbon chain of the positively charged organic group. The carbon atom is either directly ether-linked to a glucose monomer of poly alpha-1,6-glucan, or is part of a chain of two or more carbon atoms ether-linked to a glucose monomer of poly alpha-1,6-glucan. The carbon atom shown in Structure II can be $—CH_2—$, —CH— (where a H is substituted with another group such as a hydroxy group), or —C— (where both H's are substituted).

When $R_2$, $R_3$ and/or $R_4$ represent an alkyl group, the alkyl group can be a $C_1$-$C_{30}$ alkyl group, for example a methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, $C_{25}$, $C_{26}$, $C_{27}$, $C_{28}$, $C_{29}$, or $C_{30}$ group. The alkyl group can be a $C_1$-$C_{24}$ alkyl group, or a $C_1$-$C_{18}$ or a $C_6$-$C_{20}$ alkyl group, or a $C_{10}$-$C_{16}$ alkyl group, or a $C_1$-$C_4$ alkyl group. When a positively charged organic group comprises a substituted ammonium group which has two or more alkyl groups, each alkyl group can be the same as or different from the other.

When $R_2$, $R_3$ and/or $R_4$ represent an aryl group, the aryl group can be a $C_6$-$C_{24}$ aryl group, optionally substituted with alkyl substituents. The aryl group can be a $C_{12}$-$C_{24}$ aryl group, optionally substituted with alkyl substituents, or a $C_6$-$C_{18}$ aryl group, optionally substituted with alkyl substituents.

A substituted ammonium group can be a "primary ammonium group", "secondary ammonium group", "tertiary ammonium group", or "quaternary ammonium" group, depending on the composition of $R_2$, $R_3$ and $R_4$ in Structure II. A primary ammonium group is an ammonium group represented by Structure II in which each of $R_2$, $R_3$ and $R_4$ is a hydrogen atom (i.e., $—C—NH_3^+$).

A secondary ammonium group is an ammonium group represented by Structure II in which each of $R_2$ and $R_3$ is a hydrogen atom and $R_4$ is a $C_1$-$C_{30}$ alkyl group or a $C_6$-$C_{24}$ aryl group. A "secondary ammonium poly alpha-1,6-glucan ether compound" comprises a positively charged organic group having a monoalkylammonium group. A secondary ammonium poly alpha-1,6-glucan ether compound can be represented in shorthand as a monoalkylammonium poly alpha-1,6-glucan ether, for example monomethyl-, monoethyl-, monopropyl-, monobutyl-, monopentyl-, monohexyl-, monoheptyl-, monooctyl-, monononyl-, monodecyl-, monoundecyl-, monododecyl-, monotridecyl-, monotetradecyl-, monopentadecyl-, monohexadecyl-, monoheptadecyl-, or monooctadecyl-ammonium poly alpha-1,6-glucan ether. These poly alpha-1,6-glucan ether compounds can also be referred to as methyl-, ethyl-, propyl-, butyl-, pentyl-, hexyl-, heptyl-, octyl-, nonyl-, decyl-, undecyl-, dodecyl-, tridecyl-, tetradecyl-, pentadecyl-, hexadecyl-, heptadecyl-, or octadecyl-ammonium poly alpha-1,6-glucan ether compounds, respectively. An octadecyl ammonium group is an example of a monoalkylammonium group wherein each of $R_2$ and $R_3$ is a hydrogen atom and $R_4$ is an octadecyl group. It would be understood that a second member (i.e., $R_1$) implied by "secondary" in the above nomenclature is the chain of one or more carbons of the positively charged organic group that is ether-linked to a glucose monomer of poly alpha-1,6-glucan.

A tertiary ammonium group is an ammonium group represented by Structure II in which $R_2$ is a hydrogen atom and each of $R_3$ and $R_4$ is independently a $C_1$-$C_{24}$ alkyl group or a $C_6$-$C_{24}$ aryl group. The alkyl groups can be the same or different. A "tertiary ammonium poly alpha-1,6-glucan ether compound" comprises a positively charged organic group having a dialkylammonium group. A tertiary ammonium poly alpha-1,6-glucan ether compound can be represented in shorthand as a dialkylammonium poly alpha-1,6-glucan ether, for example dimethyl-, diethyl-, dipropyl-, dibutyl-, dipentyl-, dihexyl-, diheptyl-, dioctyl-, dinonyl-, didecyl-, diundecyl-, didodecyl-, ditridecyl-, ditetradecyl-, dipentadecyl-, dihexadecyl-, diheptadecyl-, or dioctadecyl-ammonium poly alpha-1,6-glucan ether. A didodecyl ammonium group is an example of a dialkyl ammonium group, wherein $R_2$ is a hydrogen atom and each of $R_3$ and $R_4$ is a dodecyl group. It would be understood that a third member (i.e., $R_1$) implied by "tertiary" in the above nomenclature is the chain of one or more carbons of the positively charged organic group that is ether-linked to a glucose monomer of poly alpha-1,6-glucan.

A quaternary ammonium group is an ammonium group represented by Structure II in which each of $R_2$, $R_3$ and $R_4$ is independently a $C_1$-$C_{30}$ alkyl group or a $C_6$-$C_{24}$ aryl group (i.e., none of $R_2$, $R_3$ and $R_4$ is a hydrogen atom).

A quaternary ammonium poly alpha-1,6-glucan ether compound may comprise a trialkyl ammonium group, where each of $R_2$, $R_3$ and $R_4$ is independently a $C_1$-$C_{30}$ alkyl group. The alkyl groups can all be the same, or two of the alkyl groups can be the same and one different from the others, or all three alkyl groups can be different from one another. A quaternary ammonium poly alpha-1,6-glucan ether compound can be represented in shorthand as a trialkylammonium poly alpha-1,6-glucan ether, for example trimethyl-, triethyl-, tripropyl-, tributyl-, tripentyl-, trihexyl-, triheptyl-, trioctyl-, trinonyl-, tridecyl-, triundecyl-, tridodecyl-, tritridecyl-, tritetradecyl-, tripentadecyl-, trihexadecyl-, triheptadecyl-, or trioctadecyl-ammonium poly alpha-1,6-glucan ether. It would be understood that a fourth member (i.e., $R_1$) implied by "quaternary" in this nomenclature is the chain of one or more carbons of the positively charged organic group that is ether-linked to a glucose monomer of poly alpha-1,6-glucan. A trimethylammonium group is an example of a trialkyl ammonium group, wherein each of $R_2$, $R_3$ and $R_4$ is a methyl group.

A positively charged organic group comprising a substituted ammonium group represented by Structure II can have each of $R_2$, $R_3$ and $R_4$ independently represent a hydrogen atom or an aryl group, such as a phenyl or naphthyl group, or an aralkyl group such as a benzyl group, or a cycloalkyl group such as cyclohexyl or cyclopentyl. Each of $R_2$, $R_3$ and $R_4$ may further comprise an amino group or a hydroxyl group.

The substituted ammonium group of the positively charged organic group is a substituent on a chain of one or more carbons that is ether-linked to a glucose monomer of the alpha-1,6-glucan. The carbon chain may contain from one to 30 carbon atoms. The carbon chain may be linear. Examples of linear carbon chains include, for example, $-CH_2-$, $-CH_2CH_2-$, $-CH_2CH_2CH_2-$, $-CH_2(CH_2)_2CH_2-$, $-CH_2(CH_2)_3CH_2-$, $-CH_2(CH_2)_4CH_2-$, $-CH_2(CH_2)_5CH_2-$, $-CH_2(CH_2)_6CH_2-$, $-CH_2(CH_2)_7CH_2-$, $-CH_2(CH_2)_8CH_2-$, $-CH_2(CH_2)_9CH_2-$, and $-CH_2(CH_2)_{10}CH_2-$; longer carbon chains can also be used, if desired. The carbon chain may be branched, meaning the carbon chain is substituted with one or more alkyl groups, for example methyl, ethyl, propyl, or butyl groups. The point of substitution can be anywhere along the carbon chain. Examples of branched carbon chains include $-CH(CH_3)CH_2-$, $-CH(CH_3)CH_2CH_2-$, $-CH_2CH(CH_3)CH_2-$, $-CH(CH_2CH_3)CH_2-$, $-CH(CH_2CH_3)CH_2CH_2-$, $-CH_2CH(CH_2CH_3)CH_2-$, $-CH(CH_2CH_2CH_3)CH_2-$, $-CH(CH_2CH_2CH_3)CH_2CH_2-$, and $-CH_2CH(CH_2CH_2CH_3)CH_2-$; longer branched carbon chains can also be used, if desired. Where the positively charged group is a substituted ammonium group, the first carbon atom in the chain is ether-linked to a glucose monomer of the poly alpha-1,6-glucan, and the last carbon atom of the chain in each of these examples is represented by the C in Structure II.

The chain of one or more carbons may be further substituted with one or more hydroxyl groups. Examples of a carbon chain having one or more substitutions with a hydroxyl group include hydroxyalkyl (e.g., hydroxyethyl, hydroxypropyl, hydroxybutyl, hydroxypentyl, hydroxyhexyl, hydroxyheptyl, hydroxyoctyl) groups and dihydroxyalkyl (e.g., dihydroxyethyl, dihydroxypropyl, dihydroxybutyl, dihydroxypentyl, dihydroxyhexyl, dihydroxyheptyl, dihydroxyoctyl) groups. Examples of hydroxyalkyl and dihydroxyalkyl (diol) carbon chains include $-CH(OH)-$, $-CH(OH)CH_2-$, $-C(OH)_2CH_2-$, $-CH_2CH(OH)CH_2-$, $-CH(OH)CH_2CH_2-$, $-CH(OH)CH(OH)CH_2-$, $-CH_2CH_2CH(OH)CH_2-$, $-CH_2CH(OH)CH_2CH_2-$, $-CH(OH)CH_2CH_2CH_2-$, $-CH_2CH(OH)CH(OH)CH_2-$, $-CH(OH)CH(OH)CH_2CH_2-$ and $-CH(OH)CH_2CH(OH)CH_2-$. In each of these examples, the first carbon atom of the chain is ether-linked to a glucose monomer of poly alpha-1,6-glucan, and the last carbon atom of the chain is linked to a positively charged group. Where the positively charged group is a substituted ammonium group, the last carbon atom of the chain in each of these examples is represented by the C in Structure II.

An example of a quaternary ammonium poly alpha-1,6-glucan ether compound is trimethylammonium hydroxypropyl poly alpha-1,6-glucan. The positively charged organic group of this ether compound can be represented by the following structure:

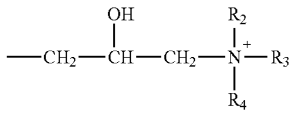

where each of $R_2$, $R_3$ and $R_4$ is a methyl group. The structure above is an example of a quaternary ammonium hydroxypropyl group.

Where a carbon chain of a positively charged organic group has a substitution in addition to a substitution with a positively charged group, such additional substitution may be with one or more hydroxyl groups, oxygen atoms (thereby forming an aldehyde or ketone group), alkyl groups (e.g., methyl, ethyl, propyl, butyl), and/or additional positively charged groups. A positively charged group is typically bonded to the terminal carbon atom of the carbon chain. A positively charged group can also comprise one or more imidazoline rings.

A cationic poly alpha-1,6-glucan ether compound as disclosed herein may be a salt. The counter ion for the positively charged organic group can be any suitable anion, including an acetate, borate, bromate, bromide, carbonate, chlorate, chloride, chlorite, dihydrogen phosphate, fluoride, hydrogen carbonate, hydrogen phosphate, hydrogen sulfate, hydrogen sulfide, hydrogen sulfite, hydroxide, hypochlorite, iodate, iodide, nitrate, nitride, nitrite, oxalate, oxide, perchlorate, permanganate, phosphate, phosphide, phosphite, silicate, stannate, stannite, sulfate, sulfide, sulfite, tartrate, or thiocyanate anion, preferably chloride. In an aqueous solution, a poly alpha-1,6-glucan ether compound is in a cationic form. The positively charged organic groups of a cationic poly alpha-1,6-glucan ether compound can interact with salt anions that may be present in an aqueous solution.

The poly alpha-1,6-glucan ether compound may comprise a positively charged organic group, wherein the positively charged organic group comprises a substituted ammonium group. From about 0.5% to about 50% of the backbone glucose monomer units of the ether compound may have branches via alpha-1,2 glycosidic linkages, and the positively charged organic group may comprise a substituted ammonium group. From about 5% to about 30% of the backbone glucose monomer units of the ether compound may have branches via alpha-1,2 glycosidic linkages, and the substituted ammonium group may comprise a substituted ammonium group. From about 0.5% to about 50% of the backbone glucose monomer units of the ether compound may have branches via alpha-1,2 glycosidic linkages, and the substituted ammonium group may comprise a trimethyl ammonium group. From about 5% to about 35% of the backbone glucose monomer units of the ether compound may have branches via alpha-1,2 glycosidic linkages, and the substituted ammonium group may comprise a trimethyl ammonium group.

The poly alpha-1,6-glucan ether compound may comprise a positively charged organic group, wherein the positively charged organic group comprises a trimethylammonium hydroxyalkyl group. From about 0.5% to about 50% of the backbone glucose monomer units of the ether compound may have branches via alpha-1,2 glycosidic linkages, and the positively charged organic group may comprise a trimethylammonium hydroxyalkyl group. From about 5% to about 30% of the backbone glucose monomer units of the ether compound may have branches via alpha-1,2 glycosidic linkages, and the positively charged organic group may comprise a trimethylammonium hydroxyalkyl group. From about 0.5% to about 50% of the backbone glucose monomer units of the ether compound may have branches via alpha-1,2 glycosidic linkages, and the trimethylammonium hydroxyalkyl group may comprise a trimethylammonium hydroxypropyl group. From about 5% to about 30% of the backbone glucose monomer units of the ether compound may have branches via alpha-1,2 glycosidic linkages, and the trimethylammonium hydroxyalkyl group may comprise a trimethylammonium hydroxypropyl group.

The poly alpha-1,6-glucan ether compound may comprise a positively charged organic group, wherein the positively charged organic group comprises a substituted ammonium group comprising a quaternary ammonium group. From about 0.5% to about 50% of the backbone glucose monomer units of the ether compound may have branches via alpha-1,2 glycosidic linkages, and the quaternary ammonium group may comprise at least one $C_1$ to $C_{18}$ alkyl group. From about 5% to about 30% of the backbone glucose monomer units of the ether compound may have branches via alpha-1,2 glycosidic linkages, the quaternary ammonium group may comprise at least one $C_1$ to $C_{18}$ alkyl group. From about 0.5% to about 50% of the backbone glucose monomer units of the ether compound may have branches via alpha-1,2 glycosidic linkages, and the quaternary ammonium group may comprise at least one $C_1$ to $C_4$ alkyl group. From about 5% to about 30% of the backbone glucose monomer units of the ether compound may have branches via alpha-1,2 glycosidic linkages, and the quaternary ammonium group may comprise at least one $C_1$ to $C_4$ alkyl group. From about 0.5% to about 50% of the backbone glucose monomer units of the ether compound may have branches via alpha-1,2 glycosidic linkages, and the quaternary ammonium group may comprise at least one $C_{10}$ to $C_{16}$ alkyl group. From about 5% to about 30% of the backbone glucose monomer units of the ether compound may have branches via alpha-1,2 glycosidic linkages, and the quaternary ammonium group may comprise at least one $C_{10}$ to $C_{16}$ alkyl group.

The poly alpha-1,6-glucan ether compound may comprise a quaternary ammonium group comprising one $C_{10}$ to $C_{16}$ alkyl group, where the quaternary ammonium group further comprises two methyl groups. From about 0.5% to about 50% of the backbone glucose monomer units of the ether compound may have branches via alpha-1,2 glycosidic linkages, and the quaternary ammonium group may comprise one $C_{10}$ to $C_{16}$ alkyl group further comprises two methyl groups. From about 5% to about 30% of the backbone glucose monomer units of the ether compound may have branches via alpha-1,2 glycosidic linkages, and the quaternary ammonium group may comprise one $C_{10}$ to $C_{16}$ alkyl group further comprises two methyl groups.

From about 0.5% to about 50% of the backbone glucose monomer units of the ether compound may have branches via alpha-1,2 glycosidic linkages, and the quaternary ammonium group may comprise one $C_{10}$ alkyl group and two methyl groups. From about 5% to about 30% of the backbone glucose monomer units of the ether compound may have branches via alpha-1,2 glycosidic linkages, and the quaternary ammonium group may comprise one $C_{10}$ alkyl group and two methyl groups.

The poly alpha-1,6-glucan ether compound may comprise a positively charged organic group, wherein the positively charged organic group comprises a quaternary ammonium hydroxyalkyl group. From about 0.5% to about 50% of the backbone glucose monomer units of the ether compound may have branches via alpha-1,2 glycosidic linkages, and the positively charged organic group may comprise a quaternary ammonium hydroxyalkyl group. From about 5% to about 30% of the backbone glucose monomer units of the ether compound may have branches via alpha-1,2 glycosidic linkages, and the positively charged organic group may comprise a quaternary ammonium hydroxyalkyl group. From about 0.5% to about 50% of the backbone glucose monomer units of the ether compound may have branches via alpha-1,2 glycosidic linkages, and the quaternary ammonium hydroxyalkyl group may comprise a quaternary ammonium hydroxymethyl group, a quaternary ammonium hydroxyethyl group, or a quaternary ammonium hydroxypropyl group. From about 5% to about 30% of the backbone glucose monomer units of the ether compound may have branches via alpha-1,2 glycosidic linkages, and the quaternary ammonium hydroxyalkyl group may comprise a quaternary ammonium hydroxymethyl group, a quaternary ammonium hydroxyethyl group, or a quaternary ammonium hydroxypropyl group. From about 0.5% to about 50% of the backbone glucose monomer units of the ether compound may have branches via alpha-1,2 glycosidic linkages, and the quaternary ammonium hydroxyalkyl group may comprise a quaternary ammonium hydroxymethyl group. From about 5% to about 30% of the backbone glucose monomer units of the ether compound may have branches via alpha-1,2 glycosidic linkages, and the quaternary ammonium hydroxyalkyl group may comprise a quaternary ammonium hydroxymethyl group. From about 0.5% to about 50% of the backbone glucose monomer units of the ether compound may have branches via alpha-1,2 glycosidic linkages, and the quaternary ammonium hydroxyalkyl group may comprise a quaternary ammonium hydroxyethyl group. From about 5% to about 30% of the backbone glucose monomer units of the ether compound may have branches via alpha-1,2 glycosidic linkages, and the quaternary ammonium hydroxyalkyl group may comprise a quaternary ammonium hydroxyethyl group. From about 0.5% to about 50% of the backbone glucose monomer units of the ether compound may have branches via alpha-1,2 glycosidic linkages, and the quaternary ammonium hydroxyalkyl group may comprise a quaternary ammonium hydroxypropyl group. From about 5% to about 30% of the backbone glucose monomer units of the ether compound may have branches via alpha-1,2 glycosidic linkages, and the quaternary ammonium hydroxyalkyl group may comprise a quaternary ammonium hydroxypropyl group.

Poly alpha-1,6-glucan ether compounds containing a positively charged organic group, such as a trimethyl ammonium group, a substituted ammonium group, or a quaternary ammonium group, can be prepared using methods similar to those disclosed in published patent application US 2016/0311935, which is incorporated herein by reference in its entirety. US 2016/0311935 discloses poly alpha-1,3-glucan ether compounds comprising positively charged organic groups and having a degree of substitution of up to about 3.0, as well as methods of producing such ether compounds. Cationic poly alpha-1,6-glucan ethers may be prepared by contacting poly alpha-1,6-glucan with at least one etherification agent comprising a positively charged organic group under alkaline conditions. For example, alkaline conditions may be prepared by contacting the poly alpha-1,6-glucan with a solvent and one or more alkali hydroxides to provide a solution or mixture, and at least one etherification agent is then added. As another example, at least one etherification agent can be contacted with poly alpha-1,6-glucan and solvent, and then the alkali hydroxide can be added. The mixture of poly alpha-1,6-glucan, etherification agent, and alkali hydroxides can be maintained at ambient temperature or optionally heated, for example to a temperature between about 25° C. and about 200° C., depending on the etherification agent and/or solvent employed. Reaction time for producing a poly alpha-1,6-glucan ether will vary corresponding to the reaction temperature, with longer reaction time necessary at lower temperatures and lower reaction time necessary at higher temperatures.

Typically, the solvent comprises water. Optionally, additional solvent can be added to the alkaline solution, for example alcohols such as isopropanol, acetone, dioxane, and toluene. Alternatively, solvents such as lithium chloride (LiCl)/N,N-dimethyl-acetamide (DMAc), $SO_2$/diethylamine (DEA)/dimethyl sulfoxide (DMSO), LiCl/1,3-dimethyl-2-imidazolidinone (DMI), N,N-dimethylformamide (DMF)/$N_2O_4$, DMSO/tetrabutyl-ammonium fluoride trihydrate (TBAF), N-methylmorpholine-N-oxide (NMMO), Ni(tren)$(OH)_2$ [tren-tris(2-aminoethyl)amine] aqueous solutions and melts of $LiClO_4 \cdot 3H_2O$, NaOH/urea aqueous solutions, aqueous sodium hydroxide, aqueous potassium hydroxide, formic acid, and ionic liquids can be used.

An etherification agent may be one that can etherify poly alpha-1,6-glucan with a positively charged organic group, where the carbon chain of the positively charged organic group only has a substitution with a positively charged group (e.g., substituted ammonium group such as trimethylammonium). Examples of such etherification agents include dialkyl sulfates, dialkyl carbonates, alkyl halides (e.g., alkyl chloride), iodoalkanes, alkyl triflates (alkyl trifluoromethanesulfonates) and alkyl fluorosulfonates, where the alkyl group(s) of each of these agents has one or more substitutions with a positively charged group (e.g., substituted ammonium group such as trimethylammonium). Other examples of such etherification agents include dimethyl sulfate, dimethyl carbonate, methyl chloride, iodomethane, methyl triflate and methyl fluorosulfonate, where the methyl group(s) of each of these agents has a substitution with a positively charged group (e.g., substituted ammonium group such as trimethylammonium). Other examples of such etherification agents include diethyl sulfate, diethyl carbonate, ethyl chloride, iodoethane, ethyl triflate and ethyl fluorosulfonate, where the ethyl group(s) of each of these agents has a substitution with a positively charged group (e.g., substituted ammonium group such as trimethylammonium). Other examples of such etherification agents include dipropyl sulfate, dipropyl carbonate, propyl chloride, iodopropane, propyl triflate and propyl fluorosulfonate, where the propyl group(s) of each of these agents has one or more substitutions with a positively charged group (e.g., substituted ammonium group such as trimethylammonium). Other examples of such etherification agents include dibutyl sulfate, dibutyl carbonate, butyl chloride, iodobutane and butyl triflate, where the butyl group(s) of each of these agents has one or more substitutions with a positively charged group (e.g., substituted ammonium group such as trimethylammonium). Other examples of etherification agents include halides of imidazoline-ring-containing compounds.

An etherification agent may be one that can etherify poly alpha-1,6-glucan with a positively charged organic group, where the carbon chain of the positively charged organic group has a substitution, for example a hydroxyl group, in addition to a substitution with a positively charged group, for example a substituted ammonium group such as trimethylammonium. Examples of such etherification agents include hydroxyalkyl halides (e.g., hydroxyalkyl chloride) such as hydroxypropyl halide and hydroxybutyl halide, where a terminal carbon of each of these agents has a substitution with a positively charged group (e.g., substituted ammonium group such as trimethylammonium); an example is 3-chloro-2-hydroxypropyl-trimethylammonium. Additional examples of etherification agents comprising a positively charged organic group include 2,3-epoxypropyltrimethylammonium chloride, 3-chloro-2-hydroxypropyl dodecyldimethylammonium chloride, 3-chloro-2-hydroxypropyl cocoalkyldimethylammonium chloride, 3-chloro-2-hydroxypropyl stearyldimethylammonium chloride, and quaternary ammonium compounds such as halides of imidazoline-ring-containing compounds. Other examples of such etherification agents include alkylene oxides such as propylene oxide (e.g., 1,2-propylene oxide) and butylene oxide (e.g., 1,2-butylene oxide; 2,3-butylene oxide), where a terminal carbon of each of these agents has a substitution with a positively charged group (e.g., substituted ammonium group such as trimethylammonium).

When producing a poly alpha-1,6-glucan ether compound comprising two or more different positively charged organic groups, two or more different etherification agents would be used, accordingly. Any of the etherification agents disclosed herein may be combined to produce poly alpha-1,6-glucan ether compounds having two or more different positively charged organic groups. Such two or more etherification agents may be used in the reaction at the same time, or may be used sequentially in the reaction. When used sequentially, any of the temperature-treatment (e.g., heating) steps may optionally be used between each addition. Sequential introduction of etherification agents may be used to control the desired DoS of each positively charged organic group. In general, a particular etherification agent would be used first if the organic group it forms in the ether product is desired at a higher DoS compared to the DoS of another organic group to be added.

The amount of etherification agent to be contacted with poly alpha-1,6-glucan in a reaction under alkaline conditions can be selected based on the degree of substitution desired in the ether compound. The amount of ether substitution groups on each monomeric unit in poly alpha-1,6-glucan ether compounds can be determined using nuclear magnetic resonance (NMR) spectroscopy. In general, an etherification agent can be used in a quantity of at least about 0.01 mole per gram, preferably at least about 0.02, more preferably at least about 0.03, even more preferably at least about 0.05 mole per mole of poly glucan. There may be no upper limit to the quantity of etherification agent that can be used.

Reactions for producing poly alpha-1,6-glucan ether compounds can optionally be carried out in a pressure vessel such as a Parr reactor, an autoclave, a shaker tube, or any other pressure vessel well known in the art. Optionally, poly alpha-1,6-glucan ether compounds can be prepared under an inert atmosphere, with or without heating. As used herein, the term "inert atmosphere" refers to a nonreactive gas atmosphere such as nitrogen, argon, or helium.

After contacting the poly alpha-1,6-glucan, solvent, alkali hydroxide, and etherification reagent for a sufficient reaction time to produce a poly alpha-1,6-glucan ether compound, the reaction mixture can optionally be filtered by any means known in the art which allows removal of liquids from solids.

Following etherification, one or more acids may be optionally added to the reaction mixture to lower the pH to a neutral pH range that is neither substantially acidic nor substantially acidic, for example a pH of about 6-8, or about 6.0, 6.2, 6.4, 6.6, 6.8, 7.0, 7.2, 7.4, 7.6, 7.8, or 8.0, if desired. Various acids useful for this purpose include sulfuric, acetic, hydrochloric, nitric, any mineral (inorganic) acid, any organic acid, or any combination of these acids.

A poly alpha-1,6-glucan ether compound can optionally be washed one or more times with a liquid that does not readily dissolve the compound. For example, a poly alpha-1,6-glucan ether can be washed with water, alcohol, isopropanol, acetone, aromatics, or any combination of these, depending on the solubility of the ether compound therein (where lack of solubility is desirable for washing). In general, a solvent comprising an organic solvent such as alcohol is preferred for the washing. A poly alpha-1,6-glucan ether product can be washed one or more times with an aqueous solution containing methanol or ethanol, for example. For example, 70-95 wt % ethanol can be used to wash the product. In another embodiment, a poly alpha-1,6-glucan ether product can be washed with a methanol: acetone (e.g., 60:40) solution.

A poly alpha-1,6-glucan ether compound can optionally purified by membrane filtration.

A poly alpha-1,6-glucan ether produced using the methods disclosed above can be isolated. This step can be performed before or after neutralization and/or washing steps using a funnel, centrifuge, press filter, or any other method or equipment known in the art that allows removal of liquids from solids. An isolated poly alpha-1,6-glucan ether product can be dried using any method known in the art, such as vacuum drying, air drying, or freeze drying.

Any of the above etherification reactions can be repeated using a poly alpha-1,6-glucan ether product as the starting material for further modification. This approach may be suitable for increasing the DoS of a positively charged organic group, and/or adding one or more different positively charged organic groups to the ether product. Also, this approach may be suitable for adding one or more organic groups that are not positively charged, such as an alkyl group (e.g., methyl, ethyl, propyl, butyl) and/or a hydroxyalkyl group (e.g., hydroxyethyl, hydroxypropyl, hydroxybutyl). Any of the above etherification agents, but without the substitution with a positively charged group, can be used for this purpose.

As described above, materials derived from sustainable/renewable feedstock materials are often desirable. Similarly, biodegradable materials may also be preferred. For example, biodegradable cationic poly alpha-1,6-glucan ether compounds are preferred over non-biodegradable materials from an environmental footprint perspective. The biodegradability of a material can be evaluated by methods known in the art, for example as disclosed in the Biodegradability Test Method section herein below. The poly alpha-1,6-glucan derivative may have a biodegradability as determined by the OECD 301B Ready Biodegradability $CO_2$ Evolution Test Method of at least 10% on the 90th day of the test duration. The poly alpha-1,6-glucan derivative may have a biodegradability as determined by the OECD 301B Ready Biodegradability Test Method of at least 5%, 10%, 15%, 20%, 25%, 30%, 35%, 40%, 45%, 50%, 55%, 60%, 65%, 70%, 75%, or 80%, or any value between 5% and 80%, on the 90th day of the test duration. The poly alpha-1,6-glucan derivative may have a biodegradability as determined by the OECD 301B Ready Biodegradability $CO_2$ Evolution Test Method of at least 5%, 10%, 15%, 20%, 25%, 30%, 35%, 40%, 45%, 50%, 55%, or 60%, or any value between 5% and 60%, on the 60th day of the test duration. Without wishing to be bound by theory, it is believed that the biodegradability profile of the presently described materials may be affected by the degree of substitution, the molecular weight, the degree of branching, and/or the solubility of the material. For example, it is believed that relatively lower degrees of substitution (e.g., lower cationic charge density) and/or increased solubility will be associated with higher degrees of biodegradability.

Depending upon the desired application, compositions comprising a cationic poly alpha-1,6-glucan ether compound as disclosed herein can be formulated, for example, blended, mixed, or incorporated into, with one or more other materials and/or active ingredients suitable for use in various compositions, for example compositions for use in fabric care and/or dish care applications.

Treatment Adjunct Ingredients

The treatment compositions of the present disclosure include a treatment adjunct ingredient. The adjunct ingredients may be selected to provide, for example, processing, stability, and/or performance benefits.

The treatment adjunct ingredient may be present in an effective amount, for example from 0.001% to about 50% or more, depending on the ingredient, the form of the composition, and the desired effect.

The treatment adjunct ingredient may be selected from the group consisting of surfactants, conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents, aesthetic dyes, additional perfumes and perfume delivery systems, structure elasticizing agents, carriers, hydrotropes, processing aids, anti-agglomeration agents, anti-tarnish ingredients, coatings, formaldehyde scavengers, pigments, and mixtures thereof. The preceding list is not intended to be limiting, as adjunct ingredients may be selected according to the treatment compositions form and intended usage. Still, several of these treatment adjunct ingredients are discussed in more detail below.

Surfactants

Treatment compositions according to the present disclosure may include surfactant or even a surfactant system, which may include more than one surfactant. In particular, detergents (such as heavy duty liquid laundry detergents) may include surfactant systems, including systems that include detersive surfactants, such as anionic surfactant. The treatment compositions may, additionally or alternatively, include low levels of surfactants as emulsifying agents or other processing aids.

The compositions of the present disclosure may include from about from about 1% to about 90%, or from about 1% to about 80%, or from about 1% to about 70%, or from about 2% to about 60%, or from about 5% to about 50%, by weight of the composition, of a surfactant system. Liquid compositions may include from about 5% to about 40%, by weight of the composition, of a surfactant system. Compact formulations, including compact liquids, gels, and/or compositions suitable for a unit dose form, may include from about 25% to about 90%, or from about 25% to about 70%, or from about 30% to about 50%, by weight of the composition, of a surfactant system.

The surfactant system may include anionic surfactant, nonionic surfactant, zwitterionic surfactant, cationic surfactant, amphoteric surfactant, or combinations thereof. The surfactant system may include linear alkyl benzene sulfonate, alkyl ethoxylated sulfate, alkyl sulfate, alkyl ethoxylated carboxylates, nonionic surfactant such as ethoxylated alcohol, amine oxide, or mixtures thereof. The surfactants may be, at least in part, derived from natural sources, such as natural feedstock alcohols.

The surfactant system may include anionic surfactant. Suitable anionic surfactants may include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates. The anionic surfactants may be linear, branched, or combinations thereof. Preferred surfactants include linear alkyl benzene sulfonate (LAS), alkyl ethoxylated sulfate (AES), alkyl sulfates (AS), or mixtures thereof. Other suitable anionic surfactants include branched modified alkyl benzene sulfonates (MLAS), methyl ester sulfonates (MES), and/or alkyl ethoxylated carboxylates (AEC). The anionic surfactants may be present in acid form, salt form, or mixtures thereof. The anionic surfactants may be neutralized, in part or in whole, for example, by an alkali metal (e.g., sodium) or an amine (e.g., monoethanolamine) The anionic surfactant may be pre-neutralized, preferably with an alkali metal, an alkali earth metal, an amine such as an ethanolamine, or mixtures thereof.

It is contemplated that the treatment composition may include less than 5%, or less than 2%, or less than 1%, or less than about 0.1%, by weight of the composition, of anionic surfactant, or even be substantially free of anionic surfactant. Anionic surfactants can negatively impact the stability and/or performance of the present compositions, as they may undesirably interact with the cationic components. Compositions intended to be added during the rinse cycle of an automatic washing machine, such as a liquid fabric enhancer, may include relatively low levels of anionic surfactant. Additionally or alternatively, compositions intended to be used in combination with a detergent composition during the wash cycle of an automatic washing machine may include relatively low levels of anionic surfactant.

The surfactant system may include nonionic surfactant. Suitable nonionic surfactants include alkoxylated fatty alcohols, such as ethoxylated fatty alcohols. Other suitable nonionic surfactants include alkoxylated alkyl phenols, alkyl phenol condensates, mid-chain branched alcohols, mid-chain branched alkyl alkoxylates, alkylpolysaccharides (e.g., alkylpolyglycosides), polyhydroxy fatty acid amides, ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof. Specific nonionic surfactants may include alcohols having an average of from about 12 to about 16 carbons, and an average of from about 3 to about 9 ethoxy groups, such as C12-C14 EO7 nonionic surfactant.

Suitable zwitterionic surfactants may include any conventional zwitterionic surfactant, such as betaines, including alkyl dimethyl betaine and cocodimethyl amidopropyl betaine, $C_8$ to $C_{18}$ (for example from $C_{12}$ to $C_{18}$) amine oxides (e.g., $C_{12-14}$ dimethyl amine oxide), and/or sulfo and hydroxy betaines, such as N-alkyl-N,N-dimethylamino-1-propane sulfonate where the alkyl group can be $C_8$ to $C_{18}$, or from $C_{10}$ to $C_{14}$. The zwitterionic surfactant may include amine oxide.

Conditioning/Softening Actives

The treatment compositions of the present disclosure may comprise a conditioning or softening active. Softening actives may provide softness, anti-wrinkle, anti-static, conditioning, anti-stretch, color, and/or appearance benefits to target fabrics. The softening active may be selected from the group consisting of quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, glyceride copolymers, or combinations thereof.

The composition may include a quaternary ammonium ester compound, a silicone, or combinations thereof, preferably a combination. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

The compositions of the present disclosure may comprise a quaternary ammonium ester compound as a softening active. The quaternary ammonium ester compound (sometimes referred to as "ester quats") may be present at a level of from about 2% to about 40%, or from about 3% to about 25%, preferably from 4% to 18%, more preferably from 5% to 15%, by weight of the composition. Preferably, the iodine value (see Methods) of the parent fatty acid from which the quaternary ammonium fabric compound is formed is from 0 to about 90, or from about 10 to about 70, or from about 15 to about 50, or from about 18 to about 30. The iodine value may be from about 25 to 50, preferably from 30 to 48, more preferably from 32 to 45. Without being bound by theory, lower melting points resulting in easier processability of the softening active are obtained when the parent fatty acid from which the quaternary ammonium compound is formed is at least partially unsaturated. In particular, double unsaturated fatty acids enable easy-to-process softening actives. In preferred liquid fabric softener compositions, the parent fatty acid from which the quaternary ammonium conditioning actives is formed comprises from 2.0% to 20.0%, preferably from 3.0% to 15.0%, more preferably from 4.0% to 15.0% of double unsaturated C18 chains ("C18:2") by weight of total fatty acid chains (see Methods). On the other hand, very high levels of unsaturated fatty acid chains are to be avoided to minimize malodour formation as a result of oxidation of the fabric softener composition over time.

The quaternary ammonium ester compound may be present at a level of from greater than 0% to about 30%, or from about 1% to about 25%, or from about 3% to about 20%, or from about 4.0% to 18%, more preferably from 4.5% to 15%, even more preferably from 5.0% to 12% by weight of the composition. The level of quaternary ammonium ester compound may depend of the desired concentration of total fabric conditioning active in the composition (diluted or concentrated composition) and of the presence or not of other softening actives. However, the risk on increasing viscosities over time is typically higher in fabric treatment compositions with higher softening active levels. On the other hand, at very high softening active levels, the viscosity may no longer be sufficiently controlled which renders the product unfit for use.

Suitable quaternary ammonium ester compounds include but are not limited to, materials selected from the group consisting of monoester quats, diester quats, triester quats and mixtures thereof. Preferably, the level of monoester quat is from 2.0% to 40.0%, the level of diester quat is from 40.0% to 98.0%, the level of triester quat is from 0.0% to 25.0% by weight of total quaternary ammonium ester compound.

The quaternary ammonium ester compound may comprise compounds of the following formula:

$$\{R^2_{(4-m)}—N+-[X—Y—R^1]_m\}A^-$$

wherein:

m is 1, 2 or 3 with proviso that the value of each m is identical;

each $R^1$ is independently hydrocarbyl, or branched hydrocarbyl group, preferably $R^1$ is linear, more preferably $R^1$ is partially unsaturated linear alkyl chain;

each $R^2$ is independently a $C_1$-$C_3$ alkyl or hydroxyalkyl group, preferably $R^2$ is selected from methyl, ethyl, propyl, hydroxyethyl, 2-hydroxypropyl, 1-methyl-2-hydroxyethyl, poly($C_2$-$C_3$ alkoxy), polyethoxy, benzyl;

each X is independently —$(CH_2)$n-, —$CH_2$—CH$(CH_3)$— or —CH—$(CH_3)$—$CH_2$— and each n is independently 1, 2, 3 or 4, preferably each n is 2;

each Y is independently —O—(O)C— or —C(O)—O—;

A– is independently selected from the group consisting of chloride, methyl sulfate, and ethyl sulfate, preferably $A^-$ is selected from the group consisting of chloride and methyl sulfate, more preferably A– is methyl sulfate;

with the proviso that when Y is —O—(O)C—, the sum of carbons in each $R^1$ is from 13 to 21, preferably from 13 to 19. Preferably, X is —$CH_2$—CH$(CH_3)$— or —CH—$(CH_3)$—$CH_2$— to improve the hydrolytic stability of the quaternary ammonium ester compound, and hence further improve the stability of the fabric treatment composition.

Examples of suitable quaternary ammonium ester compounds are commercially available from Evonik under the tradename Rewoquat WE18, and/or Rewoquat WE20, and/or from Stepan under the tradename Stepantex GA90, Stepantex VK90, and/or Stepantex VL90A.

The fabric conditioning compositions of the present disclosure may comprise silicone as a softening active. Suitable levels of silicone may comprise from about 0.1% to about 70%, or from about 0.3% to about 40%, or from about 0.5% to about 30%, alternatively from about 1% to about 20% by weight of the composition.

Useful silicones can be any suitable silicone-comprising compound. The silicone polymer may be selected from the group consisting of cyclic silicones, polydimethylsiloxanes, aminosilicones, cationic silicones, silicone polyethers, silicone resins, silicone urethanes, and mixtures thereof. The silicone may comprise a polydialkylsilicone, such as a polydimethyl silicone (polydimethyl siloxane or "PDMS"), or a derivative thereof. The silicone may comprise an aminofunctional silicone, amino-polyether silicone, alkyloxylated silicone, cationic silicone, ethoxylated silicone, propoxylated silicone, ethoxylated/propoxylated silicone, quaternary silicone, or combinations thereof. The silicone may comprise a polydimethyl silicone, an aminosilicone, or a combination thereof, preferably an aminosilicone.

The silicone may comprise a random or blocky organosilicone polymer. The silicone may be provided as an emulsion.

The silicone may be characterized by a relatively high molecular weight. A suitable way to describe the molecular weight of a silicone includes describing its viscosity. A high molecular weight silicone may be one having a viscosity of from about 10 cSt to about 3,000,000 cSt, or from about 100 cSt to about 1,000,000 cSt, or from about 1,000 cSt to about 600,000 cSt, or even from about 6,000 cSt to about 300,000 cSt.

The composition may comprise glyceride copolymers. The glyceride copolymers may be derived from natural oils. Examples of natural oils include, but are not limited to, vegetable oils, algae oils, fish oils, animal fats, tall oils, derivatives of these oils, combinations of any of these oils, and the like. Representative non-limiting examples of vegetable oils include low erucic acid rapeseed oil (canola oil), high erucic acid rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil, preferably canola oil. Representative non-limiting examples of animal fats include lard, tallow, poultry fat, yellow grease, and fish oil.

Tall oils are by-products of wood pulp manufacture. The glyceride copolymers may be metathesized unsaturated polyol esters.

Freshness Actives

The treatment compositions of the present disclosure may comprise a freshness active. Freshness actives may provide aromatic (e.g., perfume) benefits and/or malodor reduction or malodor control benefits. The freshness actives may deliver the intended benefits at one or more consumer touchpoints, including in neat product, in a treatment liquor, on wet fabric, on dry fabric, or on rubbed fabric. The freshness active may be selected from fragrance actives, malodor control agents, or combinations thereof.

The freshness active may be a fragrance active. The fragrance active may be selected from free perfume, a perfume delivery system, a pro-perfume, or mixtures thereof.

The fragrance actives may comprise one or more perfume raw materials. The term "perfume raw material" (or "PRM") as used herein refers to compounds having a molecular weight of at least about 100 g/mol and which are useful in imparting an odor, fragrance, essence, or scent, either alone or with other perfume raw materials. Typical PRMs comprise inter alia alcohols, ketones, aldehydes, esters, ethers, nitrites, and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994). The composition may comprise from about 0.05% to about 20%, or from about 0.1% to about 10%, or from about 0.1% to about 5%, by weight of the composition, of perfume raw materials, and the level of freshness active may be selected accordingly.

The fragrance active may comprise free perfume, where, e.g., perfume raw materials are not encapsulated or chemically bound to other components. Free perfume may be added to a base composition neat, or as an emulsion and/or in combination with solubilizers, which can facilitate adequate dispersion or stability in the composition.

The fragrance active may comprise a perfume delivery system. Suitable perfume delivery systems, methods of making certain perfume delivery systems, and the uses of such perfume delivery systems are disclosed in USPA 2007/0275866 A1. Perfume delivery systems may include Polymer Assisted Delivery (PAD) (including matrix systems or reservoir systems, such as encapsulates), Molecule-Assisted Delivery (MAD), Amine-Assisted Delivery (AAD), a Cyclodextrin Delivery System (CD), Starch Encapsulated Accords (SEA), an Inorganic Carrier Delivery System (ZIC), or mixtures thereof.

The fabric conditioning compositions of the present disclosure comprise encapsulates as a perfume delivery system. As more than one encapsulate is typically present, the compositions may be described as comprising a plurality or population of encapsulates.

The composition may comprise from about 0.05% to about 20%, or from about 0.05% to about 10%, or from about 0.1% to about 5%, or from about 0.2% to about 2%, by weight of the composition, of encapsulates. The composition may comprise a sufficient amount of encapsulates to provide from about 0.05% to about 10%, or from about 0.1% to about 5%, or from about 0.1% to about 2%, by weight of the composition, of perfume to the composition. When discussing herein the amount or weight percentage of the encapsulates, it is meant the sum of the shell material and the core material.

The encapsulates may have a volume weighted median encapsulate size from about 0.5 microns to about 100 microns, or even 10 to 100 microns, preferably from about 1 micron to about 60 microns, or even 10 microns to 50 microns, or even 20 microns to 45 microns, or alternatively 20 microns to 60 microns.

The encapsulates typically have a wall (or shell) that at least partially surrounds the core. may have a wall, which may at least partially surround the core. The core may include perfume raw materials and optionally a partitioning modifier, such as isopropyl myristate or other suitable material.

The wall may include a wall material selected from the group consisting of polyethylenes; polyamides; polystyrenes; polyisoprenes; polycarbonates; polyesters; polyacrylates; acrylics; aminoplasts; polyolefins; polysaccharides, such as alginate and/or chitosan; gelatin; shellac; epoxy resins; vinyl polymers; water insoluble inorganics; silicone; and mixtures thereof. The wall material may comprise a material selected from aminoplasts, polyurethanes, polyureas, polyacrylates, or mixtures thereof.

The outer wall of the encapsulate may include a coating. Certain coatings may improve deposition of the encapsulate onto a target surface, such as a fabric. The coating may comprise an efficiency polymer. The coating may comprise a cationic efficiency polymer. The cationic polymer may be selected from the group consisting of polysaccharides, cationically modified starch, cationically modified guar, polysiloxanes, poly diallyl dimethyl ammonium halides, copolymers of poly diallyl dimethyl ammonium chloride and vinyl pyrrolidone, acrylamides, imidazoles, imidazolinium halides, imidazolium halides, polyvinyl amines, polyvinyl formamides, polyallyl amines, copolymers thereof, and mixtures thereof. The coating may comprise a polymer selected from the group consisting of polysaccharides (such as chitosan), polyvinyl amines, polyvinyl formamides, polyallyl amines, copolymers thereof, and mixtures thereof.

The encapsulate may comprise a wall that includes aminoplast material and a coating that includes polyvinyl formamide. The encapsulate may comprise a wall that includes polyacrylate material and a coating that includes chitosan.

The fragrance active may comprise a pro-perfume, which typically comprise a perfume raw material and a substantivity or solubility component; the perfume raw material and substantivity or solubility component are typically bonded, complexed, or otherwise coupled together. Over time or other triggering stimulus (e.g., contact with water, a change in pH, or an elevated temperature), the PRM and the component are decoupled, and the PRM is released in a protracted manner By selecting a proper substantivity or solubility component, the formulated can control the solubility of the pro-perfume in water, the degree of substantivity of the pro-perfume or fabric, or the bulk properties of the material.

For example, once the laundry process is complete and the pro-perfume has been suitably delivered to the fabric, the pro-fragrance begins to release the perfume raw material, and because this release of material is protracted, the fabric remains "fresh-" and "clean-" smelling longer.

Suitable pro-perfumes may include dimethoxybenzoin derivatives and/or amine reaction products.

The freshness active may be a malodor control agent. The malodor control agent may comprise oligoamines Certain oligoamines may contribute to the inhibition of the breakdown of certain compounds that may otherwise oxidize into malodorous compounds.

Suitable oligoamines according to the present disclosure may include diethylenetriamine (DETA), 4-methyl diethylenetriamine (4-MeDETA), dipropylenetriamine (DPTA), 5-methyl dipropylenetriamine (5-MeDPTA), triethylenetetraamine (TETA), 4-methyl triethylenetetraamine (4-MeTETA), 4,7-dimethyl triethylenetetraamine (4,7-$Me_2$TETA), 1,1,4,7,7-pentamethyl diethylenetriamine (M5-DETA), tripropylenetetraamine (TPTA), tetraethylenepentaamine (TEPA), tetrapropylenepentaamine (TPPA), pentaethylenehexaamine (PEHA), pentapropylenehexaamine (PPHA), hexaethyleneheptaamine (HEHA), hexapropyleneheptaamine (HPHA), N,N'-Bis(3-aminopropyl)ethylenediamine, or mixtures thereof.

The oligoamine may preferably be selected from diethylenetriamine (DETA), 4-methyl diethylenetriamine (4-MeDETA), 1,1,4,7,7-pentamethyl diethylenetriamine (M5-DETA), dipropylenetriamine (DPTA), 5-methyl dipropylenetriamine (5-MeDPTA), triethylenetetramine (TETA), tripropylenetetraamine (TPTA), tetraethylenepentaamine (TEPA), tetrapropylenepentaamine (TPTA), N,N'-Bis(3-aminopropyl)ethylenediamine, and mixtures thereof, more preferably diethylenetriamine (DETA), 4-methyl diethylenetriamine (4-MeDETA), 1,1,4,7,7-pentamethyl diethylenetriamine (M5-DETA), triethylenetetramine (TETA), tetraethylenepentaamine (TEPA), N,N'-Bis(3-aminopropyl)ethylenediamine, and mixtures thereof, even more preferably diethylenetriamine (DETA), 4-methyl diethylenetriamine (4-MeDETA), N,N'-Bis(3-aminopropyl)ethylenediamine, and mixtures thereof, most preferably diethylenetriamine (DETA). DETA may be most preferred due to its low molecular weight and/or relatively low cost to produce.

Rheology Modifier/Structurant

The compositions of the present disclosure may contain a rheology modifier and/or a structurant. Rheology modifiers may be used to "thicken" or "thin" liquid compositions to a desired viscosity. Structurants may be used to facilitate phase stability and/or to suspend or inhibit aggregation of particles in liquid composition, such as the encapsulates as described herein.

Suitable rheology modifiers and/or structurants may include non-polymeric crystalline hydroxyl functional structurants (including those based on hydrogenated castor oil), polymeric structuring agents, cellulosic fibers (for example, microfibrillated cellulose, which may be derived from a bacterial, fungal, or plant origin, including from wood), di-amido gellants, or combinations thereof.

Polymeric structuring agents may be naturally derived or synthetic in origin. Naturally derived polymeric structurants may comprise hydroxyethyl cellulose, hydrophobically modified hydroxyethyl cellulose, carboxymethyl cellulose, polysaccharide derivatives and mixtures thereof. Polysaccharide derivatives may comprise pectine, alginate, arabinogalactan (gum Arabic), carrageenan, gellan gum, xanthan gum, guar gum and mixtures thereof. Synthetic polymeric structurants may comprise polycarboxylates, polyacrylates, hydrophobically modified ethoxylated urethanes, hydrophobically modified non-ionic polyols and mixtures thereof. Polycarboxylate polymers may comprise a polyacrylate, polymethacrylate or mixtures thereof. Polyacrylates may comprise a copolymer of unsaturated mono- or di-carbonic acid and $C_1$-$C_{30}$ alkyl ester of the (meth)acrylic acid. Such copolymers are available from Noveon Inc. under the tradename Carbopol Aqua 30. Another suitable structurant is sold under the tradename Rheovis CDE, available from BASF.

Additional Cationic Polymer

The compositions of the present disclosure may comprise a cationic polymer in addition to the cationically substituted polyether glucans (and a cationic fabric softening active, if present) described above. Cationic polymers may serve as deposition aids, e.g., facilitating improved deposition efficiency of softening and/or freshness actives onto a target surface. Additionally or alternatively, additional cationic polymers may provide stability, structuring, and/or rheology benefits to the composition.

The composition may comprise, by weight of the composition, from 0.0001% to 3%, preferably from 0.0005% to 2%, more preferably from 0.001% to 1%, or from about 0.01% to about 0.5%, or from about 0.05% to about 0.3%, of an additional cationic polymer.

Cationic polymers in general and their methods of manufacture are known in the literature. Suitable cationic polymers may include quaternary ammonium polymers known the "Polyquaternium" polymers, as designated by the International Nomenclature for Cosmetic Ingredients, such as Polyquaternium-6 (poly(diallyldimethylammonium chloride), Polyquaternium-7 (copolymer of acrylamide and diallyldimethylammonium chloride), Polyquaternium-10 (quaternized hydroxyethyl cellulose), Polyquaternium-22 (copolymer of acrylic acid and diallyldimethylammonium chloride), and the like.

The cationic polymer may comprise a cationic polysaccharide, such as cationic starch, cationic cellulose, cationic guar, cationic chitosan, or mixtures thereof. The cationic cellulose may comprise a quaternized hydroxyethyl cellulose, preferably a hydroxyethyl cellulose derivatized with trimethyl ammonium substituted epoxide. Polymers derived from polysaccharides may be preferred, being naturally derived and/or sustainable materials. For clarity, the cationic polysaccharide as described herein, if present, is in addition to the cationically substituted poly alpha-1,3-glucan ether compounds described herein.

The cationic polymer may comprise a cationic acrylate. The cationic polymer may comprise cationic monomers, nonionic monomers, and optionally anionic monomers (so long as the overall charge of the polymer is still cationic). The cationic polymer, preferably the cationic acrylate, may comprise cationic monomers selected from the group consisting of methyl chloride quaternized dimethyl aminoethylammonium acrylate, methyl chloride quaternized dimethyl aminoethylammonium methacrylate and mixtures thereof. The cationic polymer, preferably the cationic acrylate, may comprise nonionic monomers selected from the group consisting of acrylamide, dimethyl acrylamide and mixtures thereof. The cationic polymer may optionally comprise anionic monomers selected from acrylic acid, methacrylic acid, itaconic acid, crotonic acid, maleic acid, fumaric acid, as well as monomers performing a sulfonic acid or phosphonic acid functions, such as 2-acrylamido-2-methyl propane sulfonic acid (ATBS), and their salts.

The cationic polymer, preferably the cationic acrylate polymer, may be substantially linear or may be cross-linked. The composition may comprise a polymer system, preferably a cationic acrylate polymer system, that comprises both a substantially linear cationic polymer (e.g., formed with less than 50 ppm cross-linking agent) and a cross-linked cationic polymer (e.g., formed with greater than 50 ppm cross-linking agent). Such combinations may provide both deposition and structuring benefits.

Enzymes

The treatment compositions of the present disclosure may include one or more enzymes that provide cleaning performance and/or fabric care benefits. If an enzyme(s) is included, it may be present in the composition at about 0.0001 to 0.1% by weight of the active enzyme, based on the total weight of the composition.

Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, amylases, nucleases (such as deoxyribonuclease and/or ribonuclease), phosphodiesterases, or mixtures thereof. Particularly preferred may be a mixture of protease, amylase, lipase, cellulase, phosphodiesterase, and/or pectate lyase.

Without wishing to be bound by theory, it is believed that the poly alpha-1,6-glucans and/or poly alpha-1,6-glucan ether compounds described herein are mostly or completely stable (resistant) to being degraded by cellulase enzymes. For example, the percent degradation of a poly alpha-1,6 glucan and/or poly alpha-1,6-glucan ether compound by one or more cellulases may be less than 10%, 9%, 8%, 7%, 6%, 5%, 4%, 3%, 2%, or 1%, or is 0. Advantageously, such compounds may be co-formulated with cellulase, used concurrently with cellulase-containing products, or sequentially with such products where residual cellulase may remain on a surface and/or in an aqueous environment. Thus, the treatment composition may comprise a cellulase enzyme.

A combination of two or more enzymes can be used in the composition. In some embodiments, the two or more enzymes are cellulase and one or more of a different enzyme, such as protease, amylase, mannanase, and/or lipase.

When the treatment composition comprises one or more enzymes, the treatment composition may further comprise an enzyme stabilizing agent, such as: a polyol such as propylene glycol or glycerol; a sugar or sugar alcohol; lactic acid; boric acid or a boric acid derivative (e.g., an aromatic borate ester); or mixtures thereof.

Particular Forms

The treatment composition may be in any of the following non-limiting forms:

(a) the treatment composition is in the form of a single-compartment pouch or a multi-compartment pouch, for example laundry detergent pouches, and wherein the treatment composition comprises less than 20% water by weight of the treatment composition, preferably wherein the treatment composition comprises from about 5% to about 50% of anionic surfactant, optionally wherein the poly alpha-1,6-glucan ether compound is characterized by a weight average molecular weight of from about 150,000 to about 225,000, a degree of substitution of from about 0.05 to about 0.4, and where from about 5% to about 20% of the backbone glucose monomer units have branches via alpha-1,2 and/or alpha-1,3-glycosidic linkages, preferably alpha-1,2; or (b) the treatment composition is in the form of particles, for example laundry additive particle, wherein individual particles have a mass of from about 1 mg to about 1 gram, and wherein the particles comprise the poly alpha-1,6-glucan ether compound dispersed in a water-soluble carrier, preferably a water-soluble carrier selected from the group consisting of polyethylene glycol, sodium acetate, sodium bicarbonate, sodium chloride, sodium silicate, polypropylene glycol polyoxoalkylene, polyethylene glycol fatty acid ester, polyethylene glycol ether, sodium sulfate, starch, and mixtures thereof, preferably wherein the particles further comprise perfume and/or a perfume delivery system, optionally wherein the poly alpha-1,6-glucan ether compound is characterized by a weight average molecular weight of from about 150,000 to about 225,000, a degree of substitution of from about 0.1 to about 0.4, and where from about 5% to about 10% of the backbone glucose monomer units have branches via alpha-1,2 and/or alpha-1,3-glycosidic linkages, preferably alpha-1,2; or (c) the treatment composition is in the form of a liquid, for example a liquid laundry or dish detergent, preferably a liquid laundry detergent, the treatment composition comprising from about 40% to about 95%, by weight of the treatment composition, of water, the treatment composition further comprising from about 5% to about 50%, by weight of the treatment composition, of surfactant, preferably wherein the surfactant comprises anionic surfactant, optionally wherein the poly alpha-1,6-glucan ether compound is characterized by a weight average molecular weight of from about 150,000 to about 225,000, a degree of substitution of from about 0.05 to about 0.4, and where from about 5% to about 20% of the backbone glucose monomer units have branches via alpha-1,2 and/or alpha-1,3-glycosidic linkages, preferably alpha-1,2; or (d) the treatment composition is in the form of a liquid, for example a liquid fabric softener composition, the treatment composition comprising from about 40% to about 98%, by weight of the treatment composition, of water, and from about 1% to about 35%, by weight of the treatment composition, of a fabric softening agent, preferably a quaternary ammonium compound and/or a silicone, optionally wherein the poly alpha-1,6-glucan ether compound is characterized by a weight average molecular weight of from about 150,000 to about 225,000, a degree of substitution of from about 0.4 to about 0.5, and where from about 5% to about 10% of the backbone glucose monomer units have branches via alpha-1,2 and/or alpha-1,3-glycosidic linkages, preferably alpha-1,2.

Method of Treating a Surface with a Treatment Composition

The present disclosure further relates to methods of using a treatment composition. For example, the present disclosure relates to methods of treating a surface with a treatment composition according to the present disclosure. Such methods may provide conditioning, cleaning, and/or freshening benefits.

The method may include a step of contacting a surface with a treatment composition of the present disclosure. The surface may be a fabric, such as a garment, or a dishware article.

A fabric as described herein can comprise natural fibers, synthetic fibers, semi-synthetic fibers, or any combination thereof. A semi-synthetic fiber is produced using naturally occurring material that has been chemically derivatized, an example of which is rayon. Non-limiting examples of fabric types herein include fabrics made of (i) cellulosic fibers such as cotton (e.g., broadcloth, canvas, chambray, chenille, chintz, corduroy, cretonne, damask, denim, flannel, gingham, jacquard, knit, matelassé, oxford, percale, poplin, plissé, sateen, seersucker, sheers, terry cloth, twill, velvet), rayon (e.g., viscose, modal, lyocell), linen, and TENCEL®; (ii) proteinaceous fibers such as silk, wool and related mammalian fibers; (iii) synthetic fibers such as polyester, acrylic, nylon, and the like; (iv) long vegetable fibers from jute, flax, ramie, coir, kapok, sisal, henequen, abaca, hemp and sunn; and (v) any combination of a fabric of (i)-(iv). Fabric comprising a combination of fiber types (e.g., natural and synthetic) includes those with both a cotton fiber and polyester, for example. Materials/articles containing one or more fabrics include, for example, clothing, curtains, drapes, upholstery, carpeting, bed linens, bath linens, tablecloths, sleeping bags, tents, car interiors, etc. Other materials comprising natural and/or synthetic fibers include, for example, non-woven fabrics, paddings, paper, and foams. Fabrics are typically of woven or knit construction.

Other surfaces or articles that can be treated and/or contacted include, for example, surfaces that can be treated with a dish detergent (e.g., automatic dishwashing detergent or hand dish detergent). Examples of such materials and articles include surfaces of dishes, glasses, pots, pans, baking dishes, utensils and flatware made from ceramic material, china, metal, glass, plastic (e.g., polyethylene, polypropylene, and polystyrene) and wood (collectively referred to herein as "tableware"). Examples of conditions (e.g., time, temperature, wash volume) for conducting a dishwashing or tableware washing method are known in the art. In other examples, a tableware article can be contacted with the composition herein under a suitable set of conditions such as any of those disclosed above with regard to contacting a fabric-comprising material.

The composition may be in neat form or diluted in a liquor, for example, a wash or rinse liquor. The composition may be diluted in water prior, during, or after contacting the surface or article. The surface may be optionally washed and/or rinsed before and/or after the contacting step. The composition may be applied directly onto a surface or provided to a dispensing vessel or drum of an automatic machine.

The method of treating a fabric may include the steps of: (a) optionally washing, rinsing and/or drying the surface (e.g., a fabric or a dishware article); (b) contacting the surface with a treatment composition as described herein, optionally in the presence of water; (c) optionally washing and/or rinsing the surface; and (d) optionally drying, whether passively (e.g., rack or line drying) and/or via an active method (such as a laundry dryer). The method may occur during the wash cycle or the rinse cycle, preferably the rinse cycle, of an automatic washing machine. A fabric may be treated by a wash cycle and then followed by one or more rinse cycles.

For purposes of the present disclosure, treatment may include but is not limited to, scrubbing and/or mechanical agitation.

The fabric may comprise most any fabric capable of being laundered or treated in normal consumer, commercial, or industrial use conditions.

Liquors that comprise the disclosed compositions may have a pH of from about 3 to about 11.5. When diluted, such compositions are typically employed at concentrations of from about 500 ppm to about 15,000 ppm in solution. When the wash solvent is water, and the surface is a fabric, the water temperature typically ranges from about 5° C. to about 90° C. and, the water to fabric ratio may be typically from about 1:1 to about 30:1.

A surface such as a fabric may be contacted with an anionic surfactant, optionally in the presence of water, prior to being contacted with the treatment composition. The surface (e.g., fabric) may comprise anionic surfactant that is residual from a washing step. The source of the anionic surfactant may be a detergent composition, such as a heavy duty liquid laundry detergent, a water-soluble pouch comprising a detergent composition, or a powdered laundry detergent. The detergent composition may further comprise suitable detergent adjuncts. For example, the detergent composition may further comprise cellulase enzyme, fatty acids and/or salts thereof, or mixtures thereof.

The anionic surfactant and/or source thereof (e.g., the detergent composition) may be diluted with water in a vessel, such as the drum of an automatic washing machine, to form a wash liquor; the wash liquor may contact the fabric. The method may further comprise removing the wash liquor from the vessel after contacting the fabric, but prior to the fabric being contacted with the conditioning composition.

The treatment composition may be diluted with water, optionally in a vessel such as an automatic washing machine, to make a rinse liquor. The rinse liquor may comprise anionic surfactant and/or cellulase enzymes, which may be residual or carried-over from a wash cycle. The rinse liquor may be removed from the vessel. The surface (e.g., a fabric) may be dried by any suitable process, such as in an automatic dryer, or by line drying. Drying may occur at any suitable temperature, for example a temperature of at least about 30, 40, 50, 60, 70, 80, 90, 100, 120, 140, 160, 170, 175, 180, or 200° C.

The water that is part of the wash liquor and/or the rinse liquor may be characterized by a certain hardness. For example, the water may be characterized by having less than 12 gpg, or less than 10 gpg, of hardness. The water may be characterized by having greater than 5 gpg, or greater than 10 gpg, of hardness. Without wishing to be bound by theory, it is believed that performance of the present compositions is improved when the water is characterized by relatively higher hardness through the wash, and/or by relatively lower hardness through the rinse.

Method of Making a Treatment Composition

The present disclosure relates to processes for making any of the compositions described herein. The process of making a treatment composition may comprise the step of combining a poly alpha-1,6-glucan ether compound, as described herein, with a treatment adjunct ingredient, as described herein.

The treatment compositions of the present disclosure can be formulated into any suitable form and prepared by any process chosen by the formulator. The poly alpha-1,6-glucan ether compounds and treatment adjunct materials may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, plough shear mixers, ribbon blenders, vertical axis granulators and drum mixers, both in batch and, where available, in continuous process configurations, spray dryers, and extruders.

The poly alpha-1,6-glucan ether compounds may be provided as a solid (e.g., 90% or more active, or even 100% active). It is efficient to transport polymers at high active levels to save on shipping and storage costs.

It may be desirable to provide the poly alpha-1,6-glucan ether compounds as a polymer premix. The premix may comprise, consist essentially of, or even consist of the poly alpha-1,6-glucan ether compound (e.g., 30 wt %) and water. The glucan ether polymer may be present in the premix at a level of about 5% to about 50%, preferably from about 10% to about 40%, more preferably from about 20% to about 35% by weight of the premix. The glucan ether polymer and water may be present in a polymer:water weight ratio of from about 5:95 to 50:50, or from about 10:90 to about 40:60, or about 20:80 to about 35:65, or about 30:70. In order to optimize the polymer pre-mix, the polymer may be prepared with controlled mixing, sheer, and time in order for the resulting particles to be consistent in size and shape, as well as for the glucan polymer to become fully hydrated and to control the gel phase. Upon completion of hydration and prior to addition to a base product formulation, the polymer premix may be re-mixed (e.g., with an electronic roller or overhead mixer) in order to assure uniform fluidity in case of uneven gel formation. Use of a consistent protocol can decrease variations in formulation stability as well as minimize inconsistent performance that may result from varying concentrations of the polymer premix throughout the finished product.

The fabric conditioning composition may be encapsulated in water-soluble film(s) according to known methods to form a unitized dose article.

The fabric conditioning composition may be placed into an aerosol or other spray container according to known methods.

Use of a Poly Alpha-1,6-Glucan Ether Compound

The poly alpha-1,6-glucan ether compounds described herein can be useful for providing one or more benefits. Therefore, the present disclosure relates to the use of a poly alpha-1,6-glucan ether compound according to the present disclosure for providing one or more benefits to a fabric and/or a dishware article when the fabric and/or dishware article is treated with a fabric care or dish care treatment composition comprising the poly alpha-1,6-glucan ether compound: improved softness, improved deposition or adsorption of a freshness active such as perfume and/or a perfume delivery system, improved deposition of a softness active, improved resistance to soil deposition, improved colorfastness, improved wear resistance, improved wrinkle resistance, improved antifungal activity, improved antimicrobial activity, improved freshness, improved stain resistance, improved cleaning performance when laundered, improved drying rates, improved dye, pigment or lake update, improved whiteness retention, improved anti-graying benefits, improved anti-soil redeposition benefits, or a combination thereof. Such uses and benefits may be particularly notable upon several treatment cycles.

Combinations

Specifically contemplated combinations of the disclosure are herein described in the following lettered paragraphs. These combinations are intended to be illustrative in nature and are not intended to be limiting.

A. A treatment composition comprising: a poly alpha-1,6-glucan ether compound comprising a poly alpha-1,6-glucan substituted with at least one positively charged organic group, wherein the poly alpha-1,6-glucan comprises a backbone of glucose monomer units wherein at least 65% of the glucose monomer units are linked via alpha-1,6-glycosidic linkages, and wherein the poly alpha-1,6-glucan ether compound is characterized by: i) a weight average degree of polymerization of at least 5, preferably from about 500 to about 2000, and ii) a degree of substitution of about 0.001 to about 3.0; the treatment composition further comprising a treatment adjunct ingredient, wherein the treatment composition is a fabric care composition, a dish care composition, or a mixture thereof.

B1. A treatment composition comprising: a poly alpha-1,6-glucan ether compound comprising a poly alpha-1,6-glucan substituted with at least one positively charged organic group, wherein the poly alpha-1,6-glucan comprises a backbone of glucose monomer units wherein at least 65% of the glucose monomer units are linked via alpha-1,6-glycosidic linkages, and wherein the poly alpha-1,6-glucan ether compound is characterized by: a) a weight average molecular weight of from about 1000 to about 500,000 daltons, preferably from about 80,000 to about 500,000, and/or b) having been derived from a poly alpha-1,6-glucan having a weight average molecular weight of from about 900 to about 450,000 daltons, preferably from about 50,000 to about 450,000 daltons, determined prior to substitution with the least one positively charged organic group (or, put another way, wherein the poly alpha-1,6-glucan is characterized by a weight average molecular weight of from about 900 to about 450,000 daltons), preferably both a) and b); wherein the poly alpha-1,6-glucan ether compound is further characterized by a degree of substitution of about 0.001 to about 3.0; the treatment composition further comprising a treatment adjunct ingredient; wherein the treatment composition is a fabric care composition, a dish care composition, or a mixture thereof.

B2. A treatment composition comprising: a poly alpha-1,6-glucan ether compound comprising a poly alpha-1,6-glucan substituted with at least one positively charged organic group, wherein the poly alpha-1,6-glucan ether compound is characterized by: (a) a weight average molecular weight of from about 1000 to about 150,000 daltons, preferably from about 5000 to about 100,000 daltons, more preferably from about 10,000 to about 80,000 daltons, more preferably from about 20,000 to about 60,000 daltons, (b) a backbone of glucose monomer units wherein greater than or equal to 65% of the glucose monomer units are linked via alpha-1,6-glycosidic linkages, (c) from about 20% to about 60%, preferably from about 30% to about 60%, more preferably from about 30% to about 50%, even more preferably from about 35% to about 45%, even more preferably about 40%, of the glucose monomer units have branches via alpha-1,2- or alpha-1,3-glycosidic linkages, preferably alpha-1,2-glycosidic linkages, and (d) a degree of cationic substitution of about 0.001 to about 3.0; the treatment composition further comprising a treatment adjunct ingredient; wherein the treatment composition is a fabric care composition, a dish care composition, or a mixture thereof.

C. The treatment composition of any of paragraphs A, B1, or B2, wherein at least 3%, or at least about 5%, preferably from about 5% to about 35%, more preferably from about 5% to about 30%, more preferably from about 5% to about 30%, more preferably from about 5% to about 25%, even more preferably from about 5% to about 20% of the backbone glucose monomer units have branches via alpha-1,2 and/or alpha-1,3-glycosidic linkages.

D. The treatment composition of any of paragraphs A-C, wherein the positively charged organic group comprises a substituted ammonium group, preferably a quaternary ammonium group.

E. The treatment composition of paragraph D, wherein the quaternary ammonium group comprises at least one $C_1$ to $C_{18}$ alkyl group.

F. The treatment composition of any of paragraphs D or E, wherein the quaternary ammonium group comprises at least one $C_1$ to $C_4$ alkyl group.

G. The treatment composition of any of paragraphs D-F, wherein the quaternary ammonium group comprises at least one $C_{10}$ to $C_{16}$ alkyl group, preferably wherein the quaternary ammonium group further comprises two $C_1$ to $C_4$ alkyl groups.

H. The treatment composition of any of paragraphs D-G, wherein the quaternary ammonium group comprises a trimethylammonium group.

I. The treatment composition of any of paragraphs A-H, wherein the positively charged organic group comprises a quaternary ammonium hydroxyalkyl group, preferably wherein the quaternary ammonium hydroxyalkyl group comprises a quaternary ammonium hydroxymethyl group, a quaternary ammonium hydroxyethyl group, or a quaternary ammonium hydroxypropyl group.

J. The treatment composition paragraph I, wherein the quaternary ammonium hydroxyalkyl group comprises a trimethylammonium hydroxyalkyl group, preferably a trimethylammonium hydroxypropyl group.

K. The treatment composition of any of paragraphs A-J, wherein the degree of substitution is from about 0.01 to about 1.5, preferably from about 0.01 to about 1.0, more preferably from about 0.01 to about 0.8, more preferably from about 0.03 to about 0.7, or from about 0.04 to about 0.6, or from about 0.05 to about 0.5.

L. The treatment composition of any of paragraphs A-K, wherein the poly alpha-1,6-glucan ether compound has a weight average degree of polymerization in the range of from about 5 to about 6000, preferably from about from 50 to 5000, or from 100 to 4000, or from 250 to 3000, or from 500 to 2000, or from 750 to 1500, or from 1000 to 1400, or from 1100 to 1300.

M. The treatment composition of any of paragraphs A-L, wherein the poly alpha-1,6-glucan ether compound is characterized by a weight average molecular weight of from about 10,000 to about 400,000 daltons, or from about 40,000 to about 300,000 daltons, or from about 80,000 to about 300,000 daltons, or from about 100,000 to about 250,000 daltons, or from about 150,000 to about 250,000 daltons, or from about 180,000 to about 225,000 daltons, or from about 180,000 to about 200,000 daltons.

N. The treatment composition of any of paragraphs A-M, wherein the poly alpha-1,6-glucan ether compound is characterized by having been derived from a poly alpha-1,6-glucan having a weight average molecular weight of from about 10,000 to about 350,000 daltons, or from about 50,000 to about 350,000 daltons, or from about 90,000 to about 300,000 daltons, or from about 125,000 to about 250,000 daltons, or from about 150,000 to about 200,000 daltons, determined prior to substitution with the least one positively charged organic group.

O. The treatment composition of any of paragraphs A-N, wherein the poly alpha-1,6-glucan comprises a backbone of glucose monomer units wherein at least 70%, or at least 75%, or at least 80%, or at least 90%, or at least 95% of the glucose monomer units are linked via alpha-1,6-glycosidic linkages.

P. The treatment composition of any of paragraphs A-O, wherein the poly alpha-1,6-glucan ether compound is characterized by a weight average molecular weight of from about 150,000 to about 225,000, a degree of substitution of from about 0.05 to about 0.5, and where from about 5% to about 20% of the backbone glucose monomer units have branches via alpha-1,2 and/or alpha-1,3-glycosidic linkages, preferably alpha-1,2-glycosidic linkages.

Q. The treatment composition of any of paragraphs A-P, wherein the poly alpha-1,6-glucan ether compound is characterized by a biodegradability, as determined by the Biodegradability Test Method described herein (i.e., the Carbon Dioxide Evolution Test Method of OECD Guideline 301B), of at least 5% on the 90th day of the test duration, more preferably on the 60th day of the test duration, even more preferably a biodegradability of at least 10%, or of at least 15%, or of at least 20%, or of at least 25%, or of at least 30%, or of at least 35%, or of at least 40%, or of at least 45%, or of at least 50%, or of at least 55%, or of at least 60%, or of at least 65%, or of at least 70%, or of at least 75%, or of at least 80%.

R. The treatment composition of any of paragraphs A-Q, wherein the treatment composition comprises from about 0.01% to about 10%, or from about 0.1% to about 5%, or from about 0.1% to about 3%, or from about 0.1% to about 2%, or from about 0.1% to about 1%, or from about 0.1% to about 0.8%, by weight of the treatment composition, of the poly alpha-1,6-glucan ether compound.

S. The treatment composition of any of paragraphs A-R, wherein the treatment adjunct ingredient is selected from the group consisting of surfactants, conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents, aesthetic dyes, additional perfumes and perfume delivery systems, structure elasticizing agents, carriers, hydrotropes, processing aids, anti-agglomeration agents, coatings, formaldehyde scavengers, pigments, and mixtures thereof.

T. The treatment composition of any of paragraphs A-S, wherein the treatment composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

U. The treatment composition of any of paragraphs A-T, wherein the treatment composition is a liquid characterized by a viscosity of from about from 1 to 1500 centipoises (1-1500 mPa*s), or from 100 to 1000 centipoises (100-1000 mPa*s), or from 100 to 500 centipoises (100-500 mPa*s), or from 100 to 300 centipoises (100-300 mPa*s), or from 100 to 200 centipoises (100-200 mPa*s) at 20 $s^{-1}$ and 21° C.

V. The treatment composition of any of paragraphs A-U, wherein the treatment composition is a laundry detergent composition, a fabric conditioning composition, a laundry additive, a fabric pre-treat composition, a fabric refresher composition, an automatic dishwashing composition, a manual dishwashing composition, or a mixture thereof.

W. The treatment composition of any of paragraphs A-V, wherein at least one of (a)-(d) is true: (a) the treatment composition is in the form of a single-compartment pouch or a multi-compartment pouch, and wherein the treatment adjunct ingredient comprises less than 20% water by weight of the treatment composition, and optionally wherein the poly alpha-1,6-glucan ether compound is characterized by a weight average molecular weight of from about 150,000 to about 225,000, a degree of substitution of from about 0.05 to about 0.4, and where from about 5% to about 20% of the backbone glucose monomer units have branches via alpha-1,2 and/or alpha-1,3-glycosidic linkages, preferably alpha-1,2; or (b) the treatment composition is in the form of particles, wherein individual particles have a mass of from about 1 mg to about 1 gram, and wherein the particles comprise the poly alpha-1,6-glucan ether compound dispersed in a water-soluble carrier, preferably a water-soluble carrier selected from the group consisting of polyethylene glycol, sodium acetate, sodium bicarbonate, sodium chloride, sodium silicate, polypropylene glycol polyoxoalkylene, polyethylene glycol fatty acid ester, polyethylene glycol ether, sodium sulfate, starch, and mixtures thereof; and optionally wherein the poly alpha-1,6-glucan ether compound is characterized by a weight average molecular weight of from about 150,000 to about 225,000, a degree of substitution of from about 0.1 to about 0.4, and where from about 5% to about 10% of the backbone glucose monomer units have branches via alpha-1,2 and/or alpha-1,3-glycosidic linkages, preferably alpha-1,2; or (c) the treatment composition is in the form of a liquid, the treatment composition comprising from about 40% to about 95%, by weight of the treatment composition, of water, the treatment composition further comprising from about 5% to about 50%, by weight of the treatment composition, of surfactant, and optionally wherein the poly alpha-1,6-glucan ether compound is characterized by a weight average molecular weight of from about 150,000 to about 225,000, a degree of substitution of from about 0.05 to about 0.4, and where from about 5% to about 20% of the backbone glucose monomer units have branches via alpha-1,2 and/or alpha-1,3-glycosidic linkages, preferably alpha-1,2; or (d) the treatment composition is in the form of a liquid, the treatment composition comprising from about 40% to about 98%, by weight of the treatment composition, of water, and from about 1% to about 35%, by weight of the treatment composition, of a fabric softening agent, preferably a quaternary ammonium compound and/or a silicone, and optionally wherein the poly alpha-1,6-glucan ether compound is characterized by a weight average molecular weight of from about 150,000 to about 225,000, a degree of substitution of from about 0.4 to about 0.5, and where from about 5% to about 10% of the backbone glucose monomer units have branches via alpha-1,2 and/or alpha-1,3-glycosidic linkages, preferably alpha-1,2.

X. A method of treating a surface with the treatment composition according to any of paragraphs A-W, the method comprising the step of contacting the surface with the treatment composition, optionally in the presence of water, wherein the surface is fabric or dishware.

Test Methods

Method for Determining Anomeric Linkages by NMR Spectroscopy

Glycosidic linkages in water soluble oligosaccharides and polysaccharide products synthesized by a glucosyltransferase GTF8117 and alpha-1,2 branching enzyme are determined by $^1$H NMR (Nuclear Magnetic Resonance Spectroscopy). Dry oligosaccharide/polysaccharide polymer (6 mg to 8 mg) are dissolved in a solution of 0.7 mL of 1 mM DSS (4,4-dimethyl-4-silapentane-1-sulfonic acid; nmr reference standard) in $D_2O$. The sample is stirred at ambient temperature overnight. 525 uL of the clear homogeneous solution is transferred to a 5 mm NMR tube. 2D $^1$H,$^{13}$C homo/heteronuclear suite of NMR experiments are used to identify AGU (anhydroglucose unit) linkages. The data is collected at 20° C. and processed on a Bruker Avance III NMR spectrometer, operating at either 500 MHz or 600 MHz. The systems are equipped with a proton optimized, helium cooled cryoprobe. The 1D $^1$H NMR spectrum is used to quantify glycosidic linkage distribution. The results reflect the ratio of the integrated intensity of a NMR resonance representing an individual linkage type divided by the integrated intensity of the sum of all peaks which represent glucose linkages, multiplied by 100.

$^1$H Nuclear Magnetic Resonance (NMR) Method for Determining Molar Substitution of Poly Alpha-1,6-Glucan Ether Derivatives Approximately 30 mg of the poly alpha-1,6-glucan ether derivative is weighed into a vial on an analytical balance. The vial is removed from the balance and 1.0 mL of deuterium oxide was added to the vial. A magnetic stir bar is added to the vial and the mixture is stirred to suspend the solid. Deuterated sulfuric acid (50% v/v in $D_2O$), 1.0 mL, is then added to the vial and the mixture is heated at 90° C. for 1 hour in order to depolymerize and solubilize the polymer. The solution is allowed to cool to room temperature and then a 0.8 mL portion of the solution is transferred into a 5-mm NMR tube using a glass pipet. A quantitative $^1$H NMR spectrum is acquired using an Agilent VNMRS 400 MHz NMR spectrometer equipped with a 5-mm Autoswitchable Quad probe. The spectrum is acquired at a spectral frequency of 399.945 MHz, using a spectral window of 6410.3 Hz, an acquisition time of 3.744 seconds, an inter-pulse delay of 10 seconds and 64 pulses. The time domain data are transformed using exponential multiplication of 0.50 Hz.

Determination of Weight Average Molecular Weight and/or Degree of Polymerization Degree of polymerization (DP) is determined by size exclusion chromatography (SEC).

For SEC analysis, dry poly alpha-1,6-glucan ether derivative is dissolved in phosphate-buffered saline (PBS) (0.02-0.2 mg/mL). The chromatographic system used is an Alliance™ 2695 liquid chromatograph from Waters Corporation (Milford, MA) coupled with three on-line detectors: a differential refractometer 410 from Waters, a multi-angle light-scattering photometer Heleos™ 8+ from Wyatt Technologies (Santa Barbara, CA), and a differential capillary viscometer ViscoStar™ from Wyatt Technologies. The columns used for SEC are two Tosoh Haas Bioscience TSK GMPW$_{XL}$ g3K and g4K G3000PW and G4000PW polymeric columns for aqueous polymers. The mobile phase is PBS. The chromatographic conditions used are 30° C. at column and detector compartments, 30° C. at sample and injector compartments, a flow rate of 0.5 mL/min, and injection volume of 100 μL. The software packages used for data reduction are Astra version 6 from Wyatt (triple detection method with column calibration).

Milliequivalents Calculation

As used herein, the term "Cationic Charge Density (CCD) per dose" means the amount of positive charge present in a Volume of a single dose of the fabric conditioner composition to be dispensed. By way of example, assuming a fabric conditioner dose of 48.5 g, that contains 0.48% of a cationic polymer having a monomer average molecular weight of 220 g/mol and a degree of cationic substitution of 0.38, the CCD is calculated as follows: polymer charge density is 0.38/220×1000 or 1.7 meq/g, and the CCD is 48.5 g×0.0048×1.7 meq/g, or 0.40 meq per dose.

Zeta Potential Measurements

The zeta potential is measured using a Malvern Zeta Sizer ZEN3600 and a disposable capillary sample cell (green cell). Instrument is calibrated using Zeta Potential transfer standard DTS 1235, Batch #311808, −42 mV+/−4.2 m to assure instrument if functioning properly. Flush the capillary cell with 1-2 mL ethanol, then with DI water before starting of the experiment. Samples are prepared by mixing 99.75 g the Tide HDL solution at the target concentration with 0.25 g of the fabric conditioner composition. Tide HDL solution is prepared by diluting the target amount of Tide HDL detergent using 7 gpg water hardness. Sample is transferred to the capillary sample cell using a syringe, making sure that no air bubbles are present in the cell. Cell is filled to the top, then place a cap on the cell outlet and inlet, again making sure no air bubbles are present in the sample. Finally, place the cell in the sample chamber, with the electrodes facing the sides of the system. The experiment is run using a refractive index of 1.46 (this number may vary for suspensions and one can measure the refractive index for any particulate suspension using a refractometer), a temperature of 25° C., and a 120 second equilibration time. The instrument uses the Smoluchowski model to calculate the zeta potential of the sample.

Biodegradation Test Method

The biodegradability of the polysaccharide derivative is determined following the OECD 301B Ready Biodegradability $CO_2$ Evolution Test Guideline (see OECD, 1992. Organization for Economic Co-operation and Development, OECD 301 Ready Biodegradability. OECD Guidelines for the Testing of Chemicals, Section 3—herein incorporated by reference). In this study, the test substance is the sole carbon and energy source, and under aerobic conditions, microorganisms metabolize the test substance producing $CO_2$ or incorporating the carbon into biomass. The amount of $CO_2$ produced by the test substance (corrected for the $CO_2$ evolved by the blank inoculum) is expressed as a percentage of the theoretical amount of $CO_2$ ($ThCO_2$) that could have been produced if the organic carbon in the test substance was completely converted to $CO_2$.

Homogenization

Homogenization is performed using an IKA ULTRA TURRAX T25 Digital Homogenizer (IKA, Wilmington, NC).

Fabric Preparation

To assess performance of a conditioning composition and/or polymer contained therein, fabrics are prepared/treated according to the following method.

A. Equipment and Materials

Fabrics are assessed using Kenmore FS 600 and/or 80 series washer machines. Wash Machines are set at: 32° C./15° C. wash/rinse temperature, 6 gpg hardness, normal cycle, and medium load (64 liters). Fabric bundles consist of 2.5 kilograms of clean fabric consisting of 100% cotton. Test swatches are included with this bundle and comprise of 100% cotton Euro Touch terrycloth towels (purchased from Standard Textile, Inc. Cincinnati, OH).

B. Stripping and Desizing

Prior to treatment with any test products, the fabric bundles are stripped according to the Fabric Preparation-Stripping and Desizing procedure before running the test.

The Fabric Preparation-Stripping and Desizing procedure includes washing the clean fabric bundle (2.5 Kg of fabric comprising 100% cotton) including the test swatches of 100% cotton EuroTouch terrycloth towels for 5 consecutive wash cycles followed by a drying cycle. AATCC (American Association of Textile Chemists and Colorists) High Efficiency (HE) liquid detergent is used to strip/de-size the test swatch fabrics and clean fabric bundle (lx recommended dose per wash cycle). The wash conditions are as follows: Kenmore FS 600 and/or 80 series wash machines (or equivalent), set at: 48° C./48° C. wash/rinse temperature, water hardness equal to 0 gpg, normal wash cycle, and medium sized load (64 liters). The dryer timer is set for 55 minutes on the cotton/high/timed dry setting.

C. Test Treatment

Tide Free liquid detergent (lx recommended dose) is added under the surface of the water after the machine is at least half full. Once the water stops flowing and the washer begins to agitate, the clean fabric bundle is added. When the machine is almost full with rinse water, and before agitation has begun, the fabric care testing composition (e.g., the liquid conditioning composition) is slowly added (lx dose), ensuring that none of the fabric care testing composition comes in direct contact with the test swatches or fabric bundle. When the wash/rinse cycle is complete, each wet fabric bundle is transferred to a corresponding dryer. The dryer used is a Maytag commercial series (or equivalent) electric dryer, with the timer set for 55 minutes on the cotton/high heat/timed dry setting. This process is repeated for a total of three (3) complete wash-dry cycles. After the third drying cycle and once the dryer stops, 12 Terry towels from each fabric bundle are removed for actives deposition analysis. The fabrics are then placed in a constant Temperature/Relative Humidity (21° C., 50% relative humidity) controlled grading room for 12-24 hours and then graded for softness and/or actives deposition.

Secant Modulus Instron Method

The Secant Modulus is measured using a Tensile and Compression Tester Instrument, such as the Instron Model 5565 (Instron Corp., Norwood, Massachusetts, U.S.A.). The instrument is configured depending on the fabric type by selecting the following settings: the mode is Tensile Extension; the Waveform Shape is Triangle; the Maximum Strain is 10% for 479 Sanforized and 35% for 7422 Knitted, the Rate is 0.83 mm/sec for 479 Sanforized and 2.5 mm/sec for 7422 Knitted, the number of Cycles is 4; and the Hold time is 15 seconds between cycles.

1. With scissors, cut serged edge of one entire side of each swatch in the warp direction and carefully peel off strings without stressing the fabric until an even edge is achieved.
2. Place a fabric press die that cuts strips 1" wide and at least 4" long parallel to the even edge and cut strips lengthwise in the warp direction.
3. Cut 3 strips of test fabric 479 Sanforized 100% cotton woven or test fabric 7422 50:50 polycotton knitted from 3 separate fabric swatches per treatment. Condition fabrics in a constant temperature (70° F.) and humidity (50% RH) room for at least 6 hours before analysis.
4. Clamp the top and then the bottom of fabric strip into the 2.54 cm grips on the tensile tester instrument with a 2.54 cm gap setting, loading a small amount of force (0.0.05N-0.2N) on the sample.
5. Release bottom clamp and re-clamp sample during the hold cycle, loading 0.05N-0.2N of force on the sample removing the slack by again loading the same force.
6. When 4 hysteresis cycles have been completed for the sample, Secant Modulus is reported in megapascal (MPa). The final result is the average of the individual cycle 4 modulus results from all test strips for a given treatment on a given fabric type. The Secant Modulus reported is calculated at the Maximum Strain for each fabric type.

Method for Determining Viscosity

The viscosity of the fabric conditioning composition is measured using a TA instrument AR G2 controlled stress rheometer, with a concentric cylinder geometry. Temperature is held constant at 20° C. for 2 minutes before starting of the test. Viscosity is then measured at different shear rates from 0.01 to 100 sec-1 using a logarithmic steady state flow ramp of 5 points per decade going upwards.

Technical Olfactive Panel

The dry olfactive performance of cotton terry towels from Calderon Textiles is assessed by a panel of 20 experts after dry fabrics equilibrate overnight in constant 70° F. temperature and 50% humidity room. Comparisons are made using an intensity scale from 0 to 10 where 0 means not detectable, 1-3: slight fragrance, 4-7: moderate fragrance, 8-10: strong fragrance. Panelists grades are converted to a 10-100 scale and averaged across all 20 panelists.

Determining Coefficient of Friction (CoF)

To determine the Coefficient of Friction (CoF or kCoF, for kinetic Coefficient of Friction), the following method is used.

Five fabrics (32 cm×32 cm 100% cotton terry wash cloths, such as RN37002LL from Calderon Textiles, Indianapolis, Indiana, USA) are treated three times with standard wash/dry cycles.

When the 3$^{rd}$ drying cycle is completed, the treated fabric cloths are equilibrated for a minimum of 8 hours at 23° C. and 50% Relative Humidity. Treated fabrics are laid flat and stacked no more than 10 cloths high while equilibrating. Friction measurements for the test product and nil-polymer control product are made on the same day under the same environmental conditions used during the equilibration step.

A friction/peel tester with a 2 kilogram force load cell is used to measure fabric to fabric friction (such as model FP2250, Thwing-Albert Instrument Company, West Berlin, New Jersey, USA). A clamping style sled with a 6.4×6.4 cm footprint and weight of 200 g is used (such as item number 00225-218, Thwing Albert Instrument Company, West Berlin, New Jersey, USA). The distance between the load cell and the sled is set at 10.2 cm. The distance between the crosshead arm and the sample stage is adjusted to 25 mm, as measured from the bottom of the cross arm to the top of the stage. The instrument is configured with the following settings: T2 kinetic measure time of 10.0 seconds, total measurement time of 20.0 seconds, test rate of 20 cm/minute.

The terry wash cloth is placed tag side down and the face of the fabric is then defined as the side that is upwards. If there is no tag and the fabric is different on the front and back, it is important to establish one side of the terry fabric as being designated "face" and be consistent with that designation across all terry wash cloths. The terry wash cloth is then oriented so that the pile loops are pointing toward the left. An 11.4 cm×6.4 cm fabric swatch is cut from the terry wash cloth using fabric shears, 2.54 cm in from the bottom and side edges of the cloth. The fabric swatch should be aligned so that the 11.4 cm length is parallel to the bottom of the cloth and the 6.4 cm edge is parallel to the left and right sides of the cloth. The wash cloth from which the swatch was cut is then secured to the instrument's sample table while maintaining this same orientation.

The 11.4 cm×6.4 cm fabric swatch is attached to the clamping sled with the face side outward so that the face of the fabric swatch on the sled can be pulled across the face of the wash cloth on the sample plate. The sled is then placed on the wash cloth so that the loops of the swatch on the sled are oriented against the nap of the loops of the wash cloth. The sled is attached to the load cell. The crosshead is moved until the load cell registers 1.0-2.0 gf (gram force), and is then moved back until the load reads 0.0 gf. Next, the measurement is started and the Kinetic Coefficient of Friction (kCOF) is recorded by the instrument every second during the sled drag.

For each wash cloth, the average kCOF over the measurement time frame of 10 seconds to 20 seconds is calculated:

$$f=(kCOF_{10s}+kCOF_{11s}+kCOF_{12s}+\ldots+kCOF_{20s})/12$$

Then the average kCOF of the five wash cloths per product is calculated:

$$F=(f_1+f_2+f_3+f_4+f_5)/5$$

The Friction Change for the test product versus the control detergent is calculated as follows:

$$F_{(control)}-F_{(test\ product)}=\text{Friction Change}$$

Method of Measuring Iodine Value of a Quaternary Ammonium Ester Compound

The iodine value of a quaternary ammonium ester fabric compound is the iodine value of the parent fatty acid from which the fabric conditioning active is formed, and is defined as the number of grams of iodine which react with 100 grams of parent fatty acid from which the fabric conditioning active is formed.

First, the quaternary ammonium ester compound is hydrolysed according to the following protocol: 25 g of treatment composition is mixed with 50 mL of water and 0.3 mL of sodium hydroxide (50% activity). This mixture is boiled for at least an hour on a hotplate while avoiding that the mixture dries out. After an hour, the mixture is allowed to cool down and the pH is adjusted to neutral (pH between 6 and 8) with sulfuric acid 25% using pH strips or a calibrated pH electrode.

Next the fatty acid is extracted from the mixture via acidified liquid-liquid extraction with hexane or petroleum ether: the sample mixture is diluted with water/ethanol (1:1) to 160 mL in an extraction cylinder, 5 grams of sodium chloride, 0.3 mL of sulfuric acid (25% activity) and 50 mL of hexane are added. The cylinder is stoppered and shaken for at least 1 minute. Next, the cylinder is left to rest until 2 layers are formed. The top layer containing the fatty acid in hexane is transferred to another recipient. The hexane is then evaporated using a hotplate leaving behind the extracted fatty acid.

Next, the iodine value of the parent fatty acid from which the fabric conditioning active is formed is determined following ISO3961:2013. The method for calculating the iodine value of a parent fatty acid comprises dissolving a prescribed amount (from 0.1-3 g) into 15 mL of chloroform. The dissolved parent fatty acid is then reacted with 25 mL of iodine monochloride in acetic acid solution (0.1M). To this, 20 mL of 10% potassium iodide solution and 150 mL deionised water is added. After the addition of the halogen has taken place, the excess of iodine monochloride is determined by titration with sodium thiosulphate solution (0.1M) in the presence of a blue starch indicator powder. At the same time a blank is determined with the same quantity of reagents and under the same conditions. The difference between the volume of sodium thiosulphate used in the blank and that used in the reaction with the parent fatty acid enables the iodine value to be calculated.

EXAMPLES

The examples provided below are intended to be illustrative in nature and are not intended to be limiting.

For the formulation examples below, ingredients are identified according to the following key unless otherwise indicated.

TABLE 1

| | |
|---|---|
| Fabric Softening Active 1 | N,N-di(alkanoyloxyethyl)-N,N-dimethylammonium chloride where alkyl consists predominantly of $C_{16}$-$C_{18}$ alkyl chains with an IV value of about 20, available from Evonik |
| Fabric Softening Active 2 | C18 Unsaturated DEEHMAMS (Diethyl Ester Hydroxyethyl Methyl Ammonium Methyl Sulphate), available from Evonik |
| Fabric Softening Active 3 | Esterification product of fatty acids (C16-18 and C18 unsaturated) with triethanolamine, quaternized with dimethyl sulphate (REWOQUAT WE 18, ex Evonik) |
| Amino-functional Organosiloxane | As described in U.S. patent applications 2011/0243878 and/or U.S. 2012/0323032 |
| Crosslinked Structuring Polymer | Dimethylamino Ethyl Acrylate methochloride (DMA3) + Acrylamide (AM) in a 60:40 weight ratio, respectively); 375 ppm Pentaerythrityl triacrylate/ pentaerythrityl tetraacrylate (PETIA) cross-linker; 0 ppm chain transfer agent. |
| Quaternized Polyacrylamide | Dimethylamino Ethyl Acrylate methochloride (DMA3) + Acrylamide (AM) in a 60:40 weight ratio, respectively); 10 ppm Pentaerythrityl triacrylate/ pentaerythrityl tetraacrylate (PETIA) cross-linker; 0 ppm chain transfer agent. |
| Flowsoft FS 222 | Available from SNF Floerger |
| Quaternary Ammonium Poly alpha-1,6-glucan | Details provided for each example |
| Encapsulated Perfume | Perfume encapsulates (melamine-formaldehyde shells, with deposition aid coating); obtained from Encapsys, Inc. (Appleton, Wis., USA) |
| CatHEC | Cationically-modified hydroxyethylcellulose |
| Aminosilicone | PDMS with propoxylated pendant diamino groups |

Example 1. Synthesis Examples

A. Preparation of Poly Alpha-1,6-Glucan Samples

Methods to prepare poly alpha-1,6-glucan containing various amounts of alpha-1,2 branching are disclosed in published patent application WO 2017/091533, incorporated herein by reference. Reaction parameters such as sucrose concentration, temperature, and pH can be adjusted to provide poly alpha-1,6-glucan having various levels of alpha-1,2-branching and molecular weight.

Poly alpha-1,6-glucans having alpha-1,2-branching degrees of 5%, 10%, 24%, and 32% may be prepared.

B. Substituted Polymer (1)

This Example describes preparation of a quaternary ammonium poly alpha-1,6-glucan ether compound, specifically trimethylammonium hydroxypropyl poly alpha-1,6-glucan.

Polysaccharide solution (43% solid, 7.3 kg, alpha-(1,6)-glucan with 32% branching, Mw 53 kDa) was charged into a 22 L reactor equipped with an overhead stirrer. To the stirring solution was added 2.72 kg of 50% NaOH solution. The mixture was heated to 50° C. To this was added 7.6 kg of a 65% solution of 3-chloro-2-hydroxypropyltrimethylammonium chloride (QUAB 188) with an additional funnel, over 2 hours and 45 min. The reaction was then kept at 58° C. for 3 hours. The reaction was dilution with 500 mL, and neutralized with 18 wt % HCl. The product was purified by ultrafiltration (10 kDa membrane), and freeze dried. The degree of substitution was determined to be 0.4 by $^1$H NMR.

C. Substituted Polymer (2)

This Example describes preparation of a quaternary ammonium poly alpha-1,6-glucan ether compound, specifically trimethylammonium hydroxypropyl poly alpha-1,6-glucan.

To a 1 L round bottom flask equipped with an overhead stirrer was added 100 mL water, followed by 100 g of polysaccharide (alpha-(1,6)-glucan with 10% branching, Mw 60 kDa). After dissolution, 50% sodium hydroxide solution was added (87 g) over 5-10 min. The mixture was stirred at room temperature for 1 hour. To this was added 265 g of a 60% solution of 3-chloro-2-hydroxypropyltrimethylammonium chloride (QUAB 188) via an additional 10 min. The mixture was heated at 60° C. under nitrogen for 3 hours. The mixture was cooled to about 50° C., and neutralized with 18% HCl. The resulting solution was diluted with water (4 L) and purified by ultrafiltration (30 kDa membrane), and freeze dried. The degree of substitution was determined to be 0.6 by $^1$H NMR.

D. Substituted Polymer (3)

This Example describes preparation of a quaternary ammonium poly alpha-1,6-glucan ether compound, specifically trimethylammonium propyl poly alpha-1,6-glucan.

To a 2 L reactor equipped with an overhead stirrer was added 690 g of a polysaccharide solution (alpha-(1,6)-glucan with 5% alpha(1,2) branching, 29% solids, Mw 185 kDa). The solution was stirred. To this stirring solution was added 12 g of 50% sodium hydroxide dropwise. The mixture was stirred at room temperature for 45 min. To this stirring mixture was added 100 g 71-75% solution of a glycidyltrimethylammonium chloride (QUAB 151). The mixture was heated for 4 hours at 60° C. The mixture was diluted with 200 mL water, and neutralized with 18 wt % HCl. The product was purified by ultrafiltration (30 kDa membrane), and freeze dried. The degree of substitution was determined to be 0.4 by $^1$H NMR.

E. Substituted Polymer (4)

This Example describes preparation of a quaternary ammonium poly alpha-1,6-glucan ether compound, specifically trimethylammonium propyl poly alpha-1,6-glucan.

To a 2 L reactor equipped with an overhead stirrer was added 690 g of a polymer solution (alpha-(1,6)-glucan with 5% alpha-(1,2) branching, 29% solids, Mw 185 kDa). The solution was stirred. To this stirring solution was added 12 g of 50% sodium hydroxide dropwise. The mixture was stirred at room temperature for 45 min. To this stirring mixture was added 33 g 71-75% solution of a glycidyltrimethylammonium chloride (QUAB 151). The mixture was heated for 4 hours at 60° C. The mixture was diluted with 200 mL water, and neutralized with 18 wt % HC. The product was purified by ultrafiltration (30 kDa membrane), and freeze dried. The degree of substitution was determined to be 0.03 by $^1$H NMR.

F. Substituted Polymer (5)

This Example describes preparation of a quaternary ammonium poly alpha-1,6-glucan ether compound, specifically dodecyldimethylammonium hydroxypropyl poly alpha-1,6-glucan.

A 4-neck, 500 mL reactor equipped with a mechanical stir rod, thermocouple, and addition funnel was charged with 19 g of water. Polysaccharide solution (21 g, alpha-(1,6)-glucan with 32% 1,2-branching, Mw 68 kDa). The mixture was stirred while 137 g of 40 wt % of 3-chloro-2-hydroxypropyl dodecyldimethylammonium chloride (QUAB 342). The resulting mixture was stirred at room temperature for 2 hours. Sodium hydroxide 15.8 g of 50 wt. % sodium was added over a 10-minute period. The reaction mixture was heated to 60° C. (10 min) stirred at 57-60° C. for 3 hours. After being cooled to 35° C., the reaction mixture was poured into water to total volume about 3 L. The pH of the mixture was adjusted to about 7 by the addition of 18.5 wt. % hydrochloric acid. The product was purified by using ultrafiltration (5 kDa membrane) and freeze dried. The degree of substitution was determined to be 0.4 by $^1$H NMR.

G. Substituted Polymer (6)

This Example describes preparation of a quaternary ammonium poly alpha-1,6-glucan ether compound, specifically dodecyldimethylammonium hydroxypropyl poly alpha-1,6-glucan.

A 4-neck, 500 mL reactor equipped with a mechanical stir rod, thermocouple, and addition funnel was charged with 80 g of 3-Chloro-2-hydroxypropyl dodecyldimethylammonium chloride (Quab 342, which contains 32 g of the chloride, 94 mmoles, and water 48 g water). Glucan powder (21 g, 21 g, alpha-(1,6)-glucan with 32% 1,2-branching, Mw 68 kDa). The mixture was stirred at room temperature for 2 hours. Sodium hydroxide 10 g (0.125 moles NaOH) of 50 wt. % sodium was added over a 10-minute period. Water (10 mL) was added. The reaction mixture was heated to 60° C. (10 min) stirred at 58-60° C. for 3 hours. After being cooled to 35° C., the reaction mixture was poured into water to total volume about 3 L. The pH of the mixture was adjusted to about 7 by the addition of 18.5 wt. % hydrochloric acid. The mixture was filtered and no solid was observed in the filter. The filtrate was purified by using ultrafiltration, (10K membrane), then freeze dried. The degree of substitution was determined to be 0.4 by $^1$H NMR.

Example 2. Exemplary Quaternary Ammonium Poly Alpha-1,6-Glucan Ether Compounds Table 2 shows characteristics of several exemplary quaternary ammonium poly alpha-1,6-glucan ether compounds according to the present disclosure. In the compounds listed below, the cationic group is a quaternized ammonium group substituted with three methyl groups (i.e., trimethyl ammonium quat), unless otherwise indicated with an asterix (*). The cationic groups are linked to the ether group (and thus to the glucan backbone) by a hydroxypropyl group, but any suitable alkyl group or other hydroxyalkyl group could be used to link accordingly.

TABLE 2

| | Poly alpha-1,6-glucan ether description | | |
|---|---|---|---|
| Polymer | Backbone MW (kDa) | Cationic DoS | Degree of Alpha 1,2 Branching |
| A | 40 | 0.5 | 40% |
| B | 40 (75)** | 0.5 | 40% |
| C | 17 | 0.3 | 40% |
| D | 40 (59)** | 0.4* | 40% |
| E | 40 | 0.26* | 40% |
| F | 40 (84)** | 0.8 | 40% |
| G | 109 (148)** | 0.51 | 26% |
| H | 194 (245)** | 0.50 | 41% |
| I | 194 (269)** | 0.7 | 41% |
| J | 185 | 0.15 | 5% |
| K | 185 | 0.38 | 5% |
| L | 185 | 0.03 | 5% |
| M | 200 | 0.21* | 20% |

TABLE 2-continued

| | Poly alpha-1,6-glucan ether description | | |
|---|---|---|---|
| Polymer | Backbone MW (kDa) | Cationic DoS | Degree of Alpha 1,2 Branching |
| N | 200 | 0.19 | 10% |
| O | 185 | 0.05 | 5% |
| P | 185 | 0.40 | 20% |
| Q | 185 | 0.07 | 5% |
| R | 185 | 0.11 | 5% |
| S | 185 | 0.59 | 5% |
| T | 109 | 0.22 | 26% |

*cationic group: quaternized ammonium group substituted with two methyl groups and one C12 alkyl group (dimethyl, C12 ammonium quat)

**Parenthetical number is molecular weight of ether compound (i.e., backbone plus derivatized cationic ether group)

Example 3. Softness Benefits

The following tests are run to show that the presence of poly alpha-1,6-glucan ether compound having a cationic charge can improve performance of a liquid conditioning composition.

Fabrics are treated according to the Fabric Preparation method provided above. The liquid conditioning compositions are liquid fabric enhancers according to the formulas shown below in Table 3. Formulas 2 and 3 include a cationic polyglucan compound; Formula 1 does not, as a comparative example. For each example, 49.5 g/dose of fabric enhancer composition is provided. After treatment, the Secant Modulus and freshness performance of the fabrics are determined using an Instron instrument according to the methods described above.

TABLE 3

| Ingredient | 1 (comp.) | 2 (inv.) | 3 (inv.) |
|---|---|---|---|
| Fabric Softener Active 1 | 7.5% | 6.5% | 2.0% |
| Crosslinked Structuring Polymer | 0.12% | 0.12% | 0.12% |
| Quaternized Polyacrylamide | 0.04% | — | — |
| Quaternary Ammonium Poly alpha-1, 6-glucan ether (Polymer K, Table 1) | — | 0.24% | 1.0% |
| Perfume | 1.2% | 1.2% | 1.2% |
| Encapsulated Perfume | 0.25% | 0.25% | 0.25% |
| Water, suds suppressor, stabilizer, pH control agent, buffers, dyes | Complete to 100% | Complete to 100% | Complete to 100% |
| Secant Modulus (479 Sanforized) | 182 MPa | 157 MPa | 166 MPa |

As shown in Table 3, addition of a cationically substituted poly-alpha-1,6-glucan ether compound according to the present disclosure can result in lower secant modulus measurements, which is correlated with improved softness, even when the composition contains a relatively lower amount of fabric softener active.

Example 4. Softness and Freshness Benefits (1)

The following tests are run to show the effect of molecular weight of the cationic polyglucan compound on Secant Modulus values and on freshness benefits as determined by a Technical Olfactive Panel.

Fabrics are treated according to the Fabric Preparation method provided above. The liquid conditioning compositions are liquid fabric enhancers according to the formula shown above in Table 4A, and the cationic polyglucan compounds are varied as shown below in Table 4B. Formula 5 includes a cationic polyglucan compound; Formula 4 does not, as a comparative example. For each example, 49.5 g/dose of liquid conditioning composition is provided. After treatment, the Secant Modulus and freshness performance of the fabric were determined using an Instron instrument and a technical olfactive panel according to the method described above. Results are shown in Table 4B.

TABLE 4A

| Ingredient | 4 (comp.) | 5 (inv.) |
|---|---|---|
| Fabric Softener Active 1 | 4.5% | 4.5% |
| Crosslinked Structuring Polymer | 0.12% | 0.12% |
| Quaternized Polyacrylamide | 0.04% | — |
| Quaternary Ammonium Poly alpha-1, 3-glucan (see Table 4 below) | — | 0.48% |
| Perfume | 1.2% | 1.2% |
| Encapsulated Perfume | 0.25% | 0.25% |
| Water, suds suppressor, stabilizer, pH control agent, buffers, dyes | Complete to 100% | Complete to 100% |

TABLE 4B

| | | Poly alpha-1,6-glucan ether | | | | Average Dry |
|---|---|---|---|---|---|---|
| Formula | Polymer (see Table 2) | Backbone MW (kDa) | Cationic DoS | Degree of Branching (alpha-1,2) | Secant Modulus | Fabric Olfactive Panel Grade |
| 5 | B | 40 (75)** | 0.5 | 40% | 213 MPa | 34 |
| 5 | F | 40 (84)** | 0.8 | 40% | 200 MPa | 36 |
| 5 | G | 109 (148)** | 0.51 | 26% | 204 MPa | 47 |
| 5 | H | 194 (245)** | 0.50 | 41% | 218 MPa | 42 |
| 5 | I | 194 (269)** | 0.7 | 41% | 184 MPa | 40 |
| 5 | J | 185 | 0.15 | 5% | 194 MPa | 44 |
| 5 | K | 185 | 0.38 | 5% | 166 MPa | 46 |
| 5 | M | 185 | 0.21 | 20% | 185 MPa | 44 |
| 5 | N | 185 | 0.19 | 10% | 197 MPa | |
| 4 (comp.) | — | — | — | — | 214 MPa | 36 |

**Parenthetical number is molecular weight of ether compound (i.e., backbone plus derivatized cationic ether groups).

Relatively lower Secant Modulus values and/or relatively higher olfactive panel scores are associated with increased performance Thus, the data in Table 4B indicates that polymers according to the present disclosure having a weight average molecular weight of, for example, greater than 100,000 Daltons (preferably from about 150,000 to about 300,000 Daltons) can provide improved benefits compared to comparative compounds with lower molecular weights.

Example 5. Softness and Freshness Benefits (2)

The following tests are run to show the effect of degree of cationic substitution (DoS) of the cationic polyglucan compound on Secant Modulus values.

Fabrics are treated according to the Fabric Preparation method provided above. The liquid conditioning compositions are liquid fabric enhancers according to the formula shown in Table 5A, and the cationic polyglucan compounds are varied as shown below in Table 5B. Formula 6 to 9 include a cationic polyglucan ether compound.

TABLE 5A

| Ingredient | 6 (inv.) | 7 (inv.) | 8 (inv.) | 9 (inv.) |
|---|---|---|---|---|
| Fabric Softener Active 1 | 4.5% | 4.5% | 4.5% | 4.5% |
| Crosslinked Structuring Polymer | 0.12% | 0.12% | 0.12% | 0.12% |
| Quaternized Polyacrylamide | — | — | — | — |
| Quaternary Ammonium Poly alpha-1, 3-glucan[1] | 0.24% | 0.48% | 0.75% | 1.0% |
| Perfume | 1.2% | 1.2% | 1.2% | 1.2% |
| Encapsulated Perfume | 0.25% | 0.25% | 0.25% | 0.25% |
| Water, suds suppressor, stabilizer, pH control agent, buffers, dyes | Complete to 100% | Complete to 100% | Complete to 100% | Complete to 100% |

For each example, 49.5 g/dose of liquid conditioning composition is provided. After treatment, the Secant Modulus of the fabric was determined using an Instron instrument according to the method described above. Results are shown in Table 5B, including the cationic charge density (CCD) delivered per dose, as attributable to the poly alpha-1,6-glucan ether compound.

TABLE 5B

| Formula Example | Poly alpha-1,6-glucan ether | meq CCD/dose | Secant Modulus (MPa) | Average Dry Fabric Olfactive Panel Grade |
|---|---|---|---|---|
| 6 | Polymer J[1] | 0.09 | 203 MPa | 39 |
| 7 | Polymer J[1] | 0.19 | 191 MPa | 44 |
| 8 | Polymer M[1] | 0.25 | 175 MPa | 44 |
| 8 | Polymer M[1] | 0.39 | 170 MPa | 44 |
| 7 | Polymer K[1] | 0.40 | 166 MPa | 46 |
| 9 | Polymer M[1] | 0.53 | 143 MPa | 48 |

[1]See Table 2 for information regarding cationic poly alpha-1,6-glucan ethers of Polymers J, M and K.

Examples in Table 5B show that polymers according to the present having a weight average molecular weight of between about 185,000 to about 200,000 Da, and a relative low degree of branching of, for example, about 5% to about 20%, provide improved benefits when the equivalents of cationic charge density per dose of fabric conditioner composition is above 0.1 milliequivalents (preferably from about 0.1 to about 2 milliequivalents per dose, more preferable from about 0.2 to about 1.0 milliequivalents per dose, even more preferable from about 0.3 to about 0.6 milliequivalents per dose).

Example 6. Viscosity Effects

The following tests are run to show relative impact on viscosity of cationic poly alpha-1,6-glucan ether compound of alpha-1,2-branching, including a comparison to a cationic poly alpha-1,3 glucan ether compound.

A liquid conditioning composition having a formula according to Table 6A is prepared, with different cationic polysaccharides as indicated below in Table 6B. The viscosity of each liquid conditioning composition is determined according to the method described above. Results are shown in Table 6B.

TABLE 6A

| Ingredient | 10 (comp.) | 11 (inv.) |
|---|---|---|
| Fabric Softener Active 1 | 7.5% | 7.5% |
| Crosslinked Structuring Polymer | 0.15% | 0.15% |
| Cationic Polyglucan Ether (type varies-see below) | — | 0.48% |
| Perfume | 1.2% | 1.2% |
| Encapsulated Perfume | 0.25% | 0.25% |
| Water, suds suppressor, stabilizer, pH control agent, buffers, dyes | Complete to 100% | Complete to 100% |

TABLE 6B

| Leg (formula) | Polymer | Backbone MW (kDa) | Cationic DoS | Degree of Branching (alpha-1,2) | Viscosity Pa-s (0.01 $s^{-1}$) | Viscosity Pa-s (0.1 $s^{-1}$) |
|---|---|---|---|---|---|---|
| 1 (comp. - 10 | Nil Polymer (comp.) | — | — | — | 7 | 4 |
| 2 (11) | L[1] | 185 | 0.03 | 5% | 15 | 3 |
| 3 (11) | J[1] | 185 | 0.15 | 5% | 34 | 11 |
| 4 (11) | K[1] | 185 | 0.38 | 5% | 35 | 9 |
| 5 (11) | S[1] | 185 | 0.59 | 5% | 40 | 12 |
| 6 (11) | N[1] | 200 | 0.19 | 10% | 41 | 13 |
| 7 (comp. - 11) | Cationic Alpha-1,3-Glucan Ether[2] | 120 | 0.4 | — | 142 | 29 |

[1]See Table 2 for information regarding cationic poly alpha-1,6-glucan ethers of Polymers L, J, K, S and N.
[2]Cationic poly alpha-1,3-glucan ether compound with total MW of 145 kDa and derivatized with trimethylammonium hydroxypropyl groups.

As shown in Table 6B, the product viscosity associated with poly alpha-1,6-glucan ether compounds in Formula 11 is relatively lower than that of other poly alpha-glucan ether compounds like poly alpha-1,3-glucan ether. It is believed that addition of branching to the poly alpha-1,6-glucan ether disrupts internal interactions between poly alpha-1,6-glucan chains resulting in a less ordered crystalline structure easier to formulate into compositions without negatively impacting product viscosity. The lower viscosity can lead to an improved dispensing experience and less machine residue.

Example 7. Example of Different Cationic Functional Groups

The following tests are run to show the impact of type of cationic functional group on fabric Secant Modulus Fabrics are treated according to the Fabric Preparation method provided above. The liquid conditioning compositions are liquid fabric enhancers according to the Formula 12 shown below in Table 7A. For each example, 80 g/dose of fabric enhancer composition is provided. After treatment, the Secant Modulus of the fabrics are determined using an Instron instrument according to the methods described above; results are provided in Table 7B.

TABLE 7A

| Ingredient | 12 |
|---|---|
| Fabric Softener Active 1 | 11% |
| Amino-functional Organosiloxane | 3% |
| Crosslinked Structuring Polymer | 0.10% |
| Quaternized Polyacrylamide | 0.064% |
| Poly alpha-1,6-glucan ether (see Table 7B) | 0.12% |

TABLE 7A-continued

| Ingredient | 12 |
|---|---|
| Free Perfume | 2.05% |
| Encapsulated Perfume | 0.20% |
| Water, suds suppressor, stabilizer, pH control agent, buffers, dyes | Complete to 100% |

TABLE 7B

| | Poly alpha-1,6-glucan ether description | | | | |
|---|---|---|---|---|---|
| Polymer | Backbone MW (kDa) | Cationic DoS | Cationic Functional Group | Degree of Branching | Secant Modulus |
| B[1] | 40 (75)** | 0.5 | Trimethylammonium quat | 40% | 151 MPa |
| D[1] | 40 (59)** | 0.4 | Dimethyl, C12 ammonium quat | 40% | 143 MPa |
| E[1] | 40 | 0.26 | Dimethyl, C12 ammonium quat | 40% | 140 MPa |

[1]See Table 2 for information regarding cationic poly alpha-1,6-glucan ethers of Polymers B, D and E.
**Parenthetical number is molecular weight of ether compound (i.e., backbone plus derivatized cationic ether groups).

Example 8. Ratio of Cationic Glucan Polymer to Softening Active

Cationic polymers are known in the art to interact with anionic surfactant creating an insoluble complex polymer rich phase held together via electrostatic and hydrophobic interactions. Typically, insoluble complex systems that are electropositive have a relative higher affinity to cellulose based fabrics due to their anionic character. Altering the electrostatic potential of the insoluble complex systems under a fixed set of conditions is possible by for example adjusting the ratio of total cationic actives in the composition.

Zeta potential is determined according to the test method provided above. The detergent is the equivalent of 3 wt % of liquid TIDE detergent in water having 7 gpg water hardness. The liquid fabric enhancer/softener composition comprises 4 wt % of a cationic alkyl ester quat fabric softening active ("FSA"), where the levels of the poly alpha-1,6-glucan ether compound is as provided in Table 8. Results are shown in Table 8.

TABLE 8

| Test Leg | Poly alpha-1,6 glucan ether (wt %)[1] | Cationic Fabric Softener Active ("FSA") (%) | Poly alpha 1,6 glucan ether:FSA Weight Ratio | Zeta Potential (mV) |
|---|---|---|---|---|
| 1 | 0.1 | 4 | 1:40 | −22 |
| 2 | 0.2 | 4 | 1:20 | −24 |
| 3 | 0.5 | 4 | 1:8 | −11 |
| 4 | 1 | 4 | 1:4 | −4 |
| 5 | 2 | 4 | 1:2 | +27 |

[1]Polymer K-refer to Table 2.

Zeta potential measurements in Table 8 show that liquid fabric enhancer compositions according to the present invention comprising a poly-alpha-1,6-glucan ether polymer are relative more effective at creating a more electropositive insoluble complex system when the weight ratio of Poly alpha 1,6 glucan to FSA greater than a 1:40 ratio, preferably greater than a 1:18 ratio, more preferable below a 1:15 ratio. Such ratios are likely to be particularly relevant when the level of FSA in a treatment composition is relatively low, such as equal to or less than 8 wt %, or equal to or less than 6 wt %, or equal to or less than 5 wt %, or equal to or less than 4 wt %.

Example 9. Softness Performance in a Heavy-Duty Liquid Detergent

In the following example, fabrics are treated with a heavy-duty liquid detergent formulation. The detergent formulation is provided in Table 9A.

TABLE 9A

| Ingredient | Formula 13 (comp.) | Formula 14 (inv.) |
|---|---|---|
| Water | 73.63% | 73.47% |
| Nonionic surfactant | 5.62% | 5.62% |
| Fatty Acid | 2.91% | 2.91% |
| MEA + Tetraborate Premix | 0.63% | 0.63% |
| LAS (anionic surfactant) | 2.30% | 2.30% |
| DTPA | 0.29% | 0.29% |
| Polymer (PEI600 EO20) | 0.27% | 0.27% |
| AES (anionic surfactant) | 7% | 7% |
| Polymer (Cat-Glucan Ether-see Table 9B) | 0.00% | 0.16% |
| Perfume | 0.50% | 0.50% |
| Enzyme | 0.01% | 0.01% |
| Encapsulated perfume | 0.18% | 0.18% |
| Structurant | 0.17% | 0.17% |
| Misc. (e.g., pH adjusters, salt, solvent, hydrotrope, preservative) | Balance | Balance |

Various polymers, as described below, are tested in combination with the detergent formulation, and Instron Secant Modulus (7422) data is collected. The results are provided in Table 9B.

TABLE 9B

| Polymer (formula) | Backbone MW (kDa) | Cationic DoS | Degree of Branching (alpha-1,2) | Instron Secant Modulus (7422) |
|---|---|---|---|---|
| Nil-polymer (comp.-13) | — | — | — | 5.3 |
| T[1] (14) | 109 | 0.26 | 26% | 3.5 |
| K[1] (14) | 185 | 0.38 | 5% | 3.9 |
| L[1] (14) | 185 | 0.03 | 5% | 3.1 |

[1]See Table 2 for information regarding cationic poly alpha-1,6-glucan ethers of Polymers T, K, and L.

As shown in Table 9B, detergent formulations that include polymers according to the present disclosure provide relatively lower Secant Modulus values, indicating greater softness benefits compared to detergents that do not include such polymers.

Example 10. Softness Performance in a Laundry Additive Particle (1)

In the following example, fabrics are treated with a laundry additive formulation in the form of a particle (i.e., a pastille or "bead"). The treatment occurred during a wash cycle of an automatic washing machine in combination with a heavy-duty laundry detergent. The additive formulations are is provided in Table 10A. After treatment with formulas 15-17, the fabrics are tested with an Instron instrument for Secant Modulus values, which are provided in Table 10B.

TABLE 10A

| Ingredient | 15 (comp.) | 16 (inv.) | 17 (inv.) | 18 (inv.) |
|---|---|---|---|---|
| Polyhydroxystearic Acid (MW5000) | 20% | 20% | 20% | — |
| Aminosilicone | 10% | 10% | 10% | — |
| Quaternary Ammonium Poly alpha-1,6-glucan ether (described below) | — | 3% | 6% | 6% |
| CatHEC | 3% | — | — | — |
| Polyethylene Glycol MW 8000 | 67% | 67% | 67% | 79.9% |
| PMC (31% active) | — | — | — | 3.8% |
| Perfume | — | — | — | 10.3% |

TABLE 10B

| | Instron Secant Modulus (479) | | | Terry Coefficient of Friction | | |
|---|---|---|---|---|---|---|
| Polymer | Formula 15 | Formula 16I | Formula 17 | Formula 15 | Formula 16 | Form-ula 17 |
| CatHEC | 185 MPa | — | — | 1.1555 | — | — |
| J[1] | — | 184 MPa | — | — | 1.151 | — |
| K[1] | — | 195 MPa | 159 MPa | — | 1.2085 | 1.1195 |
| L[1] | — | 217 MPa | — | — | 1.448 | — |

[1]See Table 2 for information regarding cationic poly alpha-1,6-glucan ethers of Polymers J, K and L.

Example 11. Softness Performance in a Laundry Additive Particle (1)

In the following example, fabrics are treated with a laundry additive formulation in the form of a particle (i.e., a pastille or "bead"). The treatment occurred during a wash cycle of an automatic washing machine in combination with a heavy-duty laundry detergent. The additive formulation is provided in Table 11A. After treatment, the fabrics are tested with an Instron instrument for Secant Modulus values, which are provided in Table 11B.

TABLE 11A

| Ingredient | 18 (comp.) | 19 (inv.) | 20 (inv.) | 21 (comp.) | 22 (inv.) | 23 (comp.) |
|---|---|---|---|---|---|---|
| PEG 8000 | 67% | 67% | 64% | 88.5% | 85.5% | 70% |
| Fabric Softening Active 3 | 30% | 30% | 30% | — | — | 30% |
| Quaternary Ammonium Poly alpha-1,6-glucan | — | 3% | 6% | — | 3% | — |
| CatHEC | 3% | — | — | — | — | — |
| Perfume | — | — | — | 10.3% | 10.3% | — |
| Encapsulated Perfume | — | — | — | 1.2% | 1.2% | — |

TABLE 11B

| | Instron Secant Modulus (7422) | | Coefficient of Friction | |
|---|---|---|---|---|
| Polymer | Formula 19 | Formula 23 (comp.) | Formula 19 | Formula 23 (comp.) |
| Control | — | 4.93 | — | 1.48 |
| A[1] | 3.60 | — | 1.26 | — |
| B[1] | 2.32 | — | 1.18 | — |
| C[1] | 4.04 | — | 1.39 | — |

[1]See Table 2 for information regarding cationic poly alpha-1,6-glucan ethers of Polymers A, B and C.

As shown in Table 11B, formulations that include polymers according to the present disclosure provide softness benefits, as indicated by Secant Modulus and Coefficient of Friction values.

Example 12. Softness Performance in a Soluble Unit Dose Detergent Formulation In the following example, fabrics are treated with a detergent formulation that is suitable for encapsulation in a water-soluble film as a multicompartment pouch. The detergent formulation is provided in Table 12A. The fabrics are treated for multiple cycles (3) with 26.65 g of the detergent base formulation in a commercial washing machine (e.g., Miele Honeycomb Care W1724 using standard machine settings—Cotton Short cycle at 40 C 1:38 long total cycle—followed by 24 hours line drying in a constant temperature/humidity room (70 F/50% rH). The given amount of cationic polymer (38 ppm) is also provided to each test leg when present. Water-soluble film (1 g) is also added to the treatment vessel to simulate treatment with a detergent pouch.

TABLE 12A

| Ingredient | Wt % |
|---|---|
| Nonionic surfactant (Neodol 24/7) | 2.9 |
| Anionic surfactant (HLAS) | 25.7 |
| Anionic surfactant (HC24 AE3S) | 8.2 |
| Citric acid | 0.6 |
| TPK Fatty acid | 10.3 |
| Protease (76.3 mg/g) | 0.05 |
| Amylase (29.26 mg/g) | 0.003 |
| Ethoxylated Polyethyleneimine (PEI600 EO20-Lutensol FP620 ex BASF) | 2.9 |
| Chelant (HEDP) | 0.8 |
| Brightener 49 (8.4% premix) | 0.3 |
| Antifoam | 0.3 |
| 1,2 Propanediol | 17.5 |
| Glycerol | 4.7 |
| Polypropylene glycol 400 | 1.1 |
| MEA (Monoethanolamine) | 8.9 |
| K2SO3 | 0.1 |
| Hydrogenated castor oil | 0.1 |
| Perfume | 2.4 |
| Encapsulated Perfume | 0.7 |
| Water | 10.3 |
| Minors | Balance to 100% |
| pH | 7.4 |

Various polymers, as described below, are tested in combination with the detergent formulation, and Instron Secant Modulus (7422) data is collected. The polymer amount is provided as parts per million (PPM) in the wash liquor. The results are provided in Table 12B.

TABLE 12B

| | PPM (polymer as | Polymer characteristics | | | Instron Secant |
|---|---|---|---|---|---|
| Polymer | 100% active) | Backbone MW (kDa) | Cationic DoS | Degree of Branching | Modulus (7422) |
| Nil polymer | 0 | — | — | — | 7.2 |
| J[1] | 38 | 185 | 0.15 | 5% | 3.4 |
| K[1] | 38 | 185 | 0.38 | 5% | 4.8 |
| N[1] | 38 | 200 | 0.19 | 10% | 4.6 |

[1]See Table 2 for information regarding cationic poly alpha-1,6-glucan ethers of Polymers J, K and N.

As shown in Table 12B, formulations that include polymers according to the present disclosure provide relatively lower Secant Modulus values compared to a nil-polymer formulation, indicating that the inventive examples will provide improved softness benefits.

Example 13. Exemplary Heavy-Duty Liquid Laundry Detergent Formulations

Table 13 shows exemplary formulations for heavy-duty liquid (HDL) laundry detergent compositions.

TABLE 13

| Ingredients | 25 | 26 | 27 | 28 % weight | 29 | 30 | 31 |
|---|---|---|---|---|---|---|---|
| $C_{12-15}$ alkyl ethoxy (1.8) sulfate | 6.77 | 5.16 | 1.36 | 1.30 | — | — | — |
| $C_{12-15}$ alkyl ethoxy (3) sulfate | — | — | — | — | 0.45 | — | — |
| LAS | 0.86 | 2.06 | 2.72 | 0.68 | 0.95 | 1.56 | 3.55 |
| HSAS | 1.85 | 2.63 | 1.02 | — | — | — | — |
| AE9 | 6.32 | 9.85 | 10.20 | 7.92 | | | |
| AE8 | | | | | | | 35.45 |
| AE7 | | | | | 8.40 | 12.44 | |
| $C_{12-14}$ dimethyl amine oxide | 0.30 | 0.73 | 0.23 | 0.37 | — | — | — |
| $C_{12-18}$ Fatty Acid | 0.80 | 1.90 | 0.60 | 0.99 | 1.20 | — | 15.00 |

TABLE 13-continued

| Ingredients | 25 | 26 | 27 | 28 | 29 | 30 | 31 |
|---|---|---|---|---|---|---|---|
| | % weight | | | | | | |
| Citric Acid | 2.50 | 3.96 | 1.88 | 1.98 | 0.90 | 2.50 | 0.60 |
| Optical Brightener 1 | 1.00 | 0.80 | 0.10 | 0.30 | 0.05 | 0.50 | 0.001 |
| Optical Brightener 2 | 0.001 | 0.05 | 0.01 | 0.20 | 0.50 | — | 1.00 |
| Sodium formate | 1.60 | 0.09 | 1.20 | 0.04 | 1.60 | 1.20 | 0.20 |
| DTI | 0.32 | 0.05 | — | 0.60 | — | 0.60 | 0.01 |
| Sodium hydroxide | 2.30 | 3.80 | 1.70 | 1.90 | 1.70 | 2.50 | 2.30 |
| Monoethanolamine | 1.40 | 1.49 | 1.00 | 0.70 | — | — | — |
| Diethylene glycol | 5.50 | — | 4.10 | — | — | — | — |
| Chelant | 0.15 | 0.15 | 0.11 | 0.07 | 0.50 | 0.11 | 0.80 |
| 4-formyl-phenylboronic acid | — | — | — | — | 0.05 | 0.02 | 0.01 |
| Sodium tetraborate | 1.43 | 1.50 | 1.10 | 0.75 | — | 1.07 | — |
| Ethanol | 1.54 | 1.77 | 1.15 | 0.89 | — | 3.00 | 7.00 |
| Polymer 1 | 0.10 | — | — | — | — | — | 2.00 |
| Polymer 2 | 0.30 | 0.33 | 0.23 | 0.17 | — | — | — |
| Polymer 3 | — | — | — | — | — | — | 0.80 |
| Polymer 4 | 0.80 | 0.81 | 0.60 | 0.40 | 1.00 | 1.00 | — |
| Polymer 5 (cat. polyglucan ethers) | 0.50 | 0.15 | 0.60 | 0.25 | 0.75 | 0.10 | 0.20 |
| 1,2-Propanediol | — | 6.60 | — | 3.30 | 0.50 | 2.00 | 8.00 |
| Structurant (Hydrogenated Castor Oil) | 0.10 | — | — | — | — | — | 0.10 |
| Perfume | 1.60 | 1.10 | 1.00 | 0.80 | 0.90 | 1.50 | 1.60 |
| Perfume encapsulate | 0.10 | 0.05 | 0.01 | 0.02 | 0.10 | 0.05 | 0.10 |
| Protease | 0.80 | 0.60 | 0.70 | 0.90 | 0.70 | 0.60 | 1.50 |
| Mannanase | 0.07 | 0.05 | 0.045 | 0.06 | 0.04 | 0.045 | 0.10 |
| Amylase 1 | 0.30 | — | 0.30 | 0.10 | — | 0.40 | 0.10 |
| Amylase 2 | — | 0.20 | 0.10 | 0.15 | 0.07 | — | 0.10 |
| Xyloglucanase | 0.20 | 0.10 | — | — | 0.05 | 0.05 | 0.20 |
| Lipase | 0.40 | 0.20 | 0.30 | 0.10 | 0.20 | — | — |
| Polishing enzyme | — | 0.04 | — | — | — | 0.004 | — |
| Nuclease | 0.05 | — | — | — | — | — | 0.003 |
| Dispersin B | — | — | — | 0.05 | 0.03 | 0.001 | 0.001 |
| Liquitint ® V200 | 0.01 | — | — | — | — | — | 0.005 |
| Leuco colorant | 0.05 | 0.035 | 0.01 | 0.02 | 0.004 | 0.002 | 0.004 |
| Dye control agent | — | 0.3 | — | 0.03 | — | 0.3 | 0.3 |
| Water, dyes & minors | | | | Balance | | | |
| pH | | | | 8.2 | | | |

Based on total cleaning and/or treatment composition weight. Enzyme levels are reported as raw material.
AE7 is $C_{12-13}$ alcohol ethoxylate, with an average degree of ethoxylation of 7
AE8 is $C_{12-13}$ alcohol ethoxylate, with an average degree of ethoxylation of 8
AE9 is $C_{12-13}$ alcohol ethoxylate, with an average degree of ethoxylation of 9
Amylase 1 is Stainzyme ®, 15 mg active/g, supplied by Novozymes
Amylase 2 is Natalase ®, 29 mg active/g, supplied by Novozymes
Xyloglucanase is Whitezyme ®, 20 mg active/g, supplied by Novozymes
Chelant is diethylene triamine pentaacetic acid
Dispersin B is a glycoside hydrolase, reported as 1000 mg active/g
DTI is either poly(4-vinylpyridine-1-oxide) (such as Chromabond S-403E ®), or poly(1-vinylpyrrolidone-co-1-vinylimidazole) (such as Sokalan HP56 ® ).
Dye control agent is a suitable dye control agent, for example Suparex ® O.IN (M1), Nylofixan ® P (M2), Nylofixan ® PM (M3), or Nylofixan ® HF (M4)
HSAS is mid-branched alkyl sulfate as disclosed in U.S. Pat. No. 6,020,303 and U.S. Pat. No. 6,060,443
LAS is linear alkylbenzenesulfonate having an average aliphatic carbon chain length $C_9$-$C_{15}$ (HLAS is acid form).
Leuco colorant is any suitable leuco colorant or mixtures thereof
Lipase is Lipex ®, 18 mg active/g, supplied by Novozymes
Liquitint ® V200 is a thiophene azo dye provided by Milliken
Mannanase is Mannaway ®, 25 mg active/g, supplied by Novozymes
Nuclease is a Phosphodiesterase, reported as 1000 mg active/g
Optical Brightener 1 is disodium 4,4'-bis{[4-anilino-6-morpholino-s-triazin-2-yl]-amino}-2,2'-stilbenedisulfonate
Optical Brightener 2 is Optiblanc SPL10 ® from 3V Sigma
Perfume encapsulate is a core-shell melamine formaldehyde perfume microcapsules (ex Encapsys)
Polishing enzyme is Para-nitrobenzyl esterase, reported as 1000 mg active/g
Polymer 1 is bis(($C_2H_5O$)($C_2H_4O$)n)($CH_3$)-$N^+$-$C_xH_{2x}$-$N^+$-($CH_3$)-bis(($C_2H_5O$)($C_2H_4O$)n), wherein n = 20-30, x = 3 to 8 or sulphated or sulfonated variants thereof
Polymer 2 is ethoxylated ($EO_{15}$) tetraethylene pentamine
Polymer 3 is ethoxylated polyethylenimine
Polymer 4 is ethoxylated hexamethylene diamine
Polymer 5 is cationic poly alpha-1,6-glucan ethers according to the present disclosure-e.g., see Table 2 above (Polymers A-T)
Protease is Purafect Prime ®, 40.6 mg active/g, supplied by DuPont

Example 14. Exemplary Soluble Unit Dose Formulation

Table 14 shows an exemplary formulation for use in a water-soluble unit dose article. The composition can be part of a single chamber water-soluble unit dose article or can be split over multiple compartments resulting in below "averaged across compartments" full article composition. The composition is encapsulated by a water-soluble film that forms a compartment. A multi-compartmented pouch may include side-by-side compartments, or superposed compartments.

TABLE 14

| Ingredients | (wt %) |
|---|---|
| Fatty alcohol ethoxylate non-ionic surfactant, $C_{12-14}$ average degree of ethoxylation of 7 | 3.8 |
| Lutensol XL100 | 0.5 |
| Linear $C_{11-14}$ alkylbenzene sulphonate | 24.6 |
| AE3S Ethoxylated alkyl sulphate with an average degree of ethoxylation of 3 | 12.5 |
| Citric acid | 0.7 |
| Palm Kernel Fatty acid | 5.3 |
| Nuclease enzyme (wt % active protein) | 0.01 |
| Protease enzyme (wt % active protein) | 0.07 |
| Amylase enzyme (wt % active protein) | 0.005 |
| Xyloglucanese enzyme (wt % active protein) | 0.005 |
| Mannanase enzyme (wt % active protein) | 0.003 |
| Ethoxylated polyethyleneimine | 1.6 |
| Amphiphilic graft copolymer | 2.6 |
| Zwitterionic polyamine | 1.8 |
| Polyglucan of the present invention | 5.0 |
| Anionic polyester terephthalate | 0.6 |
| HEDP | 2.2 |
| Brightener 49 | 0.4 |
| Silicone anti-foam | 0.3 |
| Hueing dye | 0.05 |
| 1,2 PropaneDiol | 12.3 |
| Glycerine | 4.7 |
| DPG (DiPropyleneGlycol) | 1.7 |
| TPG (TriPropyleneGlycol) | 0.1 |
| Sorbitol | 0.1 |
| Monoethanolamine | 10.2 |
| K2SO3 | 0.4 |
| MgCl2 | 0.3 |
| water | 10.8 |
| Hydrogenated castor oil | 0.1 |
| Perfume | 2.1 |
| Aesthetic dye & Minors | Balance to 100 |
| pH (10% product concentration in demineralized water at 20° C.) | 7.4 |

Example 15. Exemplary Powdered Detergent Formulations

Table 15 shows exemplary formations for solid free-flowing particulate laundry detergent compositions.

TABLE 15

| Ingredient | Amount (in wt %) |
|---|---|
| Anionic detersive surfactant (such as alkyl benzene sulphonate, alkyl ethoxylated sulphate and mixtures thereof) | from 8 wt % to 15 wt % |
| Non-ionic detersive surfactant (such as alkyl ethoxylated alcohol) | from 0.1 wt % to 4 wt % |
| Cationic detersive surfactant (such as quaternary ammonium compounds) | from 0 wt % to 4 wt % |
| Other detersive surfactant (such as zwiterionic detersive surfactants, amphoteric surfactants and mixtures thereof) | from 0 wt % to 4 wt % |
| Carboxylate polymer (such as co-polymers of maleic acid and acrylic acid and/or carboxylate polymers comprising ether moieties and sulfonate moieties) | from 0.1 wt % to 4 wt % |
| Polyethylene glycol polymer (such as a polyethylene glycol polymer comprising polyvinyl acetate side chains) | from 0 wt % to 4 wt % |
| Polyester soil release polymer (such as Repel-o-tex and/or Texcare polymers) | from 0 wt % to 2 wt % |
| Cellulosic polymer (such as carboxymethyl cellulose, methyl cellulose and combinations thereof) | from 0.5 wt % to 2 wt % |
| Cationic Polyglucan Ether of the present disclosure-see Table 2 | From 0.1 wt % to 4 wt % |
| Other polymer (such as care polymers) | from 0 wt % to 4 wt % |
| Zeolite builder and phosphate builder (such as zeolite 4A and/or sodium tripolyphosphate) | from 0 wt % to 4 wt % |
| Other co-builder (such as sodium citrate and/or citric acid) | from 0 wt % to 3 wt % |
| Carbonate salt (such as sodium carbonate and/or sodium bicarbonate) | from 0 wt % to 20 wt % |
| Silicate salt (such as sodium silicate) | from 0 wt % to 10 wt % |
| Filler (such as sodium sulphate and/or bio-fillers) | from 10 wt % to 70 wt % |
| Source of hydrogen peroxide (such as sodium percarbonate) | from 0 wt % to 20 wt % |
| Bleach activator (such as tetraacetylethylene diamine (TAED) and/or nonanoyloxybenzenesulphonate (NOBS)) | from 0 wt % to 8 wt % |
| Bleach catalyst (such as oxaziridinium-based bleach catalyst and/or transition metal bleach catalyst) | from 0 wt % to 0.1 wt % |
| Other bleach (such as reducing bleach and/or pre-formed peracid) | from 0 wt % to 10 wt % |
| Photobleach (such as zinc and/or aluminium sulphonated phthalocyanine) | from 0 wt % to 0.1 wt % |
| Chelant (such as ethylenediamine-N'N'-disuccinic acid (EDDS) and/or hydroxyethane diphosphonic acid (HEDP)) | from 0.2 wt % to 1 wt % |
| Hueing agent (such as direct violet 9, 66, 99, acid red 50, solvent violet 13 and any combination thereof) | from 0 wt % to 1 wt % |
| Brightener (C.I. fluorescent brightener 260 or C.I. fluorescent brightener 351) | from 0.1 wt % to 0.4 wt % |
| Protease (such as Savinase, Savinase Ultra, Purafect, FN3, FN4 and any combination thereof) | from 0.1 wt % to 0.4 wt % |
| Amylase (such as Termamyl, Termamyl ultra, Natalase, Optisize, Stainzyme, Stainzyme Plus and any combination thereof) | from 0 wt % to 0.2 wt % |
| Cellulase (such as Carezyme and/or Celluclean) | from 0 wt % to 0.2 wt % |
| Lipase (such as Lipex, Lipolex, Lipoclean and any combination thereof) | from 0 wt % to 1 wt % |
| Other enzyme (such as xyloglucanase, cutinase, pectate lyase, mannanase, bleaching enzyme) | from 0 wt % to 2 wt % |
| Fabric softener (such as montmorillonite clay and/or polydimethylsiloxane (PDMS)) | from 0 wt % to 15 wt % |
| Flocculant (such as polyethylene oxide) | from 0 wt % to 1 wt % |
| Suds suppressor (such as silicone and/or fatty acid) | from 0 wt % to 4 wt % |
| Perfume (such as perfume microcapsule, spray-on perfume, starch encapsulated perfume accords, perfume loaded zeolite, and any combination thereof) | from 0.1 wt % to 1 wt % |
| Aesthetics (such as coloured soap rings and/or coloured speckles/noodles) | from 0 wt % to 1 wt % |
| Miscellaneous | balance to 100 wt % |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A treatment composition comprising:
- a poly alpha-1,6-glucan ether compound comprising a poly alpha-1,6-glucan substituted with at least one positively charged organic group,
  - wherein the poly alpha-1,6-glucan ether compound is characterized by:
    - (a) a weight average molecular weight of from about 1000 to about 150,000 daltons,
    - (b) a backbone of glucose monomer units wherein greater than or equal to 65% of the glucose monomer units are linked via alpha-1,6-glycosidic linkages,
    - (c) from about 35% to about 45%, of the glucose monomer units have branches via alpha-1,2-glycosidic linkages, and
    - (d) a degree of cationic substitution of about 0.001 to about 3.0;
- the treatment composition further comprising a treatment adjunct ingredient;
- wherein the treatment composition is a fabric care composition, a dish care composition, or a mixture thereof.

2. The treatment composition according to claim 1, wherein the positively charged organic group comprises a substituted ammonium group.

3. The treatment composition according to claim 2, wherein the quaternary ammonium group comprises at least one $C_1$ to $C_{18}$ alkyl group.

4. The treatment composition according to claim 2, wherein the quaternary ammonium group comprises a trimethylammonium group.

5. The treatment composition according to claim 1, wherein the positively charged organic group comprises a quaternary ammonium hydroxyalkyl group.

6. The treatment composition according to claim 5, wherein the quaternary ammonium hydroxyalkyl group comprises a trimethylammonium hydroxyalkyl group.

7. The treatment composition according to claim 1, wherein the poly alpha-1,6-glucan ether compound is characterized by a biodegradability, as determined by the Biodegradability Test Method described herein (i.e., the Carbon Dioxide Evolution Test Method of OECD Guideline 301B), of at least 5% on the 90th day of the test duration.

8. The treatment composition according to claim 1, wherein the treatment composition comprises from about 0.01% to about 10%, by weight of the treatment composition, of the poly alpha-1,6-glucan ether compound.

9. The treatment composition according to claim 1, wherein the treatment adjunct ingredient is selected from the group consisting of surfactants, conditioning actives, deposition aids, rheology modifiers or structurants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, additional perfumes perfume delivery systems, structure elasticizing agents, carriers, hydrotropes, processing aids, anti-agglomeration agents, coatings, formaldehyde scavengers, pigments, and mixtures thereof.

10. The treatment composition according to claim 1, wherein the treatment composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

11. The treatment composition according to claim 1, wherein the treatment composition is a liquid characterized by a viscosity of from about from 1 to 1500 centipoises (1-1500 mPa*s) at 20 $s^{-1}$ and 21° C.

12. The treatment composition according to claim 1, wherein the treatment composition is a laundry detergent composition, a fabric conditioning composition, a laundry additive, a fabric pre-treat composition, a fabric refresher composition, an automatic dishwashing composition, a manual dishwashing composition, or a mixture thereof.

13. The treatment composition according to claim 1, wherein at least one of (a)-(d) is true:
- (a) the treatment composition is in the form of a single-compartment pouch or a multi-compartment pouch, and wherein the treatment adjunct ingredient comprises less than 20% water by weight of the treatment composition,
- (b) the treatment composition is in the form of particles, wherein individual particles have a mass of from about 1 mg to about 1 gram, and
  - wherein the particles comprise the poly alpha-1,6-glucan ether compound dispersed in a water-soluble carrier;
- (c) the treatment composition is in the form of a liquid, the treatment composition comprising from about 40% to about 95%, by weight of the treatment composition, of water,
  - the treatment composition further comprising from about 5% to about 50%, by weight of the treatment composition, of surfactant,
- (d) the treatment composition is in the form of a liquid, the treatment composition comprising from about 40% to about 98%, by weight of the treatment composition, of water, and
  - from about 1% to about 35%, by weight of the treatment composition, of a fabric softening agent, preferably a quaternary ammonium compound and/or a silicone.

* * * * *